(12) United States Patent
Chawan et al.

(10) Patent No.: US 11,026,010 B2
(45) Date of Patent: Jun. 1, 2021

(54) PORTABLE LISTENING DEVICE WITH SENSORS

(71) Applicant: Apple Inc., Cupertino, CA (US)

(72) Inventors: Arun D. Chawan, San Francisco, CA (US); Kurt Stiehl, Los Gatos, CA (US); Benjamin A. Cousins, Campbell, CA (US); Jonathan S. Aase, Rochester, MI (US); Yacine Azmi, San Mateo, CA (US); Paul Choiniere, Livermore, CA (US); Scott W. Slabaugh, Gilroy, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/870,373

(22) Filed: May 8, 2020

(65) Prior Publication Data

US 2020/0275184 A1    Aug. 27, 2020

Related U.S. Application Data

(63) Continuation of application No. 16/430,853, filed on Jun. 4, 2019, now Pat. No. 10,880,630, which is a
(Continued)

(51) Int. Cl.
*H04R 1/10* (2006.01)
*A45C 11/00* (2006.01)
(Continued)

(52) U.S. Cl.
CPC ............ *H04R 1/1016* (2013.01); *A45C 11/00* (2013.01); *A45C 11/24* (2013.01); *A45C 13/005* (2013.01); *A45C 13/02* (2013.01); *A45C 13/1069* (2013.01); *B65D 25/02* (2013.01); *B65D 43/16* (2013.01); *H01R 13/521* (2013.01); *H02J 7/0029* (2013.01); *H02J 7/0044* (2013.01);
(Continued)

(58) Field of Classification Search
CPC ........... H04R 25/652; H04R 3/04; H04R 1/34
USPC .................... 381/380, 367, 74, 328
See application file for complete search history.

(56) References Cited

U.S. PATENT DOCUMENTS

| | | | |
|---|---|---|---|
| 3,297,933 A | 1/1967 | McCarthy | |
| 3,892,638 A | 7/1975 | Stevens et al. | |

(Continued)

FOREIGN PATENT DOCUMENTS

| | | |
|---|---|---|
| AU | 2016231632 | 8/2018 |
| AU | 2016231633 | 8/2018 |

(Continued)

OTHER PUBLICATIONS

US 9,794,673 B2, 10/2017, Chawan et al. (withdrawn)
(Continued)

*Primary Examiner* — Alexander Krzystan
(74) *Attorney, Agent, or Firm* — Kilpatrick Townsend and Stockton, LLP

(57) ABSTRACT

An earbud includes a housing that includes a driver assembly positioned within the housing forming a front volume in front of the driver and a back volume behind the driver. An acoustic insert is positioned behind the driver assembly and attached to an interior surface of the housing such that it forms a bass channel that is routed from the back volume to a vent in the housing.

26 Claims, 33 Drawing Sheets

Related U.S. Application Data continuation of application No. 15/273,683, filed on Sep. 22, 2016, now Pat. No. 10,397,682.

(60) Provisional application No. 62/235,205, filed on Sep. 30, 2015, provisional application No. 62/235,213, filed on Sep. 30, 2015, provisional application No. 62/235,219, filed on Sep. 30, 2015, provisional application No. 62/235,226, filed on Sep. 30, 2015, provisional application No. 62/384,114, filed on Sep. 6, 2016.

(51) Int. Cl.
```
H04R 5/033      (2006.01)
A45C 13/02      (2006.01)
H02J 50/10      (2016.01)
H02J 7/00       (2006.01)
H04R 1/28       (2006.01)
H04R 1/34       (2006.01)
B65D 25/02      (2006.01)
B65D 43/16      (2006.01)
H04R 1/02       (2006.01)
H04B 1/3888     (2015.01)
H04B 5/00       (2006.01)
A45C 11/24      (2006.01)
A45C 13/10      (2006.01)
H04R 9/02       (2006.01)
H04R 9/06       (2006.01)
H02J 7/02       (2016.01)
H01R 13/52      (2006.01)
A45C 13/00      (2006.01)
H04B 1/3827     (2015.01)
H04M 1/60       (2006.01)
F16B 1/00       (2006.01)
```

(52) U.S. Cl.
CPC ............ *H02J 7/0047* (2013.01); *H02J 7/025* (2013.01); *H02J 7/027* (2013.01); *H02J 50/10* (2016.02); *H04B 1/3888* (2013.01); *H04B 5/0037* (2013.01); *H04R 1/02* (2013.01); *H04R 1/1025* (2013.01); *H04R 1/1041* (2013.01); *H04R 1/1058* (2013.01); *H04R 1/1075* (2013.01); *H04R 1/2826* (2013.01); *H04R 1/345* (2013.01); *H04R 5/033* (2013.01); *H04R 9/025* (2013.01); *H04R 9/06* (2013.01); *A45C 2011/001* (2013.01); *A45C 2013/026* (2013.01); *F16B 2001/0035* (2013.01); *H02J 7/00034* (2020.01); *H04B 1/385* (2013.01); *H04M 1/6033* (2013.01); *H04R 1/2857* (2013.01); *H04R 2201/105* (2013.01); *H04R 2420/07* (2013.01); *H04R 2460/03* (2013.01); *H04R 2460/09* (2013.01); *H04R 2460/17* (2013.01)

(56) References Cited

U.S. PATENT DOCUMENTS

| | | |
|---|---|---|
| 4,379,988 A | 4/1983 | Mattatall |
| 4,521,919 A | 6/1985 | Molloy |
| 5,135,012 A | 8/1992 | Kamen et al. |
| 5,253,300 A | 10/1993 | Knapp |
| 5,610,494 A | 3/1997 | Grosfilley |
| 5,745,366 A | 4/1998 | Higham et al. |
| 6,190,203 B1 | 2/2001 | Murakami et al. |
| 6,193,833 B1 | 2/2001 | Gizowski et al. |
| 6,310,960 B1 | 10/2001 | Saaski et al. |
| 6,465,757 B1 | 10/2002 | Chen |
| 6,519,448 B1 | 2/2003 | Dress et al. |
| 6,658,124 B1 | 12/2003 | Meadows |
| 6,751,327 B1 | 6/2004 | Urso et al. |
| 7,062,057 B2 | 6/2006 | Wu |
| D529,288 S | 10/2006 | Ham |
| 7,457,649 B1 | 11/2008 | Wilson |
| 7,775,675 B2 | 8/2010 | Hamm |
| 7,922,535 B1 | 4/2011 | Jiang et al. |
| 8,009,001 B1 | 8/2011 | Cleveland |
| 8,009,002 B2 | 8/2011 | Fiedler |
| 8,027,497 B2 | 9/2011 | Klemenz et al. |
| 8,078,787 B2 | 12/2011 | Lydon et al. |
| 8,099,141 B2 | 1/2012 | Janik |
| 8,126,177 B2 | 2/2012 | Jensen |
| 8,170,623 B2 | 5/2012 | Dorogusker et al. |
| 8,180,093 B2 | 5/2012 | Hankey et al. |
| 8,181,233 B2 | 5/2012 | Wyld |
| 8,185,084 B2 | 5/2012 | Terlizzi |
| 8,193,764 B2 | 6/2012 | Jakubowski |
| 8,295,043 B2 | 10/2012 | Tai et al. |
| 8,311,255 B2 | 11/2012 | Hankey et al. |
| 8,401,219 B2 | 3/2013 | Hankey et al. |
| 8,437,813 B2 | 5/2013 | Griffin et al. |
| 8,485,404 B2 | 7/2013 | Monaco et al. |
| 8,538,050 B2 | 9/2013 | Fink et al. |
| 8,611,578 B2 | 12/2013 | Kim et al. |
| 8,650,925 B2 | 2/2014 | Hankey et al. |
| 8,655,005 B2 | 2/2014 | Birger et al. |
| 8,701,912 B2 | 4/2014 | Carnevali et al. |
| 8,712,071 B2 | 4/2014 | Terlizzi et al. |
| 8,867,758 B2 | 10/2014 | Terlizzi et al. |
| 8,873,790 B2 | 10/2014 | Hayashida et al. |
| 8,891,800 B1 | 11/2014 | Shaffer |
| 8,965,030 B2 | 2/2015 | Aase |
| 8,976,994 B2 | 3/2015 | Howes et al. |
| 9,013,145 B2 | 4/2015 | Castillo et al. |
| 9,014,405 B2 | 4/2015 | Larsen et al. |
| 9,118,990 B2 | 8/2015 | Hankey et al. |
| 9,148,717 B2 | 9/2015 | Shaffer |
| 9,210,498 B1 | 12/2015 | Shaffer |
| 9,258,663 B2 | 2/2016 | Aase et al. |
| 9,287,657 B2 | 3/2016 | Hankey et al. |
| 9,294,830 B2 | 3/2016 | Terlizzi |
| 9,319,815 B2 | 4/2016 | Warren et al. |
| 9,402,120 B2 | 7/2016 | Linden et al. |
| 9,509,358 B1 | 11/2016 | Shaffer et al. |
| 9,532,128 B2 | 12/2016 | Linden et al. |
| 9,559,548 B2 | 1/2017 | Kwon et al. |
| 9,608,359 B2 | 3/2017 | Arai et al. |
| 9,653,940 B2 | 5/2017 | Schoene et al. |
| 9,769,558 B2 | 9/2017 | Chandramohan et al. |
| 9,807,491 B2 | 10/2017 | Kim |
| 9,961,431 B2 | 5/2018 | McPeak et al. |
| 9,961,433 B2 | 5/2018 | Chawan et al. |
| 9,967,644 B2 | 5/2018 | Chawan et al. |
| 9,967,648 B2 | 5/2018 | Panecki et al. |
| 9,967,649 B2 | 5/2018 | Chandramohan et al. |
| 9,967,650 B2 | 5/2018 | Chawan et al. |
| 9,973,840 B2 | 5/2018 | Wagman et al. |
| 9,973,845 B2 | 5/2018 | Chawan et al. |
| 10,003,880 B2 | 6/2018 | Wagman et al. |
| 10,003,881 B2 | 6/2018 | Cousins et al. |
| 10,009,678 B2 | 6/2018 | Panecki et al. |
| 10,097,913 B2 | 10/2018 | Zoerkendoerfer et al. |
| 10,182,282 B2 | 1/2019 | McPeak et al. |
| 10,212,506 B2 | 2/2019 | Panecki et al. |
| 10,219,062 B2 | 2/2019 | Watson et al. |
| 10,225,637 B2 | 3/2019 | Panecki et al. |
| 10,397,682 B2 | 8/2019 | Chawan et al. |
| 10,397,683 B2 | 8/2019 | LeBlanc et al. |
| 10,582,287 B2 | 3/2020 | Song et al. |
| 10,681,446 B2 | 6/2020 | Chawan et al. |
| 10,880,630 B2 | 12/2020 | Chawan et al. |
| 10,904,652 B2 | 1/2021 | Chawan et al. |
| 2002/0015501 A1 | 2/2002 | Sapiejewski |
| 2002/0089307 A1 | 7/2002 | Yang |
| 2002/0131609 A1 | 9/2002 | Kobayashi et al. |
| 2002/0147026 A1 | 10/2002 | Hsieh |
| 2003/0165250 A1 | 9/2003 | Garber et al. |
| 2004/0112519 A1 | 6/2004 | Mori |

(56) References Cited

U.S. PATENT DOCUMENTS

| | | |
|---|---|---|
| 2005/0175491 A1 | 8/2005 | Ponziani et al. |
| 2005/0212479 A1 | 9/2005 | Tsunoda |
| 2005/0227635 A1 | 10/2005 | Hawkins et al. |
| 2007/0032274 A1 | 2/2007 | Lee et al. |
| 2007/0067954 A1 | 3/2007 | Finney et al. |
| 2007/0104343 A1 | 5/2007 | Bengtsson et al. |
| 2007/0194633 A1 | 8/2007 | Ueda et al. |
| 2007/0195978 A1 | 8/2007 | Fink et al. |
| 2007/0225776 A1* | 9/2007 | Fritsch .............. A61N 1/36038 607/57 |
| 2007/0254696 A1 | 11/2007 | Kajitani |
| 2007/0256946 A1 | 11/2007 | Godshaw et al. |
| 2007/0263893 A1 | 11/2007 | Kim |
| 2008/0090622 A1 | 4/2008 | Kim et al. |
| 2008/0090626 A1 | 4/2008 | Griffin et al. |
| 2008/0119241 A1 | 5/2008 | Dorogusker et al. |
| 2008/0136369 A1 | 6/2008 | Klemenz et al. |
| 2008/0164934 A1 | 7/2008 | Hankey et al. |
| 2008/0166006 A1 | 7/2008 | Hankey et al. |
| 2008/0166968 A1 | 7/2008 | Tang et al. |
| 2008/0180874 A1 | 7/2008 | Gauger et al. |
| 2008/0186683 A1 | 8/2008 | Ligtenberg et al. |
| 2008/0224659 A1 | 9/2008 | Singh |
| 2008/0240480 A1 | 10/2008 | Pinnell et al. |
| 2008/0240486 A1 | 10/2008 | Garcia et al. |
| 2008/0278269 A1 | 11/2008 | Ramirez et al. |
| 2008/0292123 A1 | 11/2008 | Jensen |
| 2008/0320190 A1 | 12/2008 | Lydon et al. |
| 2009/0067652 A1 | 3/2009 | Schmidt et al. |
| 2009/0071502 A1 | 3/2009 | Drugeon |
| 2009/0108801 A1 | 4/2009 | Kozisek |
| 2009/0141918 A1 | 6/2009 | Chris et al. |
| 2009/0176391 A1 | 7/2009 | Brock et al. |
| 2009/0220113 A1 | 9/2009 | Tiscareno |
| 2009/0233652 A1 | 9/2009 | Yang |
| 2009/0296968 A1 | 12/2009 | Wu et al. |
| 2009/0326689 A1 | 12/2009 | Allard |
| 2010/0056272 A1 | 3/2010 | Dutilly et al. |
| 2010/0116703 A1 | 5/2010 | Elenes |
| 2010/0171578 A1 | 7/2010 | Fiedler |
| 2010/0210326 A1 | 8/2010 | Ladouceur et al. |
| 2010/0320961 A1 | 12/2010 | Castillo et al. |
| 2011/0019860 A1 | 1/2011 | Birch et al. |
| 2011/0159934 A1 | 6/2011 | Yu et al. |
| 2011/0182458 A1 | 7/2011 | Rosener et al. |
| 2011/0188689 A1 | 8/2011 | Beck et al. |
| 2011/0192857 A1 | 8/2011 | Rothbaum et al. |
| 2011/0218502 A1 | 9/2011 | Iio et al. |
| 2011/0284783 A1 | 11/2011 | Haynes et al. |
| 2011/0286615 A1 | 11/2011 | Olodort et al. |
| 2012/0074006 A1 | 3/2012 | Monaco et al. |
| 2012/0077377 A1 | 3/2012 | Han |
| 2012/0114902 A1 | 5/2012 | Furuyama et al. |
| 2012/0128193 A1 | 5/2012 | Stevinson |
| 2012/0140963 A1 | 6/2012 | Larsen et al. |
| 2012/0237074 A1 | 9/2012 | Aase |
| 2012/0243691 A1 | 9/2012 | Lin |
| 2012/0276940 A1 | 11/2012 | Lever |
| 2012/0284757 A1 | 11/2012 | Rajapakse |
| 2012/0289090 A1 | 11/2012 | Oiri et al. |
| 2013/0063873 A1 | 3/2013 | Wodrich et al. |
| 2013/0114823 A1* | 5/2013 | Kari .................... H04M 1/6066 381/74 |
| 2013/0148839 A1 | 6/2013 | Stevinson |
| 2013/0149990 A1 | 6/2013 | Otto et al. |
| 2013/0165046 A1 | 6/2013 | Tang et al. |
| 2013/0183844 A1 | 7/2013 | Wang |
| 2013/0206612 A1 | 8/2013 | Chun |
| 2013/0222323 A1 | 8/2013 | Mckenzie |
| 2013/0233762 A1 | 9/2013 | Balaji et al. |
| 2013/0238829 A1 | 9/2013 | Laycock et al. |
| 2013/0252552 A1 | 9/2013 | Vitkus et al. |
| 2013/0260615 A1 | 10/2013 | Jol et al. |
| 2013/0265702 A1 | 10/2013 | Merenda |
| 2013/0315431 A1 | 11/2013 | Grinker et al. |
| 2013/0328825 A1 | 12/2013 | Brown et al. |
| 2013/0329359 A1 | 12/2013 | Andre et al. |
| 2013/0343593 A1 | 12/2013 | Howes et al. |
| 2013/0343595 A1 | 12/2013 | Zorkendorfer et al. |
| 2014/0034080 A1 | 2/2014 | Paquet et al. |
| 2014/0068944 A1 | 3/2014 | Aase et al. |
| 2014/0073190 A1 | 3/2014 | Zhao et al. |
| 2014/0080553 A1 | 3/2014 | Torset et al. |
| 2014/0105445 A1 | 4/2014 | Kim |
| 2014/0120983 A1 | 5/2014 | Lam |
| 2014/0138378 A1 | 5/2014 | Lequeux |
| 2014/0153767 A1 | 6/2014 | Hua |
| 2014/0166658 A1 | 6/2014 | Hamra |
| 2014/0169602 A1 | 6/2014 | Walsh et al. |
| 2014/0233783 A1 | 8/2014 | Chardon et al. |
| 2014/0243620 A1* | 8/2014 | LeBoeuf ............ A61B 5/0205 600/301 |
| 2014/0264075 A1 | 9/2014 | LaPorte et al. |
| 2014/0273858 A1 | 9/2014 | Panther et al. |
| 2014/0341399 A1 | 11/2014 | Dusse et al. |
| 2014/0346072 A1 | 11/2014 | Jacobson |
| 2014/0376763 A1 | 12/2014 | Stevinson |
| 2015/0029112 A1 | 1/2015 | Macours |
| 2015/0036835 A1 | 2/2015 | Chen |
| 2015/0036861 A1 | 2/2015 | Cotha |
| 2015/0055813 A1 | 2/2015 | Ingraham |
| 2015/0078575 A1 | 3/2015 | Selig et al. |
| 2015/0155661 A1 | 6/2015 | Chen et al. |
| 2015/0156297 A1 | 6/2015 | Crawford et al. |
| 2015/0163582 A1 | 6/2015 | Aase |
| 2015/0200558 A1 | 7/2015 | Castillo et al. |
| 2015/0207907 A1 | 7/2015 | Eisele et al. |
| 2015/0208179 A1 | 7/2015 | Chang et al. |
| 2015/0237748 A1 | 8/2015 | Andre et al. |
| 2015/0241195 A1 | 8/2015 | Schenkewitz et al. |
| 2015/0245125 A1 | 8/2015 | Shaffer |
| 2015/0245126 A1 | 8/2015 | Shaffer |
| 2015/0245127 A1 | 8/2015 | Shaffer |
| 2015/0245723 A1 | 9/2015 | Alexander |
| 2015/0255905 A1 | 9/2015 | Little et al. |
| 2015/0256021 A1 | 9/2015 | Kwon et al. |
| 2015/0270737 A1 | 9/2015 | Shirakawa |
| 2015/0307273 A1 | 10/2015 | Lyman |
| 2015/0317008 A1 | 11/2015 | Chandran et al. |
| 2015/0351271 A1 | 12/2015 | Dawson |
| 2015/0360030 A1* | 12/2015 | Cartledge ............ A61N 1/0472 607/60 |
| 2015/0364845 A1 | 12/2015 | Yu et al. |
| 2015/0373448 A1 | 12/2015 | Shaffer |
| 2015/0382100 A1 | 12/2015 | Azmi et al. |
| 2016/0006292 A1 | 1/2016 | Hatanaka et al. |
| 2016/0043518 A1 | 2/2016 | Lin |
| 2016/0049074 A1* | 2/2016 | Shennib ................. G08C 17/02 381/23.1 |
| 2016/0055632 A1 | 2/2016 | Fu et al. |
| 2016/0073189 A1 | 3/2016 | Linden et al. |
| 2016/0093974 A1 | 3/2016 | Lai |
| 2016/0134959 A1 | 5/2016 | Shaffer |
| 2016/0134961 A1 | 5/2016 | Shaffer |
| 2016/0142807 A1 | 5/2016 | Aase |
| 2016/0173160 A1 | 6/2016 | Gronewoller et al. |
| 2016/0192055 A1 | 6/2016 | Liu et al. |
| 2016/0219358 A1 | 7/2016 | Shaffer et al. |
| 2016/0220000 A1 | 8/2016 | McGuckin |
| 2016/0234356 A1 | 8/2016 | Thomas et al. |
| 2016/0268722 A1 | 9/2016 | Tsai et al. |
| 2016/0277053 A1 | 9/2016 | Wong |
| 2016/0282899 A1 | 9/2016 | Inagaki et al. |
| 2016/0357510 A1 | 12/2016 | Watson et al. |
| 2016/0360350 A1 | 12/2016 | Watson et al. |
| 2017/0013342 A1 | 1/2017 | Watson et al. |
| 2017/0013875 A1 | 1/2017 | Schennum et al. |
| 2017/0013876 A1 | 1/2017 | Schennum et al. |
| 2017/0048604 A1 | 2/2017 | Hankey et al. |
| 2017/0064429 A1 | 3/2017 | Hirsch et al. |
| 2017/0093079 A1 | 3/2017 | Wagman et al. |
| 2017/0093453 A1 | 3/2017 | Panecki et al. |
| 2017/0093454 A1 | 3/2017 | Chawan et al. |
| 2017/0094381 A1 | 3/2017 | LeBlanc et al. |

(56) References Cited

U.S. PATENT DOCUMENTS

| | | |
|---|---|---|
| 2017/0094390 A1 | 3/2017 | Chawan et al. |
| 2017/0094391 A1 | 3/2017 | Panecki et al. |
| 2017/0094392 A1 | 3/2017 | Zorkendorfer et al. |
| 2017/0094393 A1 | 3/2017 | Panecki et al. |
| 2017/0094394 A1 | 3/2017 | McPeak et al. |
| 2017/0094395 A1 | 3/2017 | McPeak et al. |
| 2017/0094396 A1 | 3/2017 | Chandramohan et al. |
| 2017/0094397 A1 | 3/2017 | Wagman et al. |
| 2017/0094398 A1 | 3/2017 | Cousins et al. |
| 2017/0094399 A1 | 3/2017 | Chandramohan et al. |
| 2017/0118551 A1 | 4/2017 | Wagner et al. |
| 2017/0154421 A1 | 6/2017 | Fu et al. |
| 2017/0238087 A1 | 8/2017 | Chawan et al. |
| 2017/0245038 A1 | 8/2017 | Chawan et al. |
| 2017/0245040 A1 | 8/2017 | Hankey et al. |
| 2017/0258329 A1 | 9/2017 | Marsh |
| 2017/0347182 A1 | 11/2017 | Chawan et al. |
| 2017/0374184 A1 | 12/2017 | Kim |
| 2018/0115816 A1 | 4/2018 | Panecki et al. |
| 2018/0131793 A1 | 5/2018 | Kim et al. |
| 2018/0214028 A1 | 8/2018 | Zhang et al. |
| 2019/0288543 A1 | 9/2019 | Castillo et al. |

FOREIGN PATENT DOCUMENTS

| | | |
|---|---|---|
| AU | 2016231629 | 11/2018 |
| AU | 2017279776 | 5/2019 |
| AU | 2019200417 | 6/2019 |
| AU | 2019202866 | 10/2019 |
| CN | 2560170 Y | 7/2003 |
| CN | 2645318 Y | 9/2004 |
| CN | 1706171 | 12/2005 |
| CN | 201122952 | 9/2008 |
| CN | 201130959 Y | 10/2008 |
| CN | 101453506 A | 6/2009 |
| CN | 201365328 | 12/2009 |
| CN | 101641969 | 2/2010 |
| CN | 101692494 | 4/2010 |
| CN | 201478543 | 5/2010 |
| CN | 102036142 | 4/2011 |
| CN | 102077288 | 5/2011 |
| CN | 202085060 | 12/2011 |
| CN | 102318212 | 1/2012 |
| CN | 102474695 | 5/2012 |
| CN | 102597501 | 7/2012 |
| CN | 102612464 | 7/2012 |
| CN | 102647647 | 8/2012 |
| CN | 102761344 | 10/2012 |
| CN | 202474399 U | 10/2012 |
| CN | 102790927 A | 11/2012 |
| CN | 102803022 | 11/2012 |
| CN | 202642374 | 1/2013 |
| CN | 202728698 | 2/2013 |
| CN | 202738080 | 2/2013 |
| CN | 102957062 A | 3/2013 |
| CN | 103078365 | 5/2013 |
| CN | 101867203 | 6/2013 |
| CN | 103176114 A | 6/2013 |
| CN | 202997644 | 6/2013 |
| CN | 103200482 | 7/2013 |
| CN | 103429032 | 12/2013 |
| CN | 103475968 | 12/2013 |
| CN | 103491215 | 1/2014 |
| CN | 103517173 | 1/2014 |
| CN | 203590402 | 5/2014 |
| CN | 103905943 | 7/2014 |
| CN | 103986988 | 8/2014 |
| CN | 203761566 | 8/2014 |
| CN | 203836075 | 9/2014 |
| CN | 203942631 | 11/2014 |
| CN | 203942644 | 11/2014 |
| CN | 204046777 | 12/2014 |
| CN | 204090096 | 1/2015 |
| CN | 104378709 | 2/2015 |
| CN | 204145753 | 2/2015 |
| CN | 104467129 | 3/2015 |
| CN | 204243795 | 4/2015 |
| CN | 104662768 A | 5/2015 |
| CN | 204362296 | 5/2015 |
| CN | 104735594 | 6/2015 |
| CN | 204424931 | 6/2015 |
| CN | 204465822 | 7/2015 |
| CN | 204498318 U | 7/2015 |
| CN | 204652605 | 9/2015 |
| CN | 204652619 | 9/2015 |
| CN | 104412615 | 11/2015 |
| CN | 106293597 | 1/2017 |
| CN | 106551494 | 4/2017 |
| CN | 106559719 | 4/2017 |
| CN | 106559720 | 4/2017 |
| CN | 106559721 | 4/2017 |
| CN | 106560113 | 4/2017 |
| CN | 106560114 | 4/2017 |
| CN | 206101920 | 4/2017 |
| CN | 106617580 | 5/2017 |
| CN | 206150698 | 5/2017 |
| CN | 206314705 | 7/2017 |
| CN | 206314706 | 7/2017 |
| CN | 206314707 | 7/2017 |
| CN | 206354604 | 7/2017 |
| CN | 206603376 | 11/2017 |
| CN | 206620243 | 11/2017 |
| CN | 206949751 | 2/2018 |
| CN | 208029042 | 10/2018 |
| CN | 106551494 | 2/2019 |
| CN | 106560113 | 5/2019 |
| CN | 106617580 | 5/2019 |
| CN | 106559721 | 7/2019 |
| CN | 106559719 | 12/2019 |
| DE | 102005060047 | 6/2007 |
| DE | 102009033898 | 11/2010 |
| DE | 102009030070 | 12/2010 |
| DK | 201770337 | 5/2017 |
| DK | 201770347 | 5/2017 |
| DK | 201770348 | 5/2017 |
| DK | 201770349 | 5/2017 |
| DK | 201770350 | 5/2017 |
| DK | 201770351 | 5/2017 |
| DK | 201770352 | 5/2017 |
| DK | 179467 | 11/2018 |
| DK | 179609 | 2/2019 |
| DK | 179726 | 4/2019 |
| DK | 179735 | 4/2019 |
| DK | 179736 | 4/2019 |
| DK | 179737 | 4/2019 |
| DK | 179820 | 7/2019 |
| EP | 0263294 | 4/1988 |
| EP | 1346483 | 9/2003 |
| EP | 1427648 | 7/2006 |
| EP | 2098948 | 9/2009 |
| EP | 2309618 | 4/2011 |
| EP | 2441625 | 4/2012 |
| EP | 2465270 | 6/2012 |
| EP | 2469303 | 6/2012 |
| EP | 2498509 | 9/2012 |
| EP | 1346483 | 8/2013 |
| EP | 2465270 | 8/2013 |
| EP | 2665023 | 11/2013 |
| EP | 2677767 | 12/2013 |
| EP | 2876777 | 5/2015 |
| EP | 3054703 | 8/2016 |
| EP | 3101867 | 12/2016 |
| EP | 3151582 | 4/2017 |
| EP | 3151583 | 4/2017 |
| EP | 3151584 | 4/2017 |
| EP | 3153057 | 4/2017 |
| EP | 3154275 | 4/2017 |
| EP | 3157265 | 4/2017 |
| EP | 3304951 | 4/2018 |
| EP | 3153056 | 12/2018 |
| EP | 3151584 | 6/2019 |
| EP | 3154275 | 9/2019 |
| EP | 3157265 | 10/2019 |
| GB | 2445388 | 7/2008 |

(56) References Cited

FOREIGN PATENT DOCUMENTS

| | | |
|---|---|---|
| GB | 201316441 | 10/2013 |
| HK | 1234970 | 3/2018 |
| HK | 1235196 | 3/2018 |
| JP | 6070285 | 4/1985 |
| JP | 60237729 | 11/1985 |
| JP | 2001119863 | 4/2001 |
| JP | 2005512858 | 5/2005 |
| JP | 2006504304 | 2/2006 |
| JP | 3143722 | 7/2008 |
| JP | 2010534978 | 11/2010 |
| JP | 2011016352 | 1/2011 |
| JP | 2012019495 | 1/2012 |
| JP | 2012100248 | 5/2012 |
| JP | 2014014074 | 1/2014 |
| JP | 2014093770 | 5/2014 |
| JP | 3192908 | 8/2014 |
| JP | 2015109542 | 6/2015 |
| JP | 2015109785 | 6/2015 |
| JP | 2016515421 | 5/2016 |
| JP | 6165951 | 6/2017 |
| JP | 2017098943 | 6/2017 |
| JP | 2017099259 | 6/2017 |
| JP | 2017108606 | 6/2017 |
| JP | 2017112595 | 6/2017 |
| JP | 6316893 | 4/2018 |
| JP | 6318209 | 4/2018 |
| JP | 6318315 | 4/2018 |
| JP | 6341967 | 5/2018 |
| KR | 20140044516 | 4/2014 |
| KR | 1020140044516 | 4/2014 |
| KR | 101494199 | 2/2015 |
| KR | 20150044659 | 4/2015 |
| KR | 10200477291 | 5/2015 |
| KR | 101829140 | 2/2018 |
| KR | 101830397 | 2/2018 |
| KR | 101870525 | 6/2018 |
| KR | 101902628 | 9/2018 |
| KR | 101935633 | 12/2018 |
| KR | 101998528 | 7/2019 |
| KR | 102018510 | 8/2019 |
| KR | 102033116 | 10/2019 |
| KR | 102081030 | 2/2020 |
| TW | 579633 | 3/2004 |
| TW | M404402 | 5/2011 |
| TW | 201440536 | 10/2014 |
| TW | M495689 | 2/2015 |
| TW | 201720332 | 6/2017 |
| TW | 201722169 | 6/2017 |
| TW | 201724873 | 7/2017 |
| TW | 201728097 | 8/2017 |
| TW | I623203 | 5/2018 |
| TW | I627922 | 7/2018 |
| TW | I629905 | 7/2018 |
| TW | I650025 | 2/2019 |
| TW | I666942 | 7/2019 |
| TW | I681677 | 1/2020 |
| TW | I681678 | 1/2020 |
| WO | 9807244 | 2/1998 |
| WO | 2004007180 | 1/2004 |
| WO | 2006070066 | 7/2006 |
| WO | 2007090168 | 8/2007 |
| WO | 2007101439 | 9/2007 |
| WO | 2008118478 | 10/2008 |
| WO | 2009158635 | 12/2009 |
| WO | 2011018086 | 2/2011 |
| WO | 2011146659 | 11/2011 |
| WO | 2012022021 | 2/2012 |
| WO | 2012030228 | 3/2012 |
| WO | 2012106216 | 8/2012 |
| WO | 2014155367 | 10/2014 |
| WO | 2014209374 | 12/2014 |
| WO | 2015050073 | 4/2015 |
| WO | 2015057052 | 4/2015 |
| WO | 2015074401 | 5/2015 |
| WO | 2015126572 | 8/2015 |
| WO | 2015126611 | 8/2015 |
| WO | 2016161454 | 10/2016 |
| WO | 2017058675 | 4/2017 |

OTHER PUBLICATIONS

US 9,826,301 B2, 11/2017, Chawan et al. (withdrawn)
US 9,883,272 B2, 01/2018, Chawan et al. (withdrawn)
US 9,883,274 B2, 01/2018, McPeak et al. (withdrawn)
US 9,883,276 B2, 01/2018, McPeak et al. (withdrawn)
US 9,883,277 B2, 01/2018, Chawan et al. (withdrawn)
US 9,883,281 B2, 01/2018, Chawan et al. (withdrawn)
US 9,913,017 B2, 03/2018, McPeak et al. (withdrawn)
US 9,913,018 B2, 03/2018, Chawan et al. (withdrawn)
US 9,918,156 B1, 03/2018, Chawan et al. (withdrawn)
US 9,918,160 B1, 03/2018, Chawan et al. (withdrawn)
"Article entirtled:Launch Files & Applications ona Scheduled Date with Calendar for Mac OS X", OSXDaily, Available online at: [BNSDOCKID:<XP 55285939A>5/launch-file-app-scheduled-date-mac-os-x/, Apr. 15, 2013, 5 pages (of-record in parent application).
"eCharger User Guide", Simens, Available online at: http://usa.bestsoundtechology.com/media/2015/04/echarger-user-manual.pdf, Sep. 30, 2014, 20 pages (of-record in parent application).
"How to Charge Siemens Hearing Aids with eCharger", Available online at: https://www.youtube.com/watch?v=-Y6ZM7SpziA,, Feb. 13, 2015, 1 page (of-record in parent application).
"Inductive Charging", Wikipedia, Available Online at: https://en.wikipedia.org/w/index.php? title= Inductive_charging&oldid= 682527567, Sep. 24, 2015, 6 pages (of-record in parent application).
"Like Trigger?", Egomotion Corp., Available online at: http://gettrigger.com/, 2013-2015, 5 pages (of-record in parent application).
"Nokia J (BH-806)", Issue 2.0, Nokia, Available online at: https://www.nokia.com/en_int/phones/sites/default/files/user-guides/Nokia_BH-806_UG_en.pdf, 2011, 10 pages (of-record in parent application).
"Siemens Accessories for Hearing Instruments—Designed to Fit Your Lifestyle", Siemens AG, Available Online at: https://media.sivantos.com/siemens-website/media/2014/05/Accessories_consumer-leaflet_2013-09_en.pdf, Sep. 10, 2013, 8 pages (of-record in parent application).
"Simger Beats Wireless Earbud Headphones Review", Nerd Techy—Your Guide to New Technology, Available Online at: http://nerdtechy.com/simger-beats, Jun. 7, 2016, 13 pages (of-record in parent application).
"Siri vs. Cortana—Happy Anniversary (Commercial)", Nokia Ira8, Jul. 28, 2014, 1 page (of-record in parent application).
"Skybuds—Truly Wireless Earbuds and Smartphone Case by Alpha Audiotronics, Inc", Kickstarter, Available Online at: http://web.archive.org/web/20160329093740/https://www.kickstarter.com/projects/421230074/skybuds-truly-wireless-earbuds-and-smartphone-case/description, Mar. 29, 2016, 37 pages (of-record in parent application).
U.S. Appl. No. 11/824,453 , "U.S. Patent Application", dated Jun. 28, 2007, 188 pages (of-record in parent application).
U.S. Appl. No. 14/198,884 , "Non-Final Office Action", dated Sep. 29, 2017, 11 pages (of-record in parent application).
U.S. Appl. No. 14/731,249 , "Notice of Allowance", dated Jun. 6, 2016, 6 pages (of-record in parent application).
U.S. Appl. No. 15/071,177 , "U.S. Patent Application", dated Mar. 15, 2016, 143 pages (of-record in parent application).
U.S. Appl. No. 15/076,271 , "U.S. Patent Application", 193 pages (of-record in parent application).
U.S. Appl. No. 15/273,671 , "First Action Interview Pilot Program Pre-Interview Communication", dated Jan. 10, 2018, 4 pages (of-record in parent application).
U.S. Appl. No. 15/273,671 , "Notice of Allowance", dated May 23, 2018, 5 pages (of-record in parent application).
U.S. Appl. No. 15/273,675 , "Final Office Action", dated Aug. 31, 2017, 20 pages (of-record in parent application).

(56) References Cited

OTHER PUBLICATIONS

U.S. Appl. No. 15/273,675 , "First Action Interview Pilot Program Pre-Interview Communication", dated Jun. 2, 2017, 4 pages (of-record in parent application).
U.S. Appl. No. 15/273,675 , "Notice of Allowance", dated Nov. 7, 2017, 9 pages (of-record in parent application).
U.S. Appl. No. 15/273,675 , "Supplemental Notice of Allowability", dated Nov. 27, 2017, 2 pages (of-record in parent application).
U.S. Appl. No. 15/273,677 , "First Action Interview Pilot Program Pre-Interview Communication", dated Jul. 12, 2017, 4 pages (of-record in parent application).
U.S. Appl. No. 15/273,677 , "Notice of Allowance", dated Oct. 25, 2017, 9 pages (of-record in parent application).
U.S. Appl. No. 15/273,683 , "First Action Interview Office Action Summary", dated Feb. 25, 2019, 4 pages (of-record in parent application).
U.S. Appl. No. 15/273,683 , "First Action Interview Pilot Program Pre-Interview Communication", dated Jun. 15, 2018, 5 pages (of-record in parent application).
U.S. Appl. No. 15/273,683 , "Non-Final Office Action", dated Nov. 16, 2017, 10 pages (of-record in parent application).
U.S. Appl. No. 15/273,683 , "Notice of Allowance", dated Apr. 17, 2019, 7 pages (of-record in parent application).
U.S. Appl. No. 15/273,685 , "First Action Interview Pilot Program Pre-Interview Communication", dated Aug. 31, 2017, 4 pages (of-record in parent application).
U.S. Appl. No. 15/273,685 , "Notice of Allowance", dated Nov. 29, 2017, 8 pages (of-record in parent application).
U.S. Appl. No. 15/273,687 , "First Action Interview Pilot Program Pre-Interview Communication", dated Jan. 25, 2018, 3 pages (of-record in parent application).
U.S. Appl. No. 15/273,687 , "Notice of Allowance", dated May 3, 2018, 5 pages (of-record in parent application).
U.S. Appl. No. 15/273,687 , "Restriction Requirement", dated Nov. 15, 2017, 4 pages (of-record in parent application).
U.S. Appl. No. 15/273,687 , "Supplemental Notice of Allowability", dated May 22, 2018, 2 pages (of-record in parent application).
U.S. Appl. No. 15/273,690 , "First Action Interview Pilot Program Pre-Interview Communication", dated Feb. 9, 2018, 5 pages (of-record in parent application).
U.S. Appl. No. 15/273,690 , "Notice of Allowance", dated May 11, 2018, 20 pages (of-record in parent application).
U.S. Appl. No. 15/273,691 , "First Action Interview Pilot Program Pre-Interview Communication", dated May 17, 2018, 5 pages (of-record in parent application).
U.S. Appl. No. 15/273,691 , "Non-Final Office Action", dated Nov. 15, 2017, 13 pages (of-record in parent application).
U.S. Appl. No. 15/273,691 , "Notice of Allowance", dated Aug. 29, 2018, 16 pages (of-record in parent application).
U.S. Appl. No. 15/273,691 , "Supplemental Notice of Allowability", dated Sep. 14, 2018, 2 pages (of-record in parent application).
U.S. Appl. No. 15/273,691 , "Supplemental Notice of Allowability", dated Jan. 28, 2019, 5 pages (of-record in parent application).
U.S. Appl. No. 15/273,693 , "First Action Interview Pilot Program Pre-Interview Communication", dated Apr. 18, 2017, 4 pages (of-record in parent application).
U.S. Appl. No. 15/273,693 , "Notice of Allowance", dated May 23, 2017, 9 pages (of-record in parent application).
U.S. Appl. No. 15/273,694 , "Non-Final Office Action", dated May 15, 2017, 8 pages (of-record in parent application).
U.S. Appl. No. 15/273,694 , "Notice of Allowability", dated Apr. 19, 2018, 2 pages (of-record in parent application).
U.S. Appl. No. 15/273,694 , "Notice of Allowance", dated Oct. 6, 2017, 15 pages (of-record in parent application).
U.S. Appl. No. 15/273,694 , "Notice of Allowance", dated Nov. 20, 2017, 5 pages (of-record in parent application).
U.S. Appl. No. 15/273,694 , "Supplemental Notice of Allowability", dated Mar. 16, 2018, 2 pages (of-record in parent application).
U.S. Appl. No. 15/273,694 , "Supplemental Notice of Allowability", dated Mar. 28, 2018, 2 pages (of-record in parent application).
U.S. Appl. No. 15/273,694 , "Supplemental Notice of Allowability", dated Dec. 18, 2017, 3 pages (of-record in parent application).
U.S. Appl. No. 15/273,696 , "First Action Interview Pilot Program Pre-Interview Communication", dated Jan. 18, 2018, 5 pages (of-record in parent application).
U.S. Appl. No. 15/273,696 , "Notice of Allowance", dated May 4, 2018, 10 pages (of-record in parent application).
U.S. Appl. No. 15/273,698 , "Final Office Action", dated Jan. 25, 2019, 10 pages (of-record in parent application).
U.S. Appl. No. 15/273,698 , "First Action Interview Pilot Program Pre-Interview Communication", dated Mar. 21, 2018, 8 pages (of-record in parent application).
U.S. Appl. No. 15/273,698 , "Non-Final Office Action", dated Jul. 11, 2018, 13 pages (of-record in parent application).
U.S. Appl. No. 15/273,698 , "Non-Final Office Action", dated Mar. 27, 2019, 6 pages (of-record in parent application).
U.S. Appl. No. 15/273,698 , "Notice of Allowance", dated May 2, 2019, 5 pages (of-record in parent application).
U.S. Appl. No. 15/273,698 , "Restriction Requirement", dated Dec. 4, 2017, 6 pages (of-record in parent application).
U.S. Appl. No. 15/275,364 , "First Action Interview Pilot Program Pre-Interview Communication", dated Jan. 5, 2017, 4 pages (of-record in parent application).
U.S. Appl. No. 15/275,364 , "Non-Final Office Action", dated Jun. 1, 2018, 8 pages (of-record in parent application).
U.S. Appl. No. 15/275,364 , "Notice of Allowance", dated Apr. 3, 2017, 18 pages (of-record in parent application).
U.S. Appl. No. 15/275,364 , "Notice of Allowance", dated Sep. 28, 2017, 5 pages (of-record in parent application).
U.S. Appl. No. 15/275,364 , "Notice of Allowance", dated Oct. 4, 2018, 9 pages (of-record in parent application).
U.S. Appl. No. 15/275,364 , "Supplemental Notice of Allowability", dated Apr. 19, 2017, 2 pages (of-record in parent application).
U.S. Appl. No. 15/275,364 , "Supplemental Notice of Allowability", dated Dec. 28, 2017, 2 pages (of-record in parent application).
U.S. Appl. No. 15/275,364 , "Supplemental Notice of Allowability", dated Dec. 5, 2017, 2 pages (of-record in parent application).
U.S. Appl. No. 15/275,364 , "Supplemental Notice of Allowability", dated Nov. 28, 2018, 2 pages (of-record in parent application).
U.S. Appl. No. 15/275,364 , "Supplemental Notice of Allowability", dated Oct. 30, 2017, 2 pages (of-record in parent application).
U.S. Appl. No. 15/275,364 , "Supplemental Notice of Allowability", dated Jun. 21, 2017, 6 pages (of-record in parent application).
U.S. Appl. No. 15/275,366 , "Non-Final Office Action", dated Feb. 8, 2017, 13 pages (of-record in parent application).
U.S. Appl. No. 15/275,366 , "Notice of Allowance", dated Jun. 7, 2017, 19 pages (of-record in parent application).
U.S. Appl. No. 15/275,366 , "Restriction Requirement", dated Dec. 16, 2016, 6 pages (of-record in parent application).
U.S. Appl. No. 15/588,400 , "First Action Interview Pilot Program Pre-Interview Communication", dated Jul. 20, 2017, 5 pages (of-record in parent application).
U.S. Appl. No. 15/588,400 , "Notice of Allowance", dated Oct. 18, 2017, 13 pages (of-record in parent application).
U.S. Appl. No. 15/588,400 , "Supplemental Notice of Allowability", dated Apr. 13, 2018, 2 pages (of-record in parent application).
U.S. Appl. No. 15/588,400 , "Supplemental Notice of Allowability", dated Dec. 12, 2017, 2 pages (of-record in parent application).
U.S. Appl. No. 15/588,400 , "Supplemental Notice of Allowability", Dec. 28, 2017, 2 pages (of-record in parent application).
U.S. Appl. No. 15/588,400 , "Supplemental Notice of Allowability", dated Feb. 8, 2018, 2 pages (of-record in parent application).
U.S. Appl. No. 15/588,400 , "Supplemental Notice of Allowability", dated Mar. 8, 2018, 2 pages (of-record in parent application).
U.S. Appl. No. 15/588,400 , "Supplemental Notice of Allowability", dated Oct. 30, 2017, 2 pages (of-record in parent application).
U.S. Appl. No. 15/588,444 , "First Action Interview Pilot Program Pre-Interview Communication", dated Jul. 12, 2017, 5 pages (of-record in parent application).
U.S. Appl. No. 15/588,444 , "Notice of Allowance", dated Nov. 2, 2017, 15 pages (of-record in parent application).
U.S. Appl. No. 15/588,444 , "Supplemental Notice of Allowability", dated Apr. 5, 2018, 2 pages (of-record in parent application).

(56) References Cited

OTHER PUBLICATIONS

U.S. Appl. No. 15/588,444, "Supplemental Notice of Allowability", dated Dec. 12, 2017, 2 pages (of-record in parent application).
U.S. Appl. No. 15/588,444, "Supplemental Notice of Allowability", dated Feb. 8, 2018, 2 pages (of-record in parent application).
U.S. Appl. No. 15/588,444, "Supplemental Notice of Allowability", dated Jan. 4, 2018, 2 pages (of-record in parent application).
U.S. Appl. No. 15/588,444, "Supplemental Notice of Allowability", dated Mar. 7, 2018, 2 pages (of-record in parent application).
U.S. Appl. No. 15/680,095, "First Action Interview Pilot Program Pre-Interview Communication", dated Oct. 16, 2017, 3 pages (of-record in parent application).
U.S. Appl. No. 15/680,095, "Notice of Allowance", dated Dec. 27, 2017, 10 pages (of-record in parent application).
U.S. Appl. No. 15/680,095, "Supplemental Notice of Allowability", dated Jan. 4, 2018, 2 pages (of-record in parent application).
U.S. Appl. No. 15/851,348, "Final Office Action", dated Jul. 19, 2018, 35 pages (of-record in parent application).
U.S. Appl. No. 15/851,348, "First Action Interview Office Action Summary", dated Apr. 11, 2018, 4 pages (of-record in parent application).
U.S. Appl. No. 15/851,348, "First Action Interview Pilot Program Pre-Interview Communication", dated Jan. 31, 2018, 3 pages (of-record in parent application).
U.S. Appl. No. 15/851,348, "Notice of Allowance", dated Dec. 3, 2018, 10 pages (of-record in parent application).
U.S. Appl. No. 15/851,348, "Supplemental Notice of Allowability", dated Dec. 26, 2018, 2 pages (of-record in parent application).
U.S. Appl. No. 15/851,348, "Supplemental Notice of Allowability", dated Jan. 10, 2019, 2 pages (of-record in parent application).
U.S. Appl. No. 16/430,773, "Notice of Allowance", dated Feb. 12, 2020, 9 pages (of-record in parent application).
U.S. Appl. No. 16/430,773, "Supplemental Notice of Allowability", dated Mar. 20, 2020, 2 pages (of-record in parent application).
U.S. Appl. No. 16/430,823, "Non-Final Office Action", dated Feb. 19, 2020, 17 pages (of-record in parent application).
U.S. Appl. No. 16/430,853, "Non-Final Office Action", dated Mar. 2, 2020, 12 pages (of-record in parent application).
U.S. Appl. No. 62/142,978, "U.S. Application No.", dated Apr. 3, 2015, 32 pages (of-record in parent application).
U.S. Appl. No. 62/199,943, "U.S. Application No.", dated Jul. 31, 2015, 19 pages (of-record in parent application).
AU2016231629, "First Examination Report", dated Aug. 17, 2017, 4 pages (of-record in parent application).
AU2016231629, "Notice of Allowance", dated Aug. 3, 2018, 3 pages (of-record in parent application).
AU2016231629, "Second Examination Report", dated Apr. 9, 2018, 3 pages (of-record in parent application).
AU2016231631, "First Examination Report", dated Jun. 14, 2017, 2 pages (of-record in parent application).
AU2016231632, "First Examination Report", dated Jun. 2, 2017, 7 pages (of-record in parent application).
AU2016231632, "Notice of Acceptance", dated Apr. 9, 2018, 3 pages (of-record in parent application).
AU2016231633, "First Examination Report", dated Aug. 18, 2017, 5 pages (of-record in parent application).
AU2016231633, "Notice of Acceptance", dated Jul. 26, 2018, 3 pages (of-record in parent application).
AU2016231633, "Second Examination Report", dated May 1, 2018, 3 pages (of-record in parent application).
AU2017279776, "First Examination Report", dated Jan. 22, 2018, 3 pages (of-record in parent application).
AU2017279776, "Notice of Acceptance", dated Jan. 21, 2019, 3 pages (of-record in parent application).
AU2017279776, "Notice of Allowance", dated Jan. 21, 2019, 3 pages (of-record in parent application).
AU2017279776, "Second Examination Report", dated Nov. 29, 2018, 3 pages (of-record in parent application).
AU2017279776, "Substantive Examination Report", dated Jan. 10, 2019, 3 pages (of-record in parent application).
AU2019200365, "First Examination Report", dated Feb. 22, 2019, 3 pages (of-record in parent application).
AU2019200365, "Second Examination Report", dated Jun. 24, 2019, 3 pages (of-record in parent application).
AU2019200365, "Third Examination Report", dated Nov. 12, 2019, 3 pages (of-record in parent application).
AU2019200416, "First Examination Report", dated Dec. 5, 2019, 3 pages (of-record in parent application).
AU2019202866, "Notice of Acceptance", dated Jun. 6, 2019, 3 pages (of-record in parent application).
BR112018003113-5, "Office Action", dated Jul. 26, 2019, 6 pages (of-record in parent application).
BR112018003113-5, "Office Action", dated Nov. 26, 2019, 6 pages (of-record in parent application).
Brezinski, "Sennheiser MX W1 Headphones Review—The MX W1s Seem to be More of a Tech Demo Than Actual Consumer Item", Available online at : http://headphones.reviewed.com/content/sennheiser-mx-w1-headphones-review-769, dated Mar. 11, 2009, 8 pages (of-record in parent application).
CN201610848841.7, "Notice of Decision to Grant", dated Mar. 6, 2019, 4 pages (of-record in parent application).
CN201610848841.7, "Office Action", dated Jan. 2, 2018, 10 pages (of-record in parent application).
CN201610848841.7, "Office Action", dated Aug. 22, 2018, 8 pages (of-record in parent application).
CN201610848842.1, "Notice of Decision to Grant", dated Oct. 10, 2019, 2 pages (of-record in parent application).
CN201610848842.1, "Office Action", dated Sep. 19, 2018, 11 pages (of-record in parent application).
CN201610848842.1, "Office Action", dated Apr. 17, 2019, 20 pages (of-record in parent application).
CN201610848843.6, "Notice of Decision to Grant", dated Nov. 28, 2018, 4 pages (of-record in parent application).
CN201610848843.6, "Office Action", dated Dec. 12, 2017, 22 pages (of-record in parent application).
CN201610848843.6, "Office Action", dated Aug. 20, 2018, 3 pages (of-record in parent application).
CN201610849637.7, "Notice of Decision to Grant", dated Feb. 26, 2019, 4 pages (of-record in parent application).
CN201610849637.7, "Office Action", dated Dec. 28, 2017, 16 pages (of-record in parent application).
CN201610849637.7, "Office Action", dated Aug. 21, 2018, 4 pages (of-record in parent application).
CN201610849639.6, "Office Action", dated Dec. 21, 2017, 16 pages (of-record in parent application).
CN201610849639.6, "Office Action", dated Mar. 1, 2019, 7 pages (of-record in parent application).
CN201610849639.6, "Office Action", dated Sep. 20, 2019, 7 pages (of-record in parent application).
CN201610849639.6, "Office Action", dated Aug. 21, 2018, 9 pages (of-record in parent application).
CN201610849747.3, "Office Action", dated Aug. 23, 2018, 10 pages (of-record in parent application).
CN201610849747.3, "Office Action", dated Apr. 8, 2020, 20 pages (of-record in parent application).
CN201610849747.3, "Office Action", dated Oct. 16, 2019, 6 pages (of-record in parent application).
CN201610849747.3, "Office Action", dated Apr. 12, 2019, 7 pages (of-record in parent application).
CN201610849749.2, "Notice of Decision to Grant", dated Apr. 18, 2019, 2 pages (of-record in parent application).
CN201610849749.2, "Office Action", dated Sep. 5, 2018, 17 pages (of-record in parent application).
CN201621078588.3, "Notice of Decision to Grant", dated Mar. 17, 2017, 2 pages (of-record in parent application).
CN201621078588.3, "Utility Model Patentability Evaluation Report", dated Jun. 13, 2017, 18 pages (of-record in parent application).
CN201621078697.5, "Office Action", dated Jan. 26, 2017, 4 pages (of-record in parent application).
CN201621078698.X, "First Notification to Make Rectification", dated Mar. 15, 2017, 3 pages (of-record in parent application).
CN201621078698.X, "Notice of Decision to Grant", dated Sep. 19, 2017, 2 pages (of-record in parent application).

(56) References Cited

OTHER PUBLICATIONS

CN201621078698.X , "Office Action", dated Mar. 15, 2017, 3 pages (of-record in parent application).
CN201621078698.X , "Office Action", dated Jul. 11, 2017, 4 pages (of-record in parent application).
CN201621079333.9 , "Notice of Decision to Grant", dated Aug. 22, 2017, 2 pages (of-record in parent application).
CN201621079333.9 , "Office Action", dated Feb. 8, 2017, 3 pages (of-record in parent application).
CN201621079334.3 , "Notice of Decision to Grant", dated Jun. 7, 2017, 2 pages (of-record in parent application).
CN201621079334.3 , "Office Action", dated Feb. 23, 2017, 3 pages (of-record in parent application).
CN201621079342.8 , "Notice of Decision to Grant", dated Jun. 26, 2017, 2 pages (of-record in parent application).
CN201621079342.8 , "Office Action", dated Feb. 23, 2017, 4 pages (of-record in parent application).
CN201621079467.0 , "Notice of Decision to Grant", dated Aug. 16, 2017, 2 pages (of-record in parent application).
CN201621079467.0 , "Office Action", dated Feb. 22, 2017, 4 pages (of-record in parent application).
CN201621079468.5 , "Office Action", dated Feb. 23, 2017, 4 pages (of-record in parent application).
CN201621079469.X , "Office Action", dated Feb. 23, 2017, 3 pages (of-record in parent application).
CN201721463542.8 , "Notice of Decision to Grant", dated Aug. 14, 2018, 3 pages (of-record in parent application).
CN201721463542.8 , "Office Action", dated May 8, 2018, 3 pages (of-record in parent application).
CN201721463542.8 , "Utility Model Patentability Evaluation Report", dated Jan. 7, 2019, 11 pages (of-record in parent application).
CN201810053066.5 , "Office Action", dated Mar. 3, 2020, 6 pages (of-record in parent application).
CN201810053066.5 , "Office Action", dated Sep. 23, 2019, 6 pages (of-record in parent application).
CN201810053066.5 , "Office Action", dated Jan. 3, 2019, 9 pages (of-record in parent application).
CN201811526338.5 , "Office Action", dated Apr. 29, 2020, 5 pages (of-record in parent application).
CN201811526338.5 , "Office Action", Jul. 23, 2019, 9 pages (of-record in parent application).
CN201811526395.3 , "Notice of Decision to Grant", dated Apr. 29, 2020, 2 pages (of-record in parent application).
CN201811526395.3 , "Office Action", dated Aug. 19, 2019, 22 pages (of-record in parent application).
CN201910037290.X , "Office Action", dated Oct. 10, 2019, 9 pages (of-record in parent application).
CN201910042013.8 , "Office Action", dated Sep. 18, 2019, 24 pages (of-record in parent application).
CN201910042013.8 , "Office Action", dated Feb. 3, 2020, 25 pages (of-record in parent application).
CN201910403974.7 , "Office Action", dated Mar. 27, 2020, 4 pages (of-record in parent application).
CN201910587176.4 , "Office Action", dated Feb. 3, 2020, 20 pages (of-record in parent application).
DKPA 2017 70337 , "Notice of Decision to Grant", dated Oct. 8, 2018, 2 pages (of-record in parent application).
DKPA 2017 70337 , "Office Action", dated Aug. 31, 2017, 8 pages (of-record in parent application).
DKPA 2017 70347 , "Notice of Decision to Grant", dated Mar. 21, 2019, 2 pages (of-record in parent application).
DKPA 2017 70347 , "Office Action", dated Jul. 11, 2017, 10 pages (of-record in parent application).
DKPA 2017 70347 , "Office Action", dated Sep. 6, 2018, 2 pages (of-record in parent application).
DKPA 2017 70347 , "Office Action", dated Jan. 26, 2018, 6 pages (of-record in parent application).
DKPA 2017 70348 , "Notice of Decision to Grant", dated Jan. 8, 2019, 2 pages (of-record in parent application).
DKPA 2017 70348 , "Office Action", dated Mar. 7, 2018, 4 pages (of-record in parent application).
DKPA 2017 70348 , "Office Action", dated Aug. 25, 2017, 8 pages (of-record in parent application).
DKPA 2017 70349 , "Notice of Decision to Grant", dated Mar. 20, 2019, 2 pages (of-record in parent application).
DKPA 2017 70349 , "Office Action", dated Mar. 22, 2018, 7 pages (of-record in parent application).
DKPA 2017 70349 , "Office Action", dated Sep. 12, 2017, 8 pages (of-record in parent application).
DKPA 2017 70350 , "Notice of Decision to Grant", dated May 1, 2019, 2 pages (of-record in parent application).
DKPA 2017 70350 , "Office Action", dated Feb. 13, 2019, 3 pages (of-record in parent application).
DKPA 2017 70350 , "Office Action", dated Mar. 7, 2018, 7 pages (of-record in parent application).
DKPA 2017 70350 , "Office Action", dated Dec. 7, 2018, 8 pages (of-record in parent application).
DKPA 2017 70350 , "Office Action", dated Aug. 3, 2017, 9 pages (of-record in parent application).
DKPA 2017 70351 , "Notice of Decision to Grant", dated Mar. 21, 2019, 2 pages (of-record in parent application).
DKPA 2017 70351 , "Office Action", dated Nov. 13, 2018, 4 pages (of-record in parent application).
DKPA 2017 70351 , "Office Action", dated Sep. 12, 2017, 9 pages (of-record in parent application).
DKPA 2017 70352 , "Notice of Decision to Grant", dated Mar. 27, 2019, 2 pages (of-record in parent application).
DKPA 2017 70352 , "Office Action", dated Apr. 9, 2018, 3 pages (of-record in parent application).
DKPA 2017 70352 , "Office Action", dated Sep. 20, 2017, 9 pages (of-record in parent application).
DKPA 2019 70126 , "Office Action", dated Jun. 6, 2019, 8 pages (of-record in parent application).
DKPA201970048 , "Office Action", dated Aug. 19, 2019, 11 pages (of-record in parent application).
DKPA201970049 , "Office Action", dated Apr. 24, 2020 (of-record in parent application).
DKPA201970049 , "Office Action", dated Jul. 11, 2019, 8 pages (of-record in parent application).
EP16190175.6 , "Extended European Search Report", dated Mar. 15, 2017, 12 pages (of-record in parent application).
EP16190175.6 , "Notice of Decision to Grant", dated Aug. 22, 2019, 3 pages (of-record in parent application).
EP16190175.6 , "Office Action", dated Oct. 31, 2018, 4 pages (of-record in parent application).
EP16190175.6 , "Office Action", dated Mar. 21, 2018, 6 pages (of-record in parent application).
EP16190180.6 , "Extended European Search Report", dated Mar. 15, 2017, 11 pages (of-record in parent application).
EP16190180.6 , "Notice of Decision to Grant", dated Nov. 8, 2018, 3 pages (of-record in parent application).
EP16190180.6 , "Office Action", dated Feb. 13, 2018, 5 pages (of-record in parent application).
EP16190189.7 , "Extended European Search Report", dated Jun. 21, 2017, 13 pages (of-record in parent application).
EP16190189.7 , "Notice of Decision to Grant", dated Sep. 26, 2019, 3 pages (of-record in parent application).
EP16190189.7 , "Partial European Search Report", dated Mar. 16, 2017, 9 pages (of-record in parent application).
EP16190200.2 , "Extended European Search Report", dated Mar. 7, 2017, 13 pages (of-record in parent application).
EP16190200.2 , "Office Action", dated Jun. 8, 2018, 6 pages (of-record in parent application).
EP16190209.3 , "Extended European Search Report", dated Jul. 6, 2017, 11 pages (of-record in parent application).
EP16190259.8 , "Extended European Search Report", dated Mar. 15, 2017, 11 pages (of-record in parent application).
EP16190259.8 , "Office Action", dated Apr. 5, 2019, 5 pages (of-record in parent application).
EP16190259.8 , "Office Action", dated Mar. 16, 2018, 6 pages (of-record in parent application).

(56) References Cited

OTHER PUBLICATIONS

EP16190260.6, "Extended European Search Report", dated Jul. 6, 2017, 10 pages (of-record in parent application).
EP16190260.6, "Notice of Decision to Grant", dated May 16, 2019, 3 pages (of-record in parent application).
EP16190260.6, "Office Action", dated Oct. 17, 2018, 5 pages (of-record in parent application).
EP16190260.6, "Office Action", dated Apr. 13, 2018, 7 pages (of-record in parent application).
EP18209996.0, "Extended European Search Report", dated Mar. 1, 2019, 10 pages (of-record in parent application).
EP18209996.0, "Office Action", dated Mar. 3, 2020, 4 pages (of-record in parent application).
EP19156101.8, "Extended European Search Report", dated Mar. 28, 2019, 8 pages (of-record in parent application).
EP19156242.0, "Extended European Search Report", dated Mar. 19, 2019, 11 pages (of-record in parent application).
EP19156242.0, "Office Action", dated Apr. 24, 2020, 8 pages (of-record in parent application).
EP19170051.7, "Extended European Search Report", dated Jul. 1, 2019, 17 pages (of-record in parent application).
EP19170259.6, "Extended European Search Report", dated Jun. 28, 2019, 10 pages (of-record in parent application).
EP19170264.6, "Extended European Search Report", dated Oct. 23, 2019, 14 pages (of-record in parent application).
EP19179412.2, "Extended European Search Report", dated Mar. 13, 2020, 12 pages (of-record in parent application).
EP19179477.5, "Extended European Search Report", dated Oct. 15, 2019, 15 pages (of-record in parent application).
Hartmans, "These Beautiful Wireless Earbuds are a Worthy Alternative to Apple's AirPods", Business Insider, Available Online at: https://www.businessinsider.in/These-beautiful-wireless-earbuds-are-a-worthy-alternative-to-Apples-AirPods/articleshow/57561319.cms, dated Mar. 9, 2017, 18 pages (of-record in parent application).
Hoffman, "How to Automatically Run Programs and Set Reminders With the Windows Task Scheduler", Available Online at: http://www.howtogeek.com/123393/how-to-automatically-run-programs-and-set-reminders-with-the-windows-task-scheduler, Accessed from Internet on Jun. 11, 2019, 13 pages (of-record in parent application).
JP2016-186287, "Notice of Allowance", dated May 22, 2017, 4 pages (of-record in parent application).
JP2016-186288, "Notice of Decision to Grant", dated Feb. 26, 2018, 3 pages (of-record in parent application).
JP2016-186288, "Office Action", dated Nov. 6, 2017, 8 pages (of-record in parent application).
JP2016-186289, "Notice of Decision to Grant", dated May 1, 2018, 3 pages (of-record in parent application).
JP2016-186289, "Office Action", dated Jan. 9, 2018, 5 pages (of-record in parent application).
JP2016-186290, "Notice of Decision to Grant", dated Mar. 5, 2018, 3 pages (of-record in parent application).
JP2016-186290, "Office Action", dated Nov. 6, 2017, 8 pages (of-record in parent application).
JP2018-018945, "Notice of Decision to Grant", dated Mar. 5, 2018, 3 pages (of-record in parent application).
KR10-2016-0122143, "Notice of Decision to Grant", dated Mar. 27, 2018, 3 pages (of-record in parent application).
KR10-2016-0122143, "Office Action", dated Aug. 30, 2017, 5 pages (of-record in parent application).
KR10-2016-0122189, "Notice of Decision to Grant", dated Oct. 1, 2018, 2 pages (of-record in parent application).
KR10-2016-0122189, "Office Action", dated Feb. 5, 2018, 10 pages (of-record in parent application).
KR10-2016-0122237, "Notice of Decision to Grant", dated Nov. 9, 2017, 3 pages (of-record in parent application).
KR10-2016-0122237, "Office Action", dated May 22, 2017, 13 pages (of-record in parent application).
KR10-2016-0122269, "Notice of Decision to Grant", dated Nov. 8, 2017, 3 pages (of-record in parent application).
KR10-2016-0122269, "Office Action", dated May 22, 2017, 11 pages (of-record in parent application).
KR10-2016-0122287, "Notice of Decision to Grant", dated Jun. 20, 2018, 2 pages (of-record in parent application).
KR10-2016-0122287, "Office Action", dated Feb. 20, 2018, 5 pages (of-record in parent application).
KR10-2018-0017266, "Notice of Decision to Grant", dated Aug. 28, 2019, 3 pages (of-record in parent application).
KR10-2018-0017266, "Office Action", dated Apr. 17, 2018, 7 pages (of-record in parent application).
KR10-2018-0017266, "Office Action", dated Feb. 21, 2019, 8 pages (of-record in parent application).
KR10-2018-0169200, "Notice of Decision to Grant", dated May 30, 2019, 3 pages (of-record in parent application).
KR10-2018-0169200, "Office Action", dated Feb. 21, 2019, 5 pages (of-record in parent application).
KR10-2018-0169208, "Notice of Decision to Grant", dated Apr. 22, 2019, 3 pages (of-record in parent application).
KR10-2019-0106287, "Notice of Decision to Grant", dated Nov. 18, 2019, 2 pages (of-record in parent application).
KR10-2019-0125539, "Office Action", dated Jan. 4, 2020, 9 pages (of-record in parent application).
PCT/US2016/033972, "International Search Report and Written Opinion", dated Aug. 2, 2016, 14 pages (of-record in parent application).
PCT/US2016/035911, "International Search Report and Written Opinion", dated Jul. 27, 2016, 11 pages (of-record in parent application).
PCT/US2016/053580, "International Preliminary Report on Patentability", dated Apr. 12, 2018, 19 pages (of-record in parent application).
PCT/US2016/053580, "International Search Report and Written Opinion", dated Apr. 5, 2017, 26 pages (of-record in parent application).
PCT/US2016/053580, "Invitation to Pay Additional Fees and, Where Applicable, Protest Fee", dated Jan. 5, 2017, 8 pages (of-record in parent application).
TW105130920, "Notice of Decision to Grant", dated Oct. 23, 2018, 3 pages (of-record in parent application).
TW105130920, "Office Action", dated Feb. 23, 2018, 4 pages (of-record in parent application).
TW105130920, "Office Action", dated Oct. 23, 2017, 6 pages (of-record in parent application).
TW105130921, "Notice of Decision to Grant", dated Mar. 23, 2018, 3 pages (of-record in parent application).
TW105130921, "Office Action", dated Nov. 22, 2017, 13 pages (of-record in parent application).
TW105130923, "Notice of Decision to Grant", dated Mar. 27, 2018, 3 pages (of-record in parent application).
TW105130923, "Office Action", dated May 9, 2017, 6 pages (of-record in parent application).
TW105130923, "Office Action", dated Dec. 6, 2017, 7 pages (of-record in parent application).
TW105130924, "Notice of Decision to Grant", dated Jan. 22, 2018, 5 pages (of-record in parent application).
TW107108283, "Notice of Decision to Grant", dated Apr. 18, 2019, 5 pages (of-record in parent application).
TW107108283, "Office Action", dated Jan. 8, 2019, 4 pages (of-record in parent application).
TW108107046, "Notice of Decision to Grant", dated Sep. 26, 2019, 6 pages (of-record in parent application).
TW108107052, "Notice of Decision to Grant", dated Sep. 24, 2019, 6 pages (of-record in parent application).
TW108141597, "Office Action", dated Dec. 30, 2019, 15 pages (of-record in parent application).
Ugale et al., "A Location-Based Personal Task Reminder for Mobile Users in Wireless College Campus Environment (Indoor and Outdoor)", International Journal of Computer Techniques, vol. 2, Issue 1, Jan. 1, 2015, pp. 1-7 (of-record in parent application).
Final Office Action issued in U.S. Appl. No. 16/430,823, dated Jun. 16, 2020 in 18 pages.
Final Office Action issued in U.S. Appl. No. 16/430,853, dated Jun. 16, 2020 in 8 pages.

(56) References Cited

OTHER PUBLICATIONS

Non-Final Office Action issued in U.S. Appl. No. 16/882,020, dated Jul. 8, 2020 in 19 pages.
Office Action issued in China Application No. CN201610849747.3, dated Jun. 23, 2020 in 3 pages.
Office Action issued in China Application No. CN201810053066.5, dated Jul. 2, 2020 in 4 pages.
Office Action issued in China Application No. CN201910037290.X, dated Jul. 9, 2020 in 8 pages.
Office Action issued in China Application No. CN201910403980.2, dated Jun. 15, 2020 in 11 pages.
Office Action issued in China Application No. CN201910586994.2, dated Jun. 30, 2020 in 17 pages.
Office Action issued in Danish Application No. DKPA201970048, dated May 14, 2020 in 3 pages.
Office Action issued in European Application No. EP16190209.3, dated Jun. 17, 2020 in 5 pages.
Office Action issued in European Application No. EP19170051.7, dated Jun. 24, 2020 in 10 pages.
Office Action issued in European Application No. EP19170259.6, dated Jun. 24, 2020 in 8 pages.
First Examination Report issued in Indian Application No. IN201817006308, dated Jun. 29, 2020 in 7 pages.
Notice of Decision to Grant issued in Korean Application No. KR10-2020-0018789, dated Apr. 21, 2020 in 3 pages.
Office Action issued in Taiwan Application No. TW108141597, dated Apr. 15, 2020 in 3 pages.
Supplemental Notice of Allowability issued in U.S. Appl. No. 16/430,823, dated Oct. 30, 2020 in 2 pages.
Supplemental Notice of Allowability issued in U.S. Appl. No. 16/430,853, dated Oct. 30, 2020 in 2 pages.
Notice of Allowance issued in U.S. Appl. No. 16/882,020, dated Oct. 21, 2020 in 8 pages.
Office Action issued in U.S. Appl. No. CN201910037290.X, dated Nov. 2, 2020 in 6 pages.
Office Action issued in China Application No. CN201910403974.7, dated Oct. 14, 2020 in 19 pages.
Office Action issued in China Application No. CN201910586995.7, dated Oct. 13, 2020 in 11 pages.
Office Action issued in China Application No. CN201910587176.4, dated Nov. 3, 2020 in 5 pages.
Notice of Decision to Grant issued in European Application No. EP16190259.8, dated Oct. 22, 2020 in 3 pages.
Notice of Decision to Grant issued in European Application No. EP19156101.8, dated Oct. 22, 2020 in 3 pages.
Notice of Decision to Grant issued in Korean Application No. KR10-2020-0090119, dated Sep. 22, 2020 in 3 pages.
U.S. Appl. No. 16/430,853, "Notice of Allowance", dated Aug. 26, 2020, 7 pages.
AU2020201857, "First Examination Report", dated Jul. 20, 2020, 4 pages.
CN201610849747.3, "Notice of Decision to Grant", dated Sep. 3, 2020, 2 pages.
CN201811526338.5, "Office Action", dated Aug. 7, 2020, 6 pages.
CN201910042013.8, "Office Action", dated Jul. 24, 2020, 10 pages.
CN201910403979.X, "Office Action", dated Jul. 24, 2020, 22 pages.
CN201910587176.4, "Office Action", dated Aug. 3, 2020, 16 pages.
EP16190200.2, "Notice of Decision to Grant", dated Jul. 16, 2020, 3 pages.
EP19170264.6, "Office Action", dated Sep. 1, 2020, 8 pages.
TW108138635, "Office Action", dated Aug. 10, 2020, 8 pages.
Office Action issued in Brazil Application No. BR112018003113-5, dated Sep. 22, 2020 in 7 pages.
Notice of Allowance issued in U.S. Appl. No. 16/430,823, dated Sep. 22, 2020 in 13 pages.
Supplemental Notice of Allowability issued in U.S. Appl. No. 16/430,823, dated Nov. 18, 2020 in 2 pages.
Office Action issued in Korean Application No. KR10-2019-0125539, dated Nov. 10, 2020 in 8 pages.
Corrected Notice of Allowability issued in U.S. Appl. No. 16/882,020, dated Nov. 20, 2020 in 2 pages.
Supplemental Notice of Allowability issued in U.S. Appl. No. 16/430,823, dated Dec. 23, 2020 in 2 pages.
Supplemental Notice of Allowability issued in U.S. Appl. No. 16/430,853, dated Nov. 27, 2020 in 2 pages.
Corrected Notice of Allowability issued in U.S. Appl. No. 16/882,020, dated Dec. 16, 2020 in 2 pages.
Second Examination Report issued in Australia Application No. AU2020201857, dated Jan. 8, 2021 in 4 pages.
Office Action issued in China Application No. CN201610849639.6, dated Jan. 20, 2021 in 7 pages.
Notice of Decision to Grant issued in China Application No. CN201910042013.8, dated Jan. 13, 2021 in 2 pages.
Office Action issued in China Application No. CN201910586994.2, dated Jan. 14, 2021 in 16 pages.
Office Action issued in Danish Application No. DKPA201970048, dated Jan. 14, 2021 in 3 pages.
Article, "Halbach Array", Wikipedia, Available Online at: https://web.archive.org/web/20100418084001/http://en.wikipedia.org/wiki/Halbach array, dated Apr. 18, 2010 in 6 pages.
Notice of Allowance issued in Britain Application No. BR112018003113-5, dated Jan. 26, 2021 in 1 page.
Office Action issued in European Application No. EP19170259.6, dated Feb. 9, 2021 in 7 pages.
Notice of Decision to Grant issued in Taiwan Application No. TW108138635, dated Jan. 29, 2021 in 3 pages.
Notice of Decision to Grant issued in China Application No. CN201910037290.X, dated Mar. 25, 2021 in 2 pages.
Office Action issued in China Application No. CN201910403980.2, dated Mar. 3, 2021 in 5 pages.
Office Action issued in China Application No. CN201910586995.7, dated Mar. 26, 2021 in 8 pages.
Office Action issued in Danish Application No. DKPA201970049, dated Mar. 11, 2021 in 3 pages.
Office Action issued in Danish Application No. DKPA201970126, dated Mar. 15, 2021 in 4 pages.
Office Action issued in China Application No. CN201910403974.7, dated Apr. 9, 2021 in 5 pages.

* cited by examiner

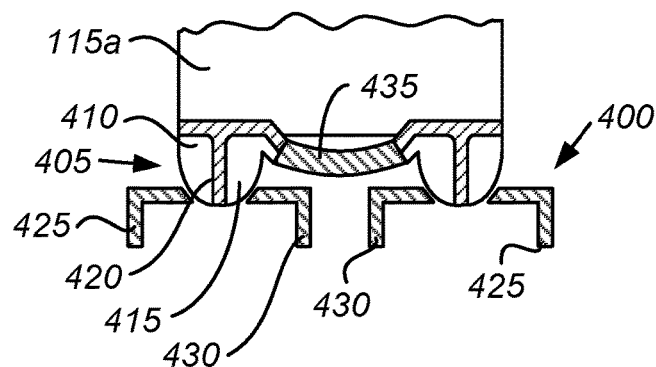
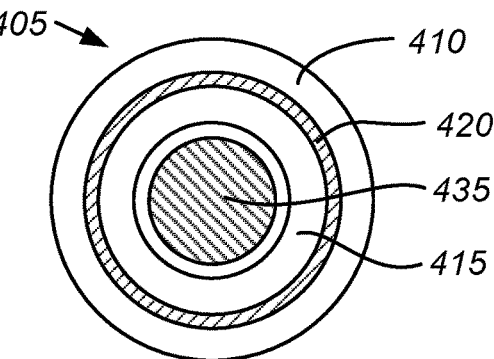
FIG. 4A　　　　FIG. 4B
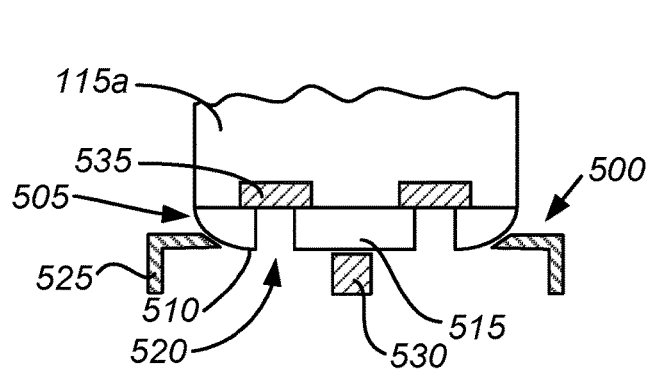
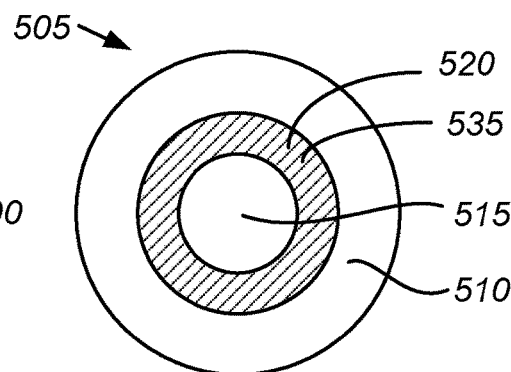
FIG. 5A　　　　FIG. 5B

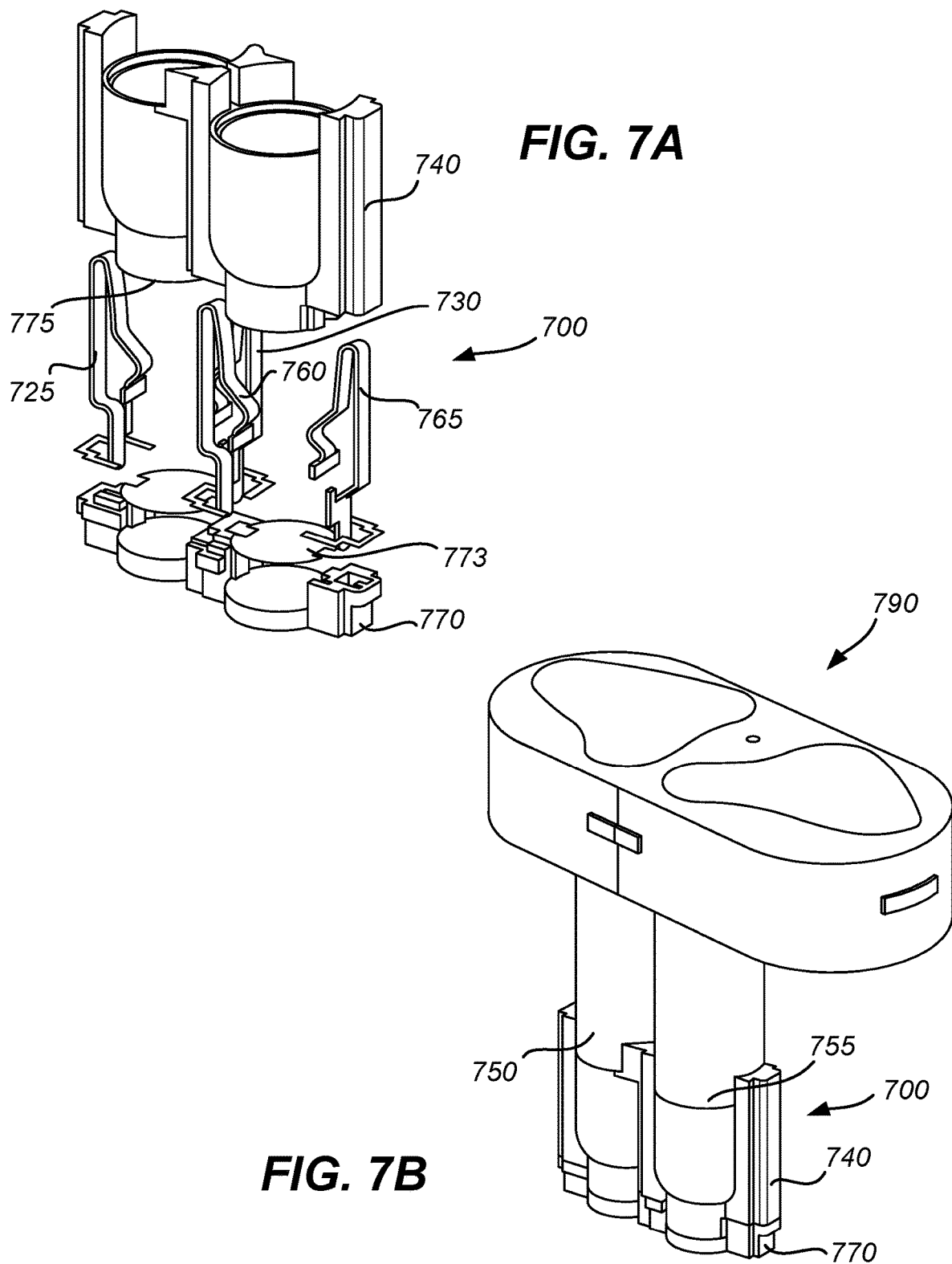

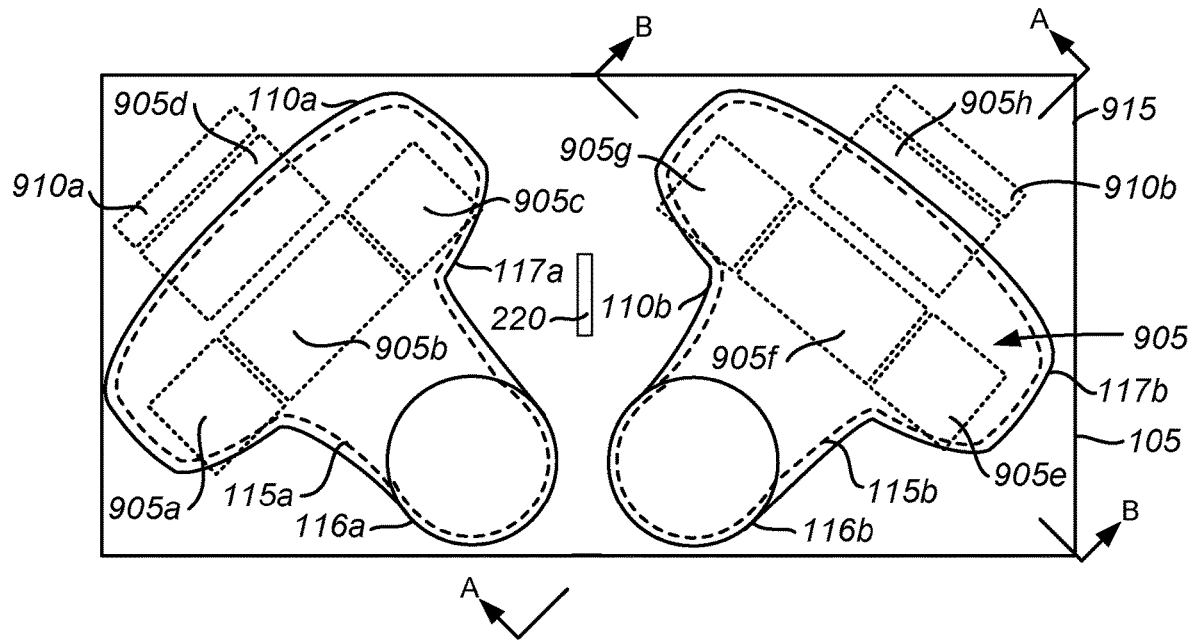
FIG. 10
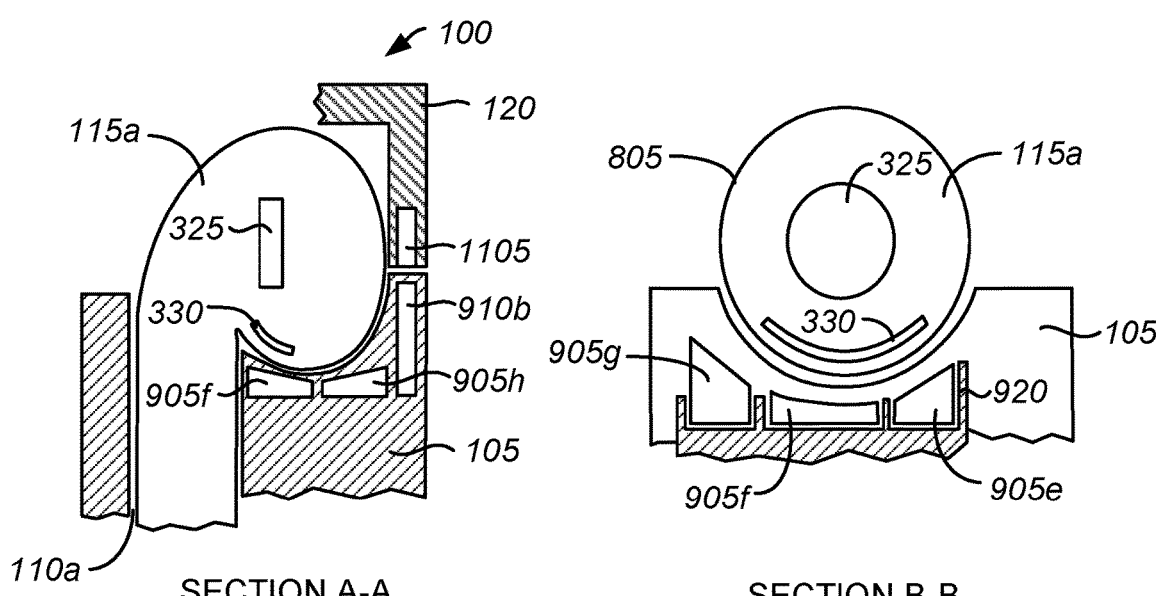
SECTION A-A
FIG. 11
SECTION B-B
FIG. 12

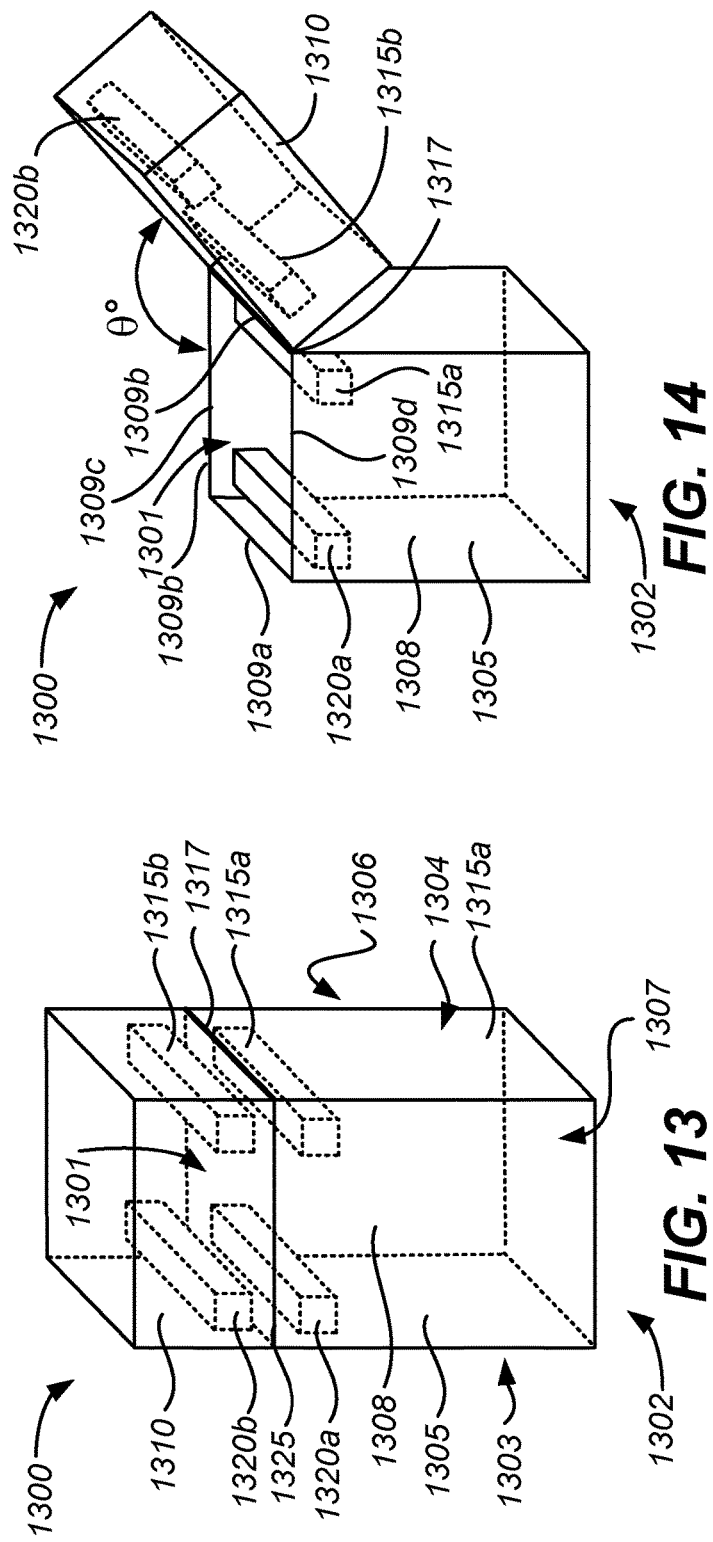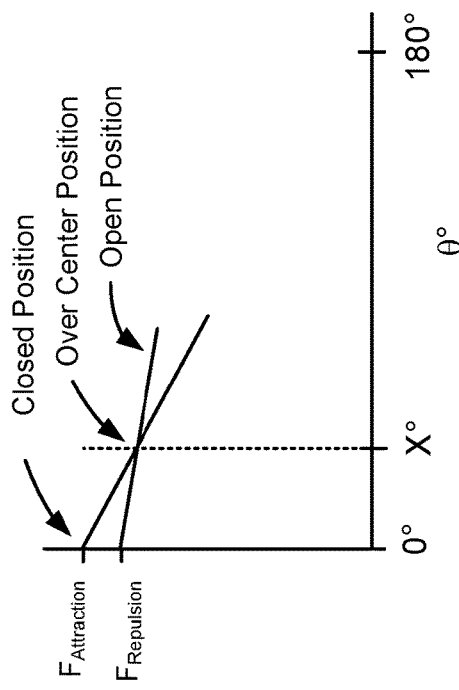
FIG. 14
FIG. 13
FIG. 15

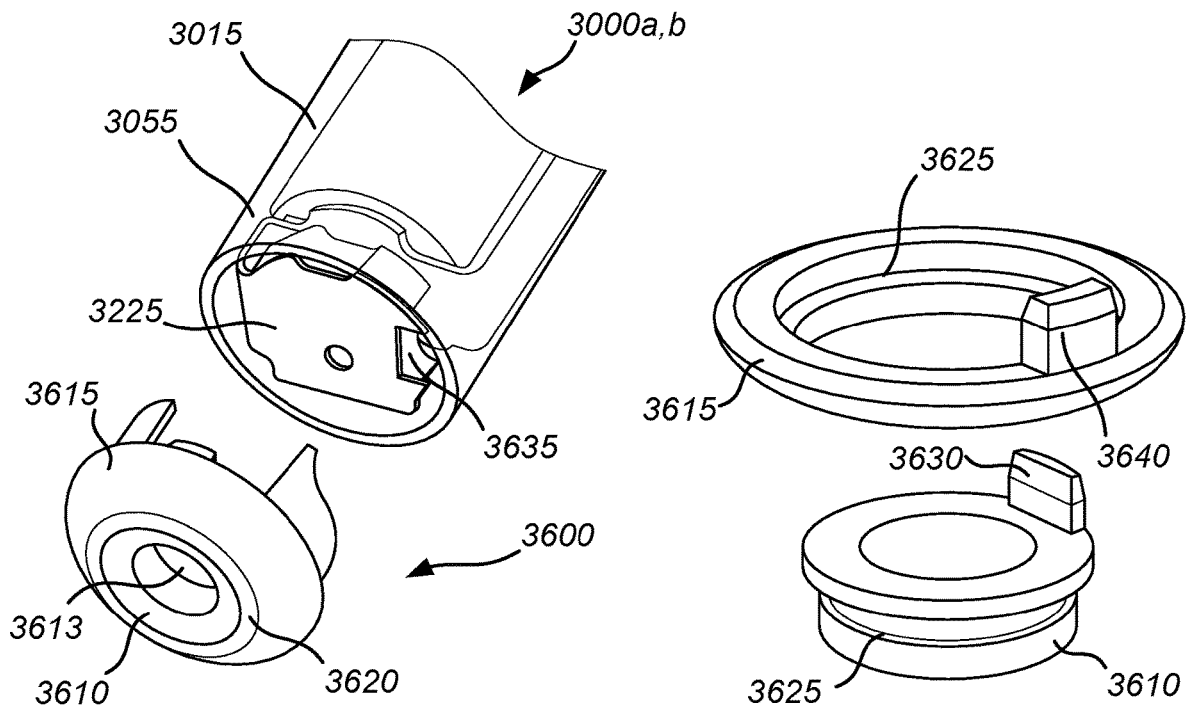
FIG. 36
FIG. 37
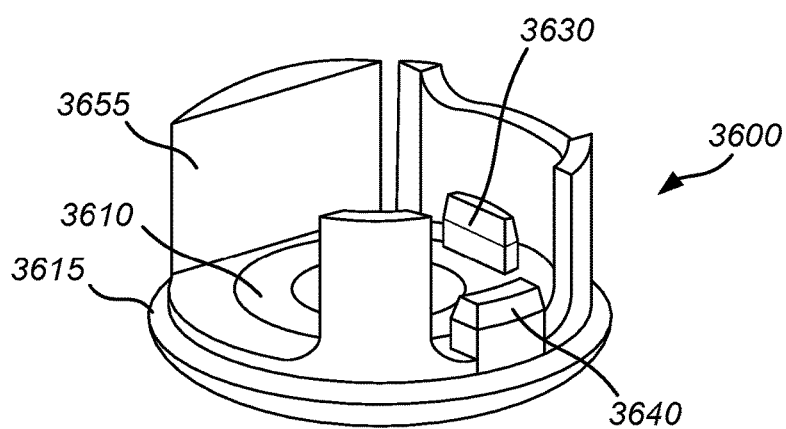
FIG. 38

PORTABLE LISTENING DEVICE WITH SENSORS

CROSS REFERENCE TO RELATED APPLICATIONS

This application is a Continuation of U.S. patent application Ser. No. 16/430,853, for "WIRELESS EARBUD" filed Jun. 4, 2019, which is a Continuation of U.S. patent application Ser. No. 15/273,683, for "EARBUDS WITH ACOUSTIC INSERT" filed Sep. 22, 2016, which claims priority to U.S. Provisional Patent Application Ser. No. 62/235,205, for "EARBUD CASE WITH CHARGING SYSTEM" filed on Sep. 30, 2015, to U.S. Provisional Patent Application Ser. No. 62/235,213, for "CASE WITH MAGNETIC OVER-CENTER MECHANISM" filed on Sep. 30, 2015, to U.S. Provisional Patent Application Ser. No. 62/235,219, for "MAGNETIC RETENTION OF EARBUD WITHIN CAVITY" filed on Sep. 30, 2015, to U.S. Provisional Patent Application Ser. No. 62/235,226, for "CASE WITH INDUCTIVE CHARGING SYSTEM" filed on Sep. 30, 2015 and to U.S. Provisional Patent Application Ser. No. 62/384,114, for "CASE FOR CHARGING AND RETAINING PORTABLE LISTENING DEVICES" filed on Sep. 6, 2016, each of which is hereby incorporated by reference in its entirety for all purposes.

This application is related to the following concurrently filed and commonly assigned U.S. nonprovisional patent applications:
U.S. nonprovisional patent application Ser. No. 15/273,671, Filed Sep. 23, 2016, "EARBUD CASE WITH CHARGING SYSTEM"; U.S. nonprovisional patent application Ser. No. 15/273,675, Filed Sep. 23, 2016, "CASE WITH MAGNETIC OVER-CENTER MECHANISM; U.S. nonprovisional patent application Ser. No. 15/273,677, Filed Sep. 23, 2016, "EARBUD CASE WITH WIRELESS RADIO SHUTDOWN FEATURE"; U.S. nonprovisional patent application Ser. No. 15/273,685, Filed Sep. 23, 2016, "WIRELESS PAIRING OF EARBUDS AND CASE"; U.S. nonprovisional patent application Ser. No. 15/273,687, Filed Sep. 23, 2016, "EARBUD CASE WITH RECEPTACLE CONNECTOR FOR EARBUDS"; U.S. nonprovisional patent application Ser. No. 15/273,690, Filed Sep. 23, 2016, "WIRELESS EARBUDS WITH ELECTRONIC CONTACTS"; U.S. nonprovisional patent application Ser. No. 15/273,691, Filed Sep. 23, 2016, "MAGNETIC RETENTION OF EARBUD WITHIN CAVITY"; U.S. nonprovisional patent application Ser. No. 15/273,693, Filed Sep. 23, 2016, "CASE WITH INDUCTIVE CHARGING TRANSMITTER TO CHARGE A PORTABLE DEVICE"; U.S. nonprovisional patent application Ser. No. 15/273,694, Filed Sep. 23, 2016, "WATERPROOF RECEPTACLE CONNECTOR"; U.S. nonprovisional patent application Ser. No. 15/273,696, Filed Sep. 23, 2016, "EARBUDS WITH CAPACITIVE TOUCH SENSOR"; U.S. nonprovisional patent application Ser. No. 15/273,698, Filed Sep. 23, 2016, "CASE WITH TORSION SPRING OVER-CENTER MECHANISM"; each of which is hereby incorporated by reference in its entirety for all purposes.

BACKGROUND

The described embodiments relate generally to portable listening devices such as earbuds and other types of headphones, and to cases for storing and charging such devices.

Portable listening devices can be used with a wide variety of electronic devices such as portable media players, smart phones, tablet computers, laptop computers, stereo systems and other types of devices. Portable listening devices have historically included one or more small speakers configured to be place on, in, or near a user's ear, structural components that hold the speakers in place, and a cable that electrically connects the portable listening device to an audio source. Other portable listening devices can be wireless devices that do not include a cable and instead, wirelessly receive a stream of audio data from a wireless audio source.

While wireless portable listening devices have many advantages over wired devices, they also have some potential drawbacks. For example, wireless portable listening devices, typically require one or more batteries, such as a rechargeable battery, that provides power to the wireless communication circuitry and other components of the device. Single use batteries need to be replaced when their charge is depleted while rechargeable batteries need to be periodically recharged. Also, if the portable wireless listening device is a pair of wireless earbuds, the earbuds can be relatively small and easy to lose when not in use. Further, achieving high-end acoustic performance from the relatively small earbuds can challenge manufacturers due to the reduced amount of space available within each earbud.

SUMMARY

Some embodiments of the present disclosure relate to a case that can store and charge a portable listening device, such as a pair of wireless earbuds or other types of headphones. In various embodiments the case can include one or more features that can improve the user experience associated with using the case and the portable listening device. For example, some embodiments of the disclosure pertain to a case for wireless earbuds that includes a detector that detects if the earbuds are stored in the case along with a detector that detects if a lid of the case is opened or closed. Circuitry within the case can use information from the detectors to improve the user experience associated with charging the earbuds, pairing the earbuds to a host device, such as a portable media player or other source of an audio signal, and/or turning one or more features of the earbuds off to extend the life of any battery used to power the earbuds.

In other embodiments, a case for a portable listening device can include a lid that, when closed, encloses the listening device within the case and when open exposes the stored listening device so that a user can remove the listening device from the case. The lid can be pivotably coupled to a housing of the case with a bi-stable hinge with an over center configuration where the lid is in a stable position when it is either closed or fully open and is unstable at positions in between such that the lid tends to move to the open or closed position. The bi-stable operation of the lid can provide a positive user experience in opening and closing the lid as the lid moves easily, and with minimal effort, between closed and fully open positions. In other embodiments a case for a portable listening device can be configured to magnetically attract and retain the listening device within the case. Still other embodiments facilitate the pairing of a wireless portable listening device with a host device and/or automatically turn OFF the wireless radio of a wireless portable listening device when the device is stored and fully enclosed within the case and automatically turn ON the wireless radio upon opening the case lid. Various embodiments of the disclosure can include all of the above features together or just some of the features.

In some embodiments a case for transporting and charging a portable listening device that includes a rechargeable battery and a power contact is provided. The portable listening device case can include a housing configured to receive the portable listening device; a lid attached to the housing and operable between a closed position where the lid conceals the listening device within the case and an open position where the lid is displaced from the housing such that a user can remove the listening device from the case; a detector configured to generate a detect signal when the listening device is placed in the housing; and charging circuitry configured to initiate charging of the rechargeable battery in response to receiving the detect signal.

In some embodiments a case for a pair of earbuds includes a housing having one or more cavities configured to receive the pair of earbuds; a lid attached to the housing and operable between a closed position where the lid is aligned over the one or more cavities and an open position where the lid is displaced from the one or more cavities; and a charging system. The charging system can include a case battery; an earbud detector configured to detect when an earbud is placed in the one or more cavities; and charging circuitry configured to initiate charging of the earbud when the earbud detector detects that the earbud is inserted into the one or more cavities. The one or more cavities can include a first cavity configured to receive a first earbud in the pair of earbuds and a second cavity sized and shaped to receive a second earbud in the pair of earbuds. The earbud detector can include a first earbud sensor configured to detect when the first earbud is placed in first cavity and a second earbud sensor configured to detect when the second earbud is placed in the second cavity.

In some embodiments a case for a pair of earbuds, each earbud having an ear interface portion, a stem, an earbud battery and a wireless radio is provided. The case can include: a housing having a first cavity configured to receive a first earbud in the pair of earbuds and a second cavity configured to receive a second earbud in the pair of earbuds; a lid attached to the housing and operable between a closed position where the lid conceals the earbuds within the case and an open position that allows a user to remove the earbuds from the case; and a charging system. The charging system can include a case battery; a first connector configured to interface to a power source for charging the case battery; a second connector configured to couple to each of the first and second earbuds, the second connector having at least one contact positioned in the first cavity and at least one contact positioned in the second cavity; an earbud detector configured to detect when an earbud is placed in either of the first or second cavities; and charging circuitry configured to initiate charging of an earbud battery when the earbud detector detects insertion of an earbud within either the first cavity or the second cavity and configured to cease charging the earbud when the earbud detector detects an earbud is removed from the cavity.

Some embodiments of the disclosure pertain to a case that can be used to store a portable listening device or another type of electronic device. The case can include: a housing having a cavity to receive the electronic device and a receiving opening that communicates with the receiving opening; a lid secured to housing with a pivotable joint, the lid being operable between an open position in which the receiving opening is exposed and a closed position in which the lid covers the receiving opening; and a plurality of magnetic elements disposed within the housing and the lid, the plurality of magnetic elements configured to create an over center position for the lid such that the lid resists rotating from the open position to the closed position until the lid is moved past the over center position when the lid is then attracted to the closed position.

In some embodiments a case for a portable listening device is provided. The case can include: a housing having a cavity to receive the listening device; a lid attached to the housing with a pivotable joint allowing the lid to rotate between a closed position where the lid is aligned over the cavity and an open position where the lid is angularly displaced allowing the listening device to be removed from the cavity; and a plurality of magnetic elements disposed within the housing and the lid, the plurality of magnetic elements configured to secure the lid in the closed position and to resist the lid moving from the open position to the closed position. The plurality of magnetic elements can include a first pair of magnetic elements configured to repel each other and a second pair of magnetic elements configured to attract each other. The first pair of magnetic elements can include a first magnet positioned in the lid adjacent to the pivotable joint and a second magnet positioned in the housing adjacent to the pivotable joint and oriented to repel the first magnet. The second pair of magnetic elements can include a first magnetic element positioned in the lid opposite the pivotable joint and a second magnetic element positioned in a housing wall opposite the pivotable joint and oriented to attract the first magnetic element. In some instances both of the magnetic elements of the second pair of magnetic elements are magnets. In some instances one of the magnetic elements of the second pair of magnetic elements is a magnet and the other magnetic element is a magnetic material.

In some embodiments, a case for a portable listening device includes: a housing having a cavity to receive the listening device and a receiving opening that communicates with the cavity; a lid secured to housing with a pivotable joint, the lid being operable between an open position in which the receiving opening is exposed and a closed position in which the lid covers the receiving opening; a first magnetic element located in the lid proximate the pivotable joint and oriented to repel a second magnetic element located in the housing proximate the pivotable joint; and a third magnetic element located in the lid at a distal end of the lid opposite the pivotable joint and oriented to attract a fourth magnetic element located in the housing at a distal end of the housing opposite the pivotable joint; wherein the first, second, third and fourth magnetic elements cooperate to define an over center position for the lid disposed between the open position and the closed position such that that the lid resists rotating from the open position to the closed position until the lid is moved past the over center position where the lid is impelled to the closed position.

Some embodiments pertain to a case for a portable listening device having a wireless radio where the case includes: a housing having a cavity configured to receive the portable listening device; a lid attached to the housing and operable between a closed position where the lid conceals the portable listening device within the case and an open position where the lid is displaced from the housing such that a user can remove the portable listening device from the case; a lid sensor to detect if the lid is in the closed position or the open position; and circuitry configured to turn ON the wireless radio when the lid sensor detects that the lid is moved from the closed position to the open position. The lid sensor can generate an open signal when the lid moves from a closed position to an open position, and the circuitry can be configured to turn ON the wireless radio in response to the open signal. In some instances the case can further include an electrical connector having a first contact positioned within the cavity to electrically connect to a second contact on the portable listening device when the portable listening device is received within the cavity, and the case the circuitry can turn ON the wireless radio in the portable listening device by sending an instruction to the portable listening device over the first contact.

In some embodiments a case for a portable listening device having a wireless radio includes: a housing having a cavity configured to receive the portable listening device; a lid attached to the housing and operable between a closed position where the lid conceals the portable listening device within the case and an open position where the lid is displaced from the housing such that a user can remove the portable listening device from the case; a device detector configured to detect when the portable listening device is placed in the cavity; a lid sensor to detect if the lid is in the closed position or the open position; and circuitry configured to turn OFF the wireless radio when the lid sensor detects that the lid is moved from the open position to the closed position. The lid sensor can generate a close signal when the lid moves from an open position to a closed position, and the circuitry can be configured to turn OFF the wireless radio in response to the close signal. In some instances the case can further include an electrical connector having a first contact positioned within the cavity to electrically connect to a second contact on the portable listening device when the portable listening device is received within the cavity, and the case the circuitry can turn OFF the wireless radio in the portable listening device by sending an instruction to the portable listening device over the first contact.

In some embodiments a case for a pair of earbuds can include: a housing having a first cavity configured to receive a first earbud in the pair of earbuds and a second cavity configured to receive a second earbud in the pair of earbuds; a lid attached to the housing and operable between a closed position where the lid conceals the earbuds within the case and an open position that allows a user to remove the earbuds from the case; a lid sensor to detect if the lid is in the closed position or the open position; a case battery; circuitry configured charge an earbud battery within each earbud; and circuitry configured to turn ON a wireless radio in an earbud when the lid sensor detects that the lid is moved from the closed position to the open position and to turn OFF the wireless radio in an earbud when the lid sensor detects that the lid is moved from the open position to the closed position. In some embodiments, the lid sensor can generate an open signal when the lid moves from a closed position to an open position and generate an close signal when the lid moves from an open to a closed position, and the circuitry included within the case can be configured to turn ON the wireless radio in response to the open signal and to turn OFF the wireless radio in response to the close signal. In various embodiments the case can further include a device detector that detects when a portable listening device is received within the cavity, and circuitry within the case can be configured to only send instructions to the portable listening device to turn the wireless radio ON or OFF if the device detector detects that the portable listening device is received within the cavity. In various examples, the lid sensor can be a Hall-effect sensor.

Some embodiments of the disclosure pertain to an earbud that includes: a housing having a non-occluding ear portion; a directional sound port disposed in the non-occluding ear portion; a driver assembly positioned within the housing having a front volume disposed in front of the driver assembly and a back volume disposed behind the driver assembly; and an acoustic insert positioned within the housing behind the driver assembly and attached to an interior surface of the housing such that the acoustic insert and the housing form a bass channel that is routed from the back volume to a multiport vent within the housing. The acoustic insert can include a recess defined by raised weld regions that are acoustically bonded to the interior surface of the housing. In some instances the recess within the acoustic insert forms three walls of the bass channel and the housing forms a fourth wall of the bass channel. The acoustic insert can further include an aperture that couples the front volume to the multiport vent, and the bass channel and the aperture can be coupled to a multiport chamber that is vented through the multiport vent. In some examples the acoustic insert is formed from a carbon doped plastic that absorbs laser energy. In some examples, the earbud housing can be made from Acrylonitrile butadiene styrene (ABS) with a titanium dioxide pigment.]

An earbud according to some embodiments can include: a housing having an ear portion coupled to a stem; a cavity formed within the ear portion; a driver assembly positioned within the cavity and defining a front volume disposed in front of the driver assembly and a back volume disposed behind the driver assembly; an acoustic insert positioned within the cavity behind the driver assembly and attached to an interior surface of the housing; and a bass channel formed by the acoustic insert and the housing that is routed from the back volume to an external environment via a vent. The acoustic insert can include a recess defined by raised weld regions that are bonded to the interior surface of the housing. The acoustic insert can further include an aperture that couples the front volume to the external environment.

In some embodiments a method of forming an earbud is provided. The method can include: forming a housing having an interior surface and an exterior surface; forming an acoustic insert such that it has a recess defined by raised weld regions; inserting the acoustic insert within the housing such that the raised weld regions are disposed against the interior surface of the housing; and directing a laser through the housing such that it impinges the raised weld regions of the acoustic insert and welds the raised weld regions to the interior surface of the housing. In some instances the housing can be formed from a plastic that is substantially transparent to a wavelength of the laser, and the acoustic insert can be formed from a carbon doped plastic that absorbs laser energy.

In some embodiments a case for a pair of wireless earbuds having a wireless radio can include: a housing having a first cavity configured to receive a first earbud in the pair of earbuds and a second cavity configured to receive a second earbud in the pair of earbuds; a lid attached to the housing and operable between a closed position where the lid conceals the earbuds within the case and an open position that allows a user to remove the earbuds from the case; a connector configured to couple to each of the first and second earbuds, the connector having a first contact positioned in the first cavity and a second contact positioned in the second cavity; a lid sensor configured to generate a detect signal when the lid is moved from a closed position to an open position; and circuitry coupled to the first or second contacts and configured to, in response to the detect signal, send one or more signals to the pair of wireless earbuds to turn ON the wireless radio and to initiate pairing of the pair of wireless earbuds to an electronic device. The circuitry can include a processor operatively coupled to a computer-readable memory that stores instructions that can be executed by the processor to send the one or more signals. The connector can include a first power contact for the first earbud of the pair of wireless earbuds and a second power contact for the second earbud of the pair of wireless earbuds, and each of the first and second power contacts can be configured to transmit both power and data to the first earbud and the second earbud, respectively.

In some embodiments a case for a portable listening device that includes a wireless radio can include: a housing having a receiving area for the portable listening device; a lid attached to the housing and operable between a closed position where the lid conceals the portable listening device within the case and an open position that allows a user to remove the portable listening device from the receiving area; an electrical connector positioned within the receiving area, the electrical connector having one or more case electrical contacts that electrically connect to the one or more device electrical contacts when the portable listening device is received in the receiving area; an input device configured to generate a signal in response to a user-generated action; and a processor coupled to the input device and the electrical connector. The processor can be configured to receive the signal from the input device and, in response, send an instruction to the portable listening device through the electrical connector to initiate wireless pairing of the portable listening device to a host electronic device. In some instances the processor can be further configured to receive send an instruction to the portable listening device through the electrical connector to turn ON its wireless radio in response to receiving the signal from the input device prior to sending an instruction to the portable listening device to initiate wireless pairing of the portable listening device to the host electronic device.

In various embodiments the portable listening device can be a pair (first and second) of wireless earbuds and the electrical connector can include a first contact for transmitting power to the first wireless earbud and a second contact for transmitting power to the second wireless earbud. Circuitry positioned within the housing can be configured to transmit data signals between the case and the first and second wireless earbuds over the first and second contacts, respectively, that are also used to charge the earbuds. The input device can include one or both of a lid sensor that is activated by a user moving the lid from the closed position to the open position and a depressible button on the case. In some instances where two or more different input devices are included, such as a lid sensor and a depressible button, the different input devices can generate different signals that are distinguishable by the processor and can be used by the processor to initiate different pairing procedures. The case can also include a rechargeable battery that is coupled to one or more case electrical contacts within the case that are configured to provide electrical charge to the first and second wireless earbuds to recharge a batteries within the earbuds.

In some embodiments a method of wirelessly pairing a first electronic device to a second electronic device is provided. The method can include: receiving an input from a user at a third electronic device, different than the first and second devices. In response to receiving the input, the third electronic device can communicate a user input signal to the first electronic device through a wired connection between the third and the first electronic devices. In response to the first electronic device receiving the user input signal, the first electronic device can broadcast a wireless pairing request, and in response to receiving the wireless pairing request, the second electronic device can wirelessly pair with the first device. In some instances, the first electronic device can be a wireless headphone set, the second electronic device can be a mobile electronic device and the third electronic device can be a case for the portable listening device. Also, in some embodiments where the third electronic device is a case for a portable listening device, the input from the user can be opening a lid of a case.

In some embodiments a case for a pair of earbuds is provided where each earbud has an ear portion and a stem portion with an electrical connector disposed at a distal end of the stem portion. The case can include: a housing; an insert positioned within the housing, the insert having first and second cavities sized and shaped to accommodate first and second earbuds, respectively, each of the first and second cavities having a receiving opening to receive an earbud into the cavity and a contact opening opposite the receiving opening; and a contact assembly attached to the insert, the contact assembly comprising a first pair of electrical contacts extending into the first cavity and a second pair of electrical contacts extending into the second cavity, the first and second pairs of electrical contacts configured to make electrical contact with the electrical connector disposed at the distal end of the first and second earbuds, respectively, through the contact opening. The insert can include first and second shells joined together, the first shell including the first cavity and the second shell including the second cavity. The case can further include a collar adhered to a top of the contact assembly and to a periphery of a distal end of each of the first and the second shells. The first and second pairs of electrical contacts can each have arcuate portions that are positioned by a contact carrier to couple to the electrical connector disposed at the distal end of the first and second earbuds.

In some embodiments an electrical connector assembly for an earbud charging system is provided. The electrical connector assembly can be configured to receive an earbud having an ear portion and a stem portion with an earbud connector disposed at a distal end of the stem portion. The electrical connector assembly can include: a shell having a receiving opening to receive the earbud in a stem-first orientation, a distal end opposite the receiving opening, and a contact opening proximate the distal end that opens to the receiving opening; a contact carrier formed from a dielectric material and coupled to the distal end of the shell, the contact carrier having a cavity sized to receive the distal end of the shell and a pair of contact receiving slots; and a pair of deflectable electrical contacts disposed within the pair of contact receiving slots, each deflectable electrical contact having a contact portion that extends through the contact opening of the shell.

In some embodiments a case for a pair of earbuds is provided where each earbud has an ear interface portion and a stem portion with an electrical connector disposed at a distal end of the stem portion. The case can include: a housing; an insert positioned within the housing, the insert having first and second earbud receiving cavities sized and shaped to accommodate first and second earbuds, respectively, each of the first and second receiving cavities having a receiving opening to receive an earbud into the receiving cavity in a stem-first orientation, a contact opening at an opposite end of the receiving opening; a contact carrier formed from a dielectric material and coupled to the insert, the contact carrier having first and second pairs of contact receiving slots disposed at a contact interface region and a debris recess configured to capture debris positioned between the first pair of contact receiving slots and a second debris recess disposed below the contact interface region and sized and shaped to capture debris; a first pair of deflectable electrical contacts disposed within first pair of contact receiving slots, each of the first pair of deflectable electrical contacts having a contact portion that extends into the first receiving cavity in the contact interface region; and a second pair of deflectable electrical contacts disposed within second pair of contact receiving slots, each of the second pair of deflectable electrical contacts having a contact portion that extends into the second receiving cavity in the contact interface region. In some instance the debris recess can include a first debris recess positioned between the first pair of contact receiving slots and a second debris recess positioned between the second pair of contact receiving slots. Each of the first and second earbud receiving cavities can include an elongated tube portion sized and shaped to accommodate the stem portion of an earbud and a larger earbud receiving opening sized and shaped to at least partially accommodate the ear interface portion. The contact portion of each of the deflectable electrical contacts can have a curved profile.

In some embodiments a wireless earbud is provided that includes: a housing having a stem portion aligned with a longitudinal axis, the stem portion including first and second ends; a speaker assembly having a driver unit and a directional sound port proximate the first end and offset from the longitudinal axis, wherein the driver unit is aligned to emit sound from the directional sound port and comprises a magnet, a voice coil, and a diaphragm; a rechargeable battery disposed in the housing; and first and second external contacts exposed at an external surface at the second end of the stem portion and electrically coupled to provide power to the rechargeable battery. The first and second external contacts can each have a partial annular shape and can be spaced in an oppositional and symmetrical relationship with each other. In some instances an outer perimeter of the first and second external contacts is flush with an exterior surface of the stem portion.

In some embodiments a wireless earbud includes: a housing having a stem portion aligned with a longitudinal axis, the stem portion including first and second ends; a speaker assembly having a driver unit and a directional sound port proximate the first end and offset from the longitudinal axis, wherein the driver unit is aligned to emit sound from the directional sound port and comprises a magnet, a voice coil, and a diaphragm; a rechargeable battery disposed in the housing; a first semicircular contact disposed at an external surface at the second end of the stem portion and electrically coupled to the rechargeable battery; and a second semicircular contact disposed at an external surface at the second end of the stem portion, the first and second partial annular contacts spaced in an oppositional and symmetrical relationship with each other.

In some embodiments a wireless earbud includes: a housing; a rechargeable battery disposed in the housing; a speaker assembly including a driver unit and a directional sound port, wherein the driver unit is aligned to emit sound from the directional sound port and comprises a magnet, a voice coil, and a diaphragm; and a plurality of contacts exposed at an external surface of the housing, each contact in the plurality of contacts including a conductive base having a binary metal alloy plated layer at an outer surface of each contact, the binary metal alloy plated layer comprising rhodium and ruthenium. In some instances, the weight percentage of rhodium is at least 85 percent, with the remainder in ruthenium.

Some embodiments of the disclosure pertain to a case for an earbud having one or more earbud magnetic components. The case can include: a receiving cavity sized and shaped to accept the earbud; one or more housing magnetic components disposed within the case and positioned and configured to magnetically attract and magnetically secure the earbud into the receiving cavity and the second earbud into the second receiving cavity; and a lid operable between an open position in which the receiving cavity is exposed and a closed position in which the lid covers the receiving cavity. The case can be configured to store a pair of earbuds and the receiving cavity includes a first receiving cavity sized and shaped to accept a first earbud in the pair of earbuds, and a second receiving cavity sized and shaped to accept a second earbud in the pair of earbuds. In some embodiments the one or more housing magnetic components can include a first plurality of magnetic components disposed around the first receiving cavity and configured to magnetically attract and magnetically retain the first earbud within the first receiving cavity, and a second plurality of magnetic components disposed around the second receiving cavity and configured to magnetically attract and magnetically retain the second earbud within the second receiving cavity.

In some examples the first plurality of magnetic components can include a first magnetic component positioned and configured to magnetically attract a speaker magnet in the first earbud and the second plurality of magnetic components can include a second magnetic component positioned and configured to magnetically attract a speaker magnet in the second earbud. In other examples the first plurality of magnetic components can include a first magnetic component positioned and configured to magnetically attract a magnetic plate disposed in an ear portion of the first earbud and the second plurality of magnetic components can include a second magnetic component positioned and configured to magnetically attract a magnetic plate disposed in an ear portion of the second earbud.

In some instances the first plurality of magnetic components can includes one or more magnetic components disposed around a portion of the first receiving cavity that accepts an ear interface portion of the first earbud and the second plurality of magnetic components can include one or more magnetic components disposed around a portion of the second receiving cavity that accepts an ear interface portion of the second earbud. In some instances the first plurality of magnetic components can include a first housing magnetic component arranged to attract a speaker magnet in the first earbud, and a second housing magnetic component arranged to attract a magnetic plate disposed within an ear portion of the first earbud; and the second plurality of magnetic components can include a third housing magnetic component arranged to attract a speaker magnet in the second earbud, and a fourth housing magnetic component arranged to attract a magnetic plate disposed within an ear portion of the second earbud. In some instances the first plurality of magnetic components includes a first set of magnetic components that form a first Halbach array to increase attractive forces for the first earbud and the second plurality of magnetic components includes a second set of magnetic components that form a second Halbach array to increase attractive forces for the second earbud. The first and second Halbach arrays can be configured to attract the first and the second earbuds into respective cavities and magnetically retain them within the cavities until they are removed by a user.

In some embodiments an earbud includes: a housing formed to fit at least partially within a user's ear; a directional sound port formed within the housing; a speaker assembly disposed within the housing and including a driver unit comprising a first magnet, the driver unit aligned to emit sound from the directional sound port; a magnetic retention component, separate from the speaker assembly, and positioned in the housing. The housing can have an ear portion and a stem portion, and the magnetic retention component can be disposed within the ear portion. The driver unit can include a diaphragm and a voice coil, and the first magnet can be operatively coupled to the voice coil to move the diaphragm in response to electrical signals and the magnetic retention component is not operatively coupled to the voice coil.

In some embodiments a wireless listening system is provided that includes a pair of wireless earbuds and a storage case for the pair of earbuds. Each wireless earbud can include: a housing formed to fit at least partially within a user's ear; a directional sound port formed within the housing; a speaker assembly disposed within the housing and including a driver unit comprising a first magnet, a diaphragm and a voice coil, and wherein the first magnet is operatively coupled to the voice coil to move the diaphragm in response to electrical signals, the driver unit aligned to emit sound from the directional sound port; and a magnetic retention component, separate from the speaker assembly, and positioned in the housing. The storage case can include: a first receiving cavity sized and shaped to accept a first earbud of the pair of earbuds; a second receiving cavity sized and shaped to accept a second earbud of the pair of earbuds; a plurality of housing magnetic components disposed within the case and positioned and configured to magnetically attract and magnetically secure the first earbud into the first receiving cavity and the second earbud into the second receiving cavity; and a lid operable between an open position in which the first and second receiving cavities are exposed and a closed position in which the lid covers the first and second receiving cavities. The plurality of housing magnetic components can include a first magnetic component positioned and configured to magnetically attract a speaker magnet in the first earbud and a second magnetic component positioned and configured to magnetically attract a speaker magnet in the second earbud. The plurality of housing magnetic components can further includes a third magnetic component positioned and configured to magnetically attract a magnetic plate disposed in an ear portion of the first earbud and a fourth magnetic component positioned and configured to magnetically attract a magnetic plate disposed in an ear portion of the second earbud.

In some embodiments a case for a portable listening device includes: a housing having one or more cavities configured to receive the portable listening device and an exterior charging surface; a lid attached to the housing and operable between a closed position where the lid is aligned over the one or more cavities and an open position where the lid is displaced from the one or more cavities; a battery; a first charging system configured to charge the portable listening device when positioned in the one or more cavities; and a second charging system including a transmitting coil positioned within the housing adjacent to the exterior charging surface, the transmitting coil configured to wirelessly transmit power to a power receiving coil of an electronic device positioned outside the housing adjacent to the exterior charging surface. In some embodiments the portable listening device can be a case for a pair of earbuds; the housing can include first and second cavities configured to receive first and second earbuds, respectively; and the first charging system can be configured to charge the first and second earbuds when the earbuds are positioned within the first and second cavities.

In some embodiments a case for a pair of earbuds is provided. Each earbud can include an ear interface portion, a stem, an earbud battery and a wireless radio. The case include: a housing having a first cavity configured to receive a first earbud in the pair of earbuds and a second cavity configured to receive a second earbud in the pair of earbuds; a lid operable between a closed position where the lid conceals the pair of earbuds within the case and an open position where the lid is displaced from the case such that a user can remove the earbuds from the case and first and second charging systems. The first charging system can include: a case battery; a wireless power receiving coil positioned within the housing, the wireless power receiving coil configured to wirelessly receive power from a wireless power source; a connector configured to couple to each of the first and second earbuds, the second connector having at least one contact positioned in the first cavity and at least one contact positioned in the second cavity; and charging circuitry operatively coupled to charge the case battery and provide power to the connector to charge the first and second earbuds from wireless power received over the wireless power receiving coil. The second charging system can include a transmitting coil positioned within the housing and configured to wirelessly transmit power to a power receiving coil of an auxiliary electronic device positioned adjacent the case. The case can further include an earbud detector configured to detect when an earbud is placed in either of the first or second cavities.

In some embodiments an electrical receptacle connector is disclosed that includes: a housing comprised of an electrically insulative polymer that extends between a receiving face and a rear face, the housing defining a cavity that communicates with an opening in the receiving face to receive a plug portion of a mating plug connector; a contact spacer positioned adjacent to the rear face; a gasket disposed between the rear face of the housing and the contact assembly; a plurality of contacts, each of the plurality of contacts having a tip positioned within the cavity, an anchor portion that anchors each contact to the contact spacer and a beam portion that connects the tip to the anchor portion; and a metallic bracket disposed around an outside surface of the housing.

In some other embodiments an electrical receptacle connector includes: a housing comprised of an electrically insulative polymer that extends between a receiving face and a rear face, the housing defining a cavity that communicates with a front opening in the receiving face to receive a plug portion of a mating plug connector and wherein the housing has a plurality of slots that form a portion of the cavity; a contact assembly including: (i) a contact spacer positioned adjacent to the rear face; (ii) a plurality of contacts, each of the plurality of contacts having a tip that extents into the cavity through one of the plurality of slots, an anchor portion coupled to the contact spacer, and a beam portion that connects the tip to the anchor portion; and (iii) a ground latch having first and second spring arms on opposing sides of the plurality of contacts; a gasket disposed between the rear face of the housing and the contact assembly; and a metallic bracket disposed around an outside surface of the housing and formed to secure the contact assembly to the housing.

Some embodiments pertain to an earbud including: a housing defining a cavity in which one or more electrical components of the earbud are housed, the housing having a touch sensitive region at an exterior surface of the housing and an interior surface within the cavity opposite the exterior surface; a capacitive sensor insert having a first surface with metallized circuitry formed thereon and positioned within the housing such that the first surface is adjacent the interior surface of the housing; an earbud processor disposed within the housing; and at least one conductor that electrically couples the capacitive sensor insert to the earbud processor. The capacitive sensor insert can be formed to closely match a shape of the housing. In some instances the metallized circuitry forms at least one self-capacitance sensor in which, when touched by a user, loads self-capacitance circuitry that can be detected. In other instances the metallized circuitry includes row and column electrodes that form at least one mutual-capacitance sensor in which, when touched by a user, mutual coupling between row and column electrodes is altered and detected. The capacitive sensor insert is formed from a plastic that includes metallic particulates.

In some embodiments an earbud includes: a housing that defines an enclosed cavity in which one or more electrical components of the earbud are housed, the earbud housing having a touch sensitive region at an exterior curved surface of the housing and an interior curved surface within the enclosed cavity opposite the exterior curved surface; a directional sound port formed within the housing; a speaker assembly disposed within the enclosed cavity and including a driver unit comprising a magnet, the driver unit aligned to emit sound from the directional sound port; a capacitive sensor configured to sense a user's touch on the touch sensitive region, the capacitive sensor including a sensor insert positioned within the enclosed cavity and one or more acoustic apertures aligned with the directional sound port, the sensor insert having a first surface adjacent to and contoured to match the interior curved surface, the first surface including metallized circuitry formed thereon and at least partially surrounding the acoustic aperture; and a processor coupled to the capacitive sensor and disposed within the enclosed cavity.

In some embodiments a case for a listening device includes: a housing having a cavity to receive the listening device; a lid attached to the housing with a pivotable joint allowing the lid to rotate between a closed position where the lid is aligned over the cavity and an open position where the lid is angularly displaced allowing the listening device to be removed from the cavity; and an over center mechanism for the lid including an extension attached to the lid and disposed on an opposite side of the pivotable joint from the lid, wherein the extension is in contact with an arm that resists the lid rotating from the open position to the closed position until the lid is moved past an over center position when the lid is then impelled to the closed position.

In some embodiments a case for an electronic device includes: a housing having a cavity to receive the electronic device and a receiving opening that communicates with the receiving opening; a lid secured to housing with a first pivotable joint, the lid being operable between an open position in which the receiving opening is exposed and a closed position in which the lid covers the receiving opening; and a spring loaded over center mechanism for the lid. The spring-loaded over-center mechanism can include: an extension coupled to the lid and having a rounded contact portion at a distal end; an arm coupled to the housing by a second pivotable joint, the arm extending between a first end attached to the second pivotable joint and a second end, opposite the first end, the arm having first and second surfaces extending between the first and second ends; and a torsion spring formed around the second pivotable joint such that it applies a torque to the arm forcing the arm against the rounded portion of the extension.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 4A is a partial cross-sectional view of an earbud connector according to an embodiment of the disclosure;

FIG. 4B is a plan view of the earbud connector illustrated in FIG. 4A;

FIG. 5A is a partial cross-sectional view of another embodiment of an earbud connector according to the disclosure;

FIG. 5B is a plan view of the earbud connector illustrated in FIG. 5A;

FIG. 7A is an isometric exploded view of another embodiment of an earbud connector according to the disclosure;

FIG. 7B is an isometric view of the assembled earbud connector illustrated in FIG. 7A;

FIG. 10 is a top view of the case shown in FIG. 1 with the case lid removed;

FIG. 11 is a partial cross-sectional view of an earbud retained in a cavity within the case illustrated in FIG. 10 along section A-A;

FIG. 12 is a partial cross-sectional view of an earbud retained in a cavity within the case illustrated in FIG. 10 along section B-B;

FIG. 13 is an isometric view of a case having an over center lid according to some embodiments of the disclosure;

FIG. 14 is an isometric view of the case shown in FIG. 13 with the over center lid in an open position;

FIG. 15 is a graph showing attraction and repulsion forces associated with an over center lid according to some embodiments of the disclosure;

FIG. 36 is an isometric view of a connector structure that can be included in the earbuds illustrated in FIGS. 30 and 31;

FIG. 37 is an isometric view of contacts for the connector structure illustrated in FIG. 36 according to some embodiments of the disclosure;

FIG. 38 is an isometric view of the contact structure illustrated in FIG. 36;

DETAILED DESCRIPTION

Figure 1:
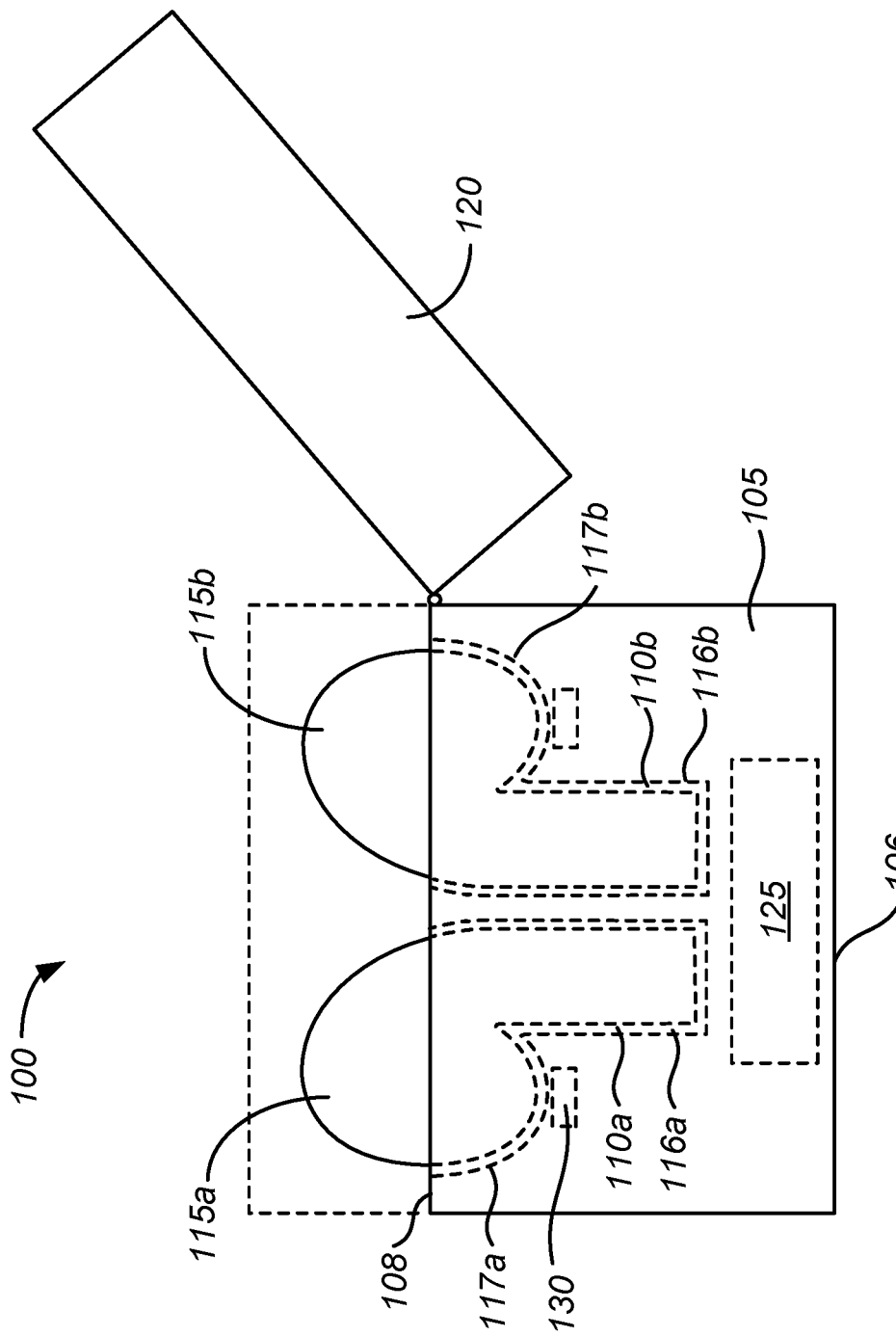
FIG. 1 is a side view of a case having a lid and configured to hold a pair of earbuds according to embodiments of the disclosure.

Some embodiments of the present disclosure relate to portable listening devices and cases for containing and/or charging such devices that have improved features that can improve the user experience associated with using the case and/or the portable listening device. While the present disclosure can be useful for a wide variety of portable listening devices, some embodiments of the disclosure are particularly useful for wireless earbuds and cases for wireless earbuds as described in more detail below.

For example, in some embodiments a pair of wireless earbuds are sized and shaped to fit within a case that can also include a rechargeable battery and charging circuitry. The pair of earbuds can be charged when an earbud detector within the case detects that the earbuds are placed within the case. Further the case can include sensors to detect if the lid is open such that the wireless radio within each earbud can be activated so they are ready for use by the user. Similarly, when the lid is closed the wireless radio can be shut off so the charge in the earbud batteries is conserved.

In another example the case can have a pairing button on it that is operable to place the earbuds in a pairing mode. In a further example the case can also have one or more charge indicator lights to inform the user of the charge level in the case battery as well as the charge level in each earbud.

In another example the case can have a lid with an over center configuration such that the lid is in a first stable position when in a closed position and is in a second stable position when in the open position, but is in an unstable position in-between the closed position and the open position. In some embodiments the over center configuration can be achieved by using two pairs of magnets while in other embodiments it can be achieved with a torsion spring. In further examples the case can have one or more magnets within it to attract the earbuds into cavities formed within the case and to retain them until a user removes them.

In another example the case can be liquid-tight to prevent liquid from damaging the internal circuitry. The electrical connections for both the earbud recharging and for recharging the case can be resistant to penetration by a liquid.

In another example the earbuds can have an acoustic insert that forms one or more acoustic ports such as a bass port vent and a rear vent that enable the internal speaker to provide audio performance in the confined space within the earbud housing.

In another example the earbud case can be used to initiate Bluetooth® pairing of the earbuds with a host device. In one embodiment a lid position sensor detects when the lid is open and initiates pairing of the earbuds.

In order to better appreciate the features and aspects of portable listening devices and their cases according to the present disclosure, further context for the disclosure is provided in the following section by discussing several particular implementations for earbuds and a case for earbuds according to embodiments of the present disclosure. The specific embodiments discussed are for example purposes only and other embodiments can be employed in other portable listening devices and cases that can be used for other portable listening devices as well as other devices.

As used herein, the term "portable listening device" includes any portable device designed to play sound that can be heard by a user. Headphones are one type of portable listening device, portable speakers are another. The term "headphones" represents a pair of small, portable listening devices that are designed to be worn on or around a user's head. They convert an electrical signal to a corresponding sound that can be heard by the user. Headphones include traditional headphones that are worn over a user's head and include left and right listening devices connected to each other by a headband, headsets (a combination of a headphone and a microphone); and earbuds (very small headphones that are designed to be fitted directly in a user's ear). Traditional headphones include both over-ear headphones (sometimes referred to as either circumaural or full-size headphones) that have earpads that fully encompass a user's ears, and on-ear headphones (sometimes referred to as supra-aural headphones) that have earpads that press against a user's ear instead of surrounding the ear. As used herein, the term "earbuds", which can also be referred to as earphones or ear-fitting headphones, includes both small headphones that fit within a user's outer ear facing the ear canal without being inserted into the ear canal, and in-ear headphones, sometimes referred to as canalphones, that are inserted in the ear canal itself.

Earbud Case

FIG. 1 depicts a simplified plan view of a case 100 for a pair of wireless earbuds according to some embodiments of the disclosure. As shown in FIG. 1, case 100 includes a housing 105, also called a body, having one or more cavities 110a, 110b configured to receive a pair of earbuds 115a, 115b. In some embodiments, cavities 110a, 110b can be positioned adjacent to each other on opposite sides of a center plane of case 100. Each cavity 110a, 110b can be sized and shaped to match that of its respective earbud 115a, 115b. Each cavity can include a stem section 116a, 116b and a bud section 117a, 117b. Each stem section 116a, 116b can be an elongated generally cylindrical cavity that extends from its respective bud section 117a, 117b towards a bottom 106 of case 100. Each bud section 117a, 117b can be offset from its respective stem section 116a, 116b and open at an upper surface 108 of housing 105. Embodiments of the disclosure are not limited to any particular shape, configuration or number of cavities 110a, 110b and in other embodiments cavities 110a, 110b can have different shapes to accommodate different types of earbuds, different configurations and/or can be a single cavity or more than two cavities.

Case 100 further includes a lid 120 attached to housing 105. Lid 120 is operable between a closed position where lid 120 is aligned over one or more cavities 110a, 110b fully enclosing pair of earbuds 115a, 115b within the housing, and an open position where the lid is displaced from the housing and cavities 110a, 110b such that a user can remove the earbuds from the cavities or replace the earbuds within the cavities. Lid 120 can be pivotably attached to housing 105 and can include a magnetic or mechanical system (not shown in FIG. 1) that provides lid 120 with a bi-stable operation, as described more fully below. In some embodiments case 100 can also include a charging system 125 configured to charge pair of earbuds 115a, 115b; one or more magnets 130 configured to orient and retain the pair of earbuds within one or more cavities 110a, 110b; and other features that are further described below.

Figure 2:
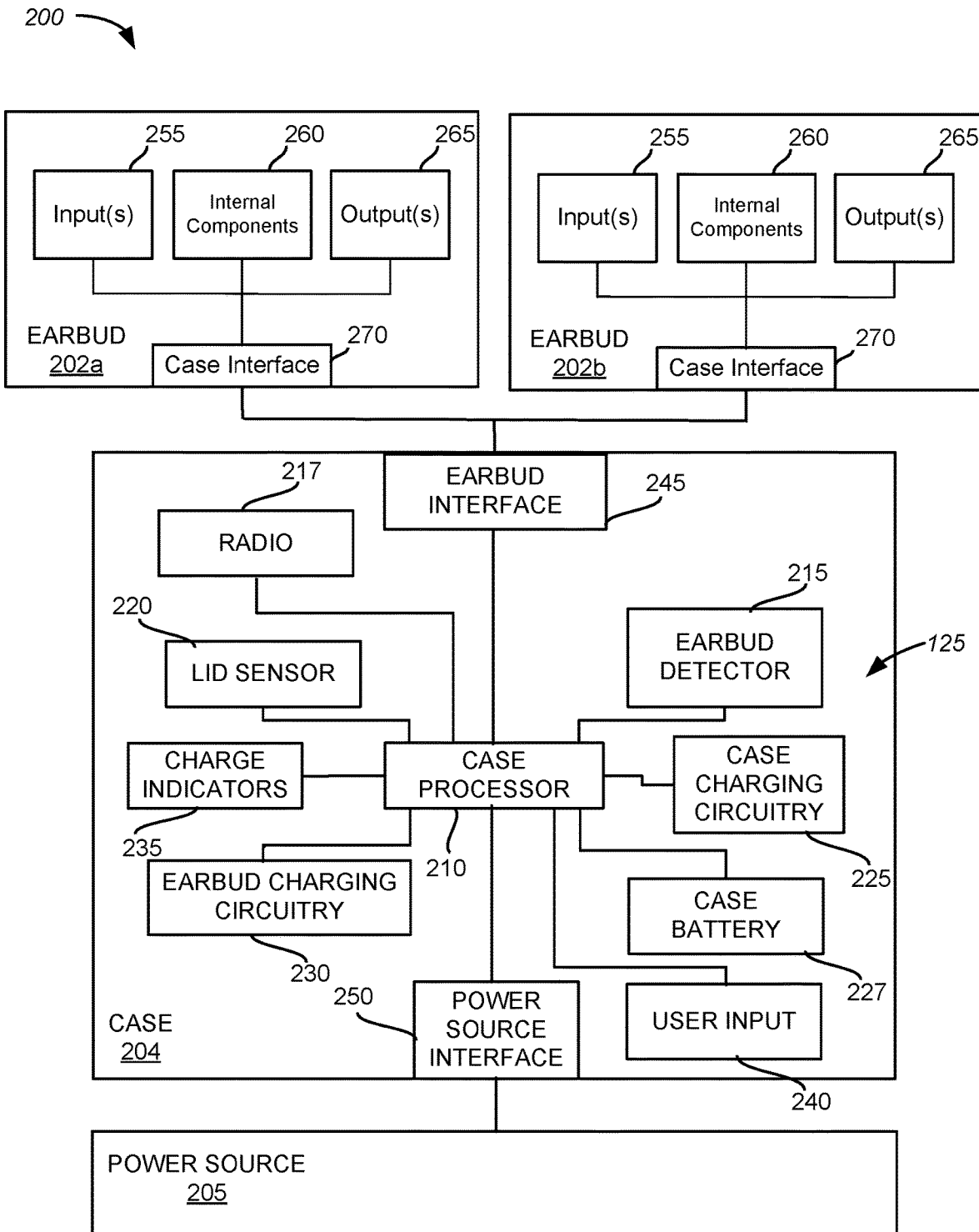
FIG. 2 is a system level diagram of a case with a charging system coupled to a pair of earbuds according to some embodiments of the disclosure.

FIG. 2 is a simplified block diagram of system 200 according to an embodiment of the present disclosure. System 200 can include pair of earbuds 202a, 202b, a case 204 for the pair of earbuds, and a power source 205 for charging the case. Earbuds 202a, 202b can be positioned within case 204 (e.g., within an interior space or cavity of the case defined by a housing or an insert within the housing) where they can be conveniently stored and charged. Case 204 can be representative of case 100 and earbuds 202a, 202b can be representative of earbuds 115a, 115b discussed above with respect to FIG. 1.

Each earbud 202a, 202b can each have one or more inputs 255, internal components 260 and one or more outputs 265. In some embodiments one or more inputs 255 can be a microphone input and one or more buttons or sensors that register a user's touch. In various embodiments an accelerometer or a capacitive sensor can be used as an input 255 and can be activated, for example, by a user to answer a call or command earbuds 202a, 202b to enter a pairing mode that can be indicated by a light on either or both earbuds. In various embodiments one or more internal components 260 can include a speaker, a microphone, a rechargeable battery, a processor, and/or other circuitry and components. In various embodiments one or more outputs 265 can be audio from a speaker, a light or other indicator. In some embodiments the indicator light can indicate an incoming call, a battery charge level, a pairing mode or other function.

In some embodiments each of earbuds 202a, 202b can include a wireless radio that can be both an input 255 and an output 265 device. The wireless radio can enable the earbuds to receive an audio signal from an audio player, such as a smart phone. In some embodiments one or more of earbuds 202a, 202b include a radio that can also transmit an audio signal such as a microphone signal from one or more of the earbuds. In yet further embodiments, one or more of earbuds 202a, 202b can include a radio that can transmit communication signals that can command the receiving device (e.g., a host device such as a smartphone) to perform one or more functions such as, but not limited to, connect a phone call, disconnect a phone call, pause audio playback, fast forward or rewind audio playback or mute a microphone signal. The wireless radio can employ any short range, low power communication protocol such as Bluetooth®, low power Bluetooth®, or Zigbee among protocols.

Case 204 can include a case processor 210, an earbud detector 215, radio 217, a lid sensor 220, case charging circuitry 225, a battery 227 and earbud charging circuitry 230. Case 204 can also include an earbud interface 245 that enables circuitry within case 204 to communicate with and/or charge earbuds 202a, 202b and power source interface 250 that couples the case to wired or wireless power source 205, such as an AC or DC power source or an inductive charging pad. In some embodiments, case charging circuitry 225, battery 227, earbud charging circuitry 230 and interfaces 245 and 250 are all representative components of charging system 125 shown in FIG. 1.

Power source interface 250 can be part of a receptacle connector for a micro USB connector, a Lightening connector or other connector that can provide power to earbud case 204. Alternatively, or in addition to a receptacle connector, power interface 250 can include a wireless power receiver, such as one or more wireless power receiving coils, that can receive inductive power from power source 205. Earbud interface 245 can transfer power and/or data between case 204 and the earbuds via power transfer interface 270 in each earbud. Earbud interface 245 can include an electrical connector, such as one of the connectors described herein with respect to FIGS. 4A-8C, a different type of electrical connector, or a wireless power transmitter, such as a wireless power transmitting coil that can transmit inductive power to an inductive power receiver within the earbuds.

Case processor 210 can be configured to control various functions of case 204 as described in more detail below. In some embodiments, earbud detector 215 includes one or more sensors that detect when one or both of earbuds 202a, 202b are placed within case 204. In one embodiment earbud detector 215 can be a circuit that periodically "pings" the earbud contacts within case 204 to determine if either earbud 202a, 202b is present. In other embodiments earbud detector 215 can be any type of mechanical or electrical sensor, such as, but not limited to, a magnetic sensor, an optical sensor, a switch, a hall effect sensor, a flux sensor, a capacitive sensor, a photodetector, a proximity detector, a momentary switch or any other type of sensor.

In embodiments where earbud detector 215 is a flux sensor, the flux sensor can be beneficial to minimizing power consumption of case 204. As an example, a flux sensor can be formed in case 204 for each earbud from a coil of wire and one or more magnets within earbuds 202a, 202b. Each flux sensor can be configured to generate a current in the coil of wire when an earbud is inserted or withdrawn from case 204 and the magnet within the earbud passes through the coil of wire. In a further example, a flux sensor can function as a completely passive sensor that requires no power to operate, and generates its own energy to notify processor 210 of the removal or replacement of either earbud 202a, 202b within case 204. In some embodiments a hall effect sensor can also be beneficial to minimize power consumption. In various embodiments, one or more sensors can be beneficial so that a voltage bias (e.g., a ping) need not be applied to the earbud connectors, thus mitigating contact corrosion and/or oxidation in moist environments.

In one example case 204 can include separate earbud receiving cavities within the case, such as cavities 110a, 110b described above, and earbud detector 215 can include first and second earbud detectors—one detector for each cavity. The first earbud detector can be operatively coupled to detect when an earbud (e.g., a left earbud) is inserted within a first of the cavities and the second earbud detector can be operatively coupled to detect when an earbud (e.g., a right earbud) is inserted within the other cavity. In other embodiments a single detector can detect when either earbud 202a, 202b is placed within case 204.

In response to detecting the insertion of an earbud within the case, earbud detector 215 can generate a detect signal that can be sent to and processed by other circuitry within case 204 to initiate charging of the buds. When earbud detector 215 includes first and second detectors that can detect the insertion of the left and right earbuds (or first and second earbuds that are interchangeable between the left and right ears), respectively, each earbud detector can generate a separate detect signal that can initiate charging of the detected earbud only.

Similar to initiating charging, earbud detector 215 can also be used to stop charging. For example, earbud detector 215 can detect when either or both of the earbuds are removed from the case and generate a removal signal that stops the charging of the removed earbud or earbuds.

In some embodiments earbud detector 215 can initiate the charging process of each earbud 202a, 202b when the earbud detector detects that electrical contact is made between the earbuds and corresponding charging contacts within the housing (e.g., within each cavity 110a, 110b). More specifically, in various embodiments earbud detector 215 can periodically "ping" the charging contacts to see if either or both earbuds 202a, 202b are present within each cavity 110a, 110b. Even if either or both earbuds 202a, 202b have zero battery charge they can still have a characteristic impedance or other electrical characteristic that enables earbud detector 215 to detect that they are connected to the charging contacts and initiate charging with earbud charging circuitry 230. The charging contacts and electrical connection between earbuds 202a, 202b and case 204 will be discussed in detail below. In some embodiments earbud detector 215 is part of processor 210 and the processor does the sensing. In other embodiments, earbud detector 215 is separate active/passive components. In various embodiments, case 204 does not include a case processor 210 and instead, circuitry comprising various active and/or passive components is configured to perform the functions described herein and attributed to the processor.

In some embodiments case processor 210 can communicate with pair of earbuds 202a, 202b by sending and receiving data through earbud interface 245 (and through case interface of either or both earbuds) and can communicate with power source 205 by sending and receiving data through power source interface 250. That is, in various embodiments earbud interface 245 and power source interface 250 can be capable of carrying both power and data signals for single or bidirectional communication. In some embodiments separate power and data contacts can be used while in various embodiments one set of contacts is used for both power and data. For example, in some embodiments power source 205 can be a computing device that communicates with power source interface 250 through an interface (not shown), such as a USB interconnect or a Lightning interconnect developed by Apple Inc. The interconnect can provide DC current to case battery 227 for charging and can provide bidirectional communication between case processor 210 and the computing device. In another example power source 205 can transmit firmware updates to both case processor 210 and pair of earbuds 202a, 202b through the same contacts that are used to charge the devices. Data communication between earbud interface 245 and pair of earbuds 202a, 202b can use a similar communication protocol as discussed above or any other protocol such as, for example, serial communications.

In some embodiments case 204 can include a wireless radio 217 that enables the case to transmit and receive data communications with earbuds 202a, 202b and a host device (e.g., a smartphone, a tablet computer, a laptop computer or the like) in addition to, or instead of, relying on data exchange through interfaces 245 and 250. For example, wireless radio 217 can be used to initiate a pairing sequence between earbuds 202a, 202b and a host device. In another example radio 217 can be used to receive a music download from a host device to be stored in case 204.

Lid sensor 220 can detect when a lid to the case (e.g., lid 120 shown in FIG. 1) is in the open position and when the lid is in the closed position. In some embodiments case processor 210 is coupled to lid sensor 220 and receives signals from the lid sensor indicating when the lid is opened and closed. More specifically, in some embodiments lid sensor 220 can generate and send an "open" signal to processor 210 upon detecting when the lid is opened, and lid sensor 220 can generate and send a "closed" signal to processor 210 upon detecting the closure of the lid. Processor 210 can be configured to communicate with pair of earbuds 202a, 202b to turn ON their wireless radios when the lid is in the open position (e.g., in response to receiving the "open" signal) so they are ready for use by a user and turn OFF their wireless radios when the lid is in the closed position (e.g., in response to receiving the "closed" signal) to conserve their power. In various embodiments lid sensor 220 can also trigger case processor 210 to enter a pairing mode when the case lid is opened, as explained in more detail below. In some embodiments case processor 210 can communicate with pair of earbuds 202a, 202b through earbud interface 245 and case interface 270 using a wired connection as discussed above, while in other embodiments case processor 210 can communicate with earbuds 202a, 202b through interfaces 245 and 270 wirelessly in addition to, or instead of, using a wired connection. In some embodiments lid sensor 220 can be any type of mechanical or electrical switch including, but not limited to, a momentary switch, a capacitive sensor, a magnetic sensor (e.g., hall effect) or an optical sensor.

Case battery 227 provides power for the circuitry associated with case 204 and can be a rechargeable battery that can be charged by power source 205 and enclosure charging circuitry 225 through power source interface 250. Case battery 227 is also coupled to earbud interface 245 and can charge pair of earbuds 202a, 202b in conjunction with earbud charging circuitry 230. In some embodiments earbud charging circuitry 230 can charge pair of earbuds 202a, 202b anytime they are properly stored within cavities 110a, 110b even though case 204 is not coupled to power source 205. Thus, case 204 can be capable of charging pair of earbuds 202a, 202b while the case is, for example, in a user's pocket as long as case battery 227 has sufficient charge. In various embodiments case battery 227 can be sealed within case 204, while in some embodiments the case battery can be removable for servicing and/or replacement with another charged battery. Case processor 210 can additionally be coupled to case charging circuitry 225 that can control the charging of case battery 227 (e.g., control the voltage and current supplied to the battery to optimize the speed of charging and the life of the battery). In some embodiments case charging circuitry 225 can include a DC/DC converter, an AC/DC converter, battery voltage level monitoring circuitry and/or safety features to properly charge case battery 227.

Similarly, in some embodiments case processor 210 can be coupled to earbud charging circuitry 230 that can control the charging of batteries within pair of earbuds 202a, 202b (e.g., control the voltage and current supplied to the batteries to optimize the speed of charging and the life of the batteries) through earbud interface 245. In various embodiments earbud charging circuitry 230 can include a DC/DC converter, battery voltage level monitoring circuitry and/or safety features to properly charge earbud batteries.

In various embodiments case 204 can include one or more charge indicators 235 that can indicate a charge level of case battery 227 and/or the pair of earbud batteries such that a user can see the indicators on an outer surface of case 100 (see FIG. 1). In some embodiments charge indicators 235 can include three LEDs, one indicating the status for case battery 227 and one for indicating the status of the battery in each of pair of earbuds 202a, 202b. In various embodiments charge indicators 235 can be a first color (e.g., green) if the respective battery is near full charge, a second color (e.g., amber) if the respective battery is less than 75 percent charged and a third color (e.g., red) if there is no charge or limited charge. In some embodiments, charge indicators 235 can include multiple LEDs for each of battery 227, earbud 115a and earbud 115b, where the number of LEDs lit indicate the strength of the battery for each component. For example, in one particular instance three sets of three LEDs can be included on case 204.

In some embodiments case 204 can also include one or more user input devices 240. Each included input device 240 can be a button or other type of input that, in response to being activated by or otherwise receiving input from a user, generates a signal that can be communicated to processor 210 or other circuitry within case 204. Processor 210, or the other circuitry, can then act upon the signal. For example, in various embodiments the wireless radios used by pair of earbuds 202a, 202b can be a Bluetooth® or other radio system that requires a pairing sequence to establish communication between the pair of earbuds and a wireless transmitter in an electronic device. In such embodiments, if input device 240 is a wireless pairing button, processor 210 can send a signal to the earbuds via earbud interface 245 to place the wireless radios within pair of earbuds 202a, 202b into a pairing mode. More specifically, in some embodiments the user can depress a pairing button located on case 204 that notifies case processor 210 to instruct pair of earbuds 202a, 202b via interface 245 to enter a pairing mode. In some embodiments pair of earbuds 202a, 202b can be required to be within the case (e.g., within cavities 110a, 110b as shown in FIG. 1) while entering the pairing mode while in other embodiments the earbuds may not need to be within case 204 and only need to be within wireless communication range of the case. Further details with regard to wireless pairing will be discussed later in the application.

Figure 3:
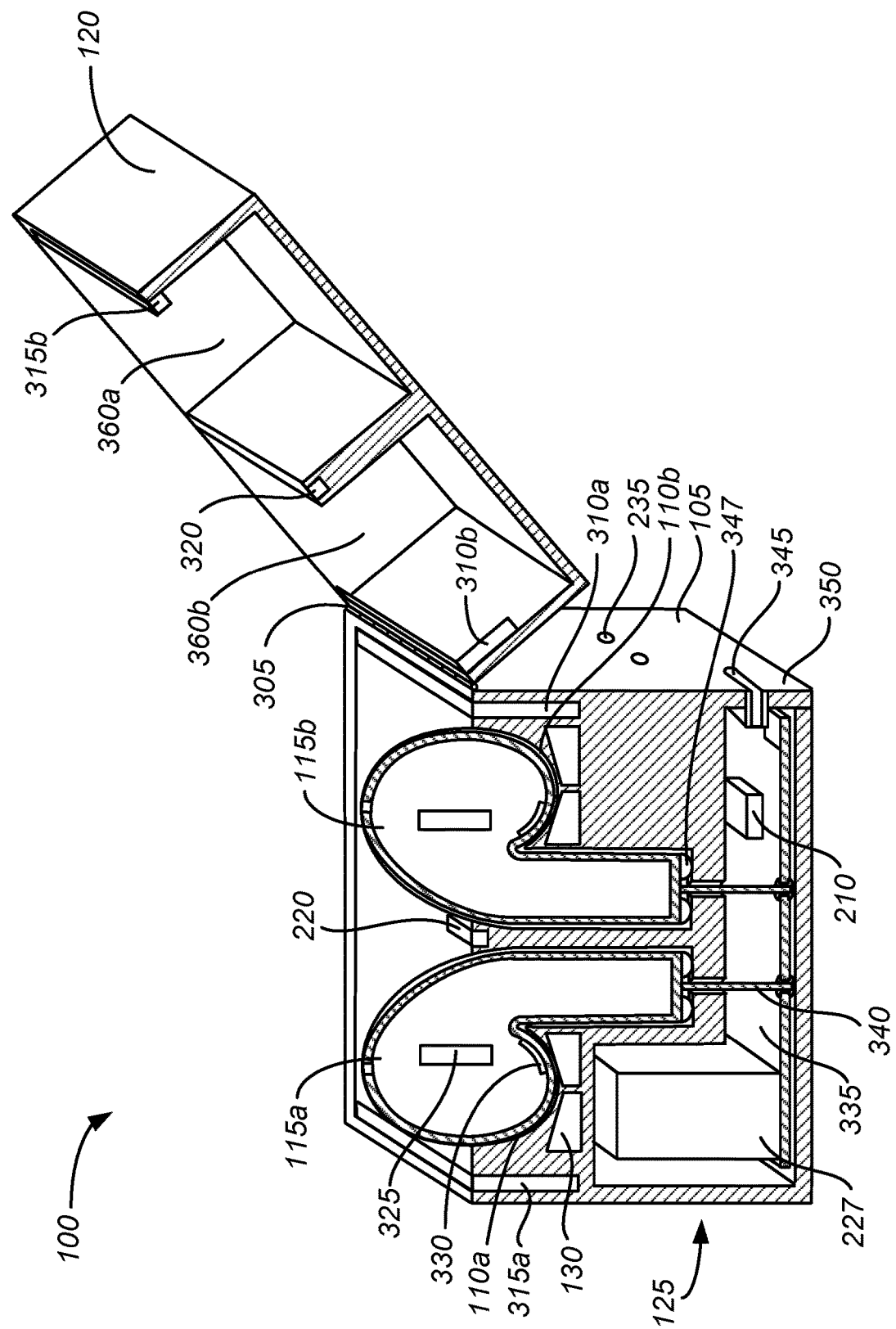
FIG. 3 is a simplified cross-sectional view of the case shown in FIG. 1.

Now referring to FIG. 3, a simplified cross-sectional perspective view of case 100 is illustrated. As shown in FIG. 3, case 100 includes housing 105 having cavities 110a, 110b for holding pair of earbuds 115a, 115b and various electronic circuitry. Case 100 further includes lid 120 attached to housing 105 and operable between a closed position where lid 120 is aligned over one or more cavities 110a, 110b fully enclosing pair of earbuds 115a, 115b within housing and an open position where the cavities 110a, 110b are exposed such that a user can remove or replace the earbuds within the cavities.

As discussed above, lid 120 can be pivotably attached to housing 105 with joint 305 enabling the lid to be operable between a closed position and an open position. In some embodiments lid 120 can have a bi-stable position where it is stable in the closed and open positions, but unstable between those positions such that it tends to be attracted to either the closed or the open position. In various embodiments the bi-stable operation can be enabled by employing a first pair of magnetic elements 310a, 310b and a second pair of magnetic elements 315a, 315b, as discussed in more detail below. In some embodiments a lid sensor 220 can be disposed in housing 105 and configured to detect when lid 120 is in the closed position (e.g., when a detectable medium 320 is adjacent the lid sensor) and when the lid is in the open position (e.g., when the detectable medium is not adjacent the lid sensor). In some embodiments the detectable medium can be a magnetic material.

Pair of earbuds 115a, 115b can fit within cavities 110a, 110b each of which is sized and shaped to accept one of the earbuds. In some embodiments, when each earbud is fully inserted within its respective cavity 110a, 110b, a portion of each earbud extends out of the cavity enabling a user to easily grab and remove the earbud from the case. Lid 120 can include a cavity (or pair of cavities 360a, 360b as shown in FIG. 3) into which the portion of each earbud that extends out of its respective cavity 110a, 110b, extents into. While not shown in FIG. 3, each cavity 360a, 360b can be sized and shaped to match the size and shape of the portion of each earbud the cavity surrounds to more securely store the earbuds within case 100.

Each earbud can include a speaker assembly (not shown in FIG. 3) disposed within a housing of the earbud. The speaker assembly can include a driver unit aligned to emit sound from the directional sound port. The driver unit can include an electromagnetic voice coil, a speaker diaphragm and a driver magnet (shown in FIG. 3 as magnet 325) operatively coupled to the voice coil to move the diaphragm in response to electrical signals and produce sound. In addition to the driver magnet, earbuds according to some embodiments of the disclosure can include an additional magnetic plate 330 that is not operatively coupled to the voice coil. Either or both of magnet 325 and magnetic plate 330 can be attracted to at least one housing magnetic component 130 disposed within case 100. The attraction can be strong enough to magnetically secure first earbud 115a into first cavity 110a and second earbud 115b into second cavity 110b, as discussed in more detail below. In some embodiments magnetic plate 330 can be made from a magnetic material and in various embodiments it can be made with a metal injection molding process. In some embodiments magnetic plate 330 is magnetized while in other embodiments it is not magnetized but is magnetically attractable.

To increase the magnetic attraction between magnetic component 130 and magnetic plate 330, the magnetic plate 330 in each earbud can be positioned direction adjacent to the earbud housing. Additionally, the magnetic plate be contoured to match the curvature of the housing thereby ensuring a minimum distance between the magnetic plate and the housing across the surface are of the magnetic plate. Similarly, at least some or the housing magnetic components 130 can be disposed as close as possible to the surface of the receiving cavity at a location that is spaced directly apart from where the magnetic plate 330 will be when an earbud is received within the cavity. In some embodiments the housing components 130 can be contoured to match the curvature of the receiving area (which matches the curvature of its respective earbud) to minimize the distance between the housing magnetic component 130 and the magnetic plate 330.

In some embodiments housing 105 and lid 120 can be made from the same material while in various embodiments they can be made from different materials. In some embodiments both housing 105 and/or lid 120 can be made from a plastic material, stainless steel, aluminum or any other material.

Charging system 125 can include a circuit board 335 or other electrical routing structure, a rechargeable case battery 227, electrical interconnects 340 to pair of earbuds 115a, 115b, one or more electronic components, such as case processor 210, and an electrical connector 345 for connecting to power source 205 (see FIG. 2). In some embodiments connector 345 can, for example, be a non-proprietary interface such as a USB connector or can be a proprietary interface such as the Lightning connector developed by Apple Inc. In various embodiments connector 345 can be liquid-tight, as discussed in more detail below. One or more charge indicators 235 can be visible on an exterior surface 350 of case 100. In some embodiments each earbud in pair of earbuds 115a, 115b can be electrically coupled to charging system 125 by a connector 347 disposed at an end of a stem portion of each earbuds 115a, 115b, as discussed in more detail below.

Earbud Connectors

FIGS. 4A-8C illustrate several examples of electrical connectors that can be used between each individual earbud in pair of earbuds 115a, 115b and case 100 (see FIG. 3), similar to connector 347 in FIG. 3. While each of FIGS. 4A-8C illustrate an earbud connector for a first earbud 115a, it is to be understood that second earbud 115b can be configured identical to first earbud 115a and thus include a similar electrical connector. Additionally, while the embodiments illustrated in FIGS. 4A-8C include external contacts that are disposed at the end of a stem of the earbud, the contacts can be at different locations in other embodiments.

FIGS. 4A and 4B are simplified cross-sectional views of an electrical connector 400 that can be incorporated into earbud case 100 and an electrical connector 405 at the end of a stem portion of an earbud 115a according to an embodiment of the disclosure. Electrical connector 405 can be used to conduct power and/or data according to some embodiments of the disclosure. Connector 405 can be part of an earbud interface and can include first and second earbud contacts 410, 415, respectively. A bottom view of electrical connector 405 is illustrated in FIG. 4B. In some embodiments, earbud contacts 410, 415 can be annular and separated by an insulator 420. Receptacle connector 400 can be used in a case such as case 100 illustrated above and can have a first earbud case contact 425 and a second earbud case contact 430. First annular contact 410 can interface with first earbud contact 425 and second annular contact 415 can interface with second earbud contact 430. First and second annular contacts 410, 415 can be any type of conductive material including gold, silver or palladium plated copper.

In some embodiments first and second earbud contacts 410, 415, respectively are power and ground contacts. That is, either of first and second earbud contacts 410, 415, respectively can be used for power while the other can be used for ground. As examples, in some embodiments first contact 410 is used for power and second contact 415 is ground while in other embodiments first contact 410 is used for ground and second contact 415 is used for power. In various embodiments other connector configurations can be used that have more than two contacts.

First and second earbud case contacts 425, 430 can be coupled to charging system 125 (see FIG. 3) with electrical interconnects 340 in case 100 to facilitate charging and communication of each earbud 115a, 115b. In various embodiments a circular microphone aperture 435 can be located in the center of second annular contact 415 of each earbud 115a, 115b to facilitate two way telephonic communication and/or noise cancellation. Microphone aperture 435 can be covered by an aesthetic acoustic mesh to protect the microphone from debris and damage.

FIGS. 5A and 5B illustrate another example receptacle connector 500 that can be incorporated into earbud case 100 and an electrical connector 505 at the end of a stem portion of an earbud 115a according to an embodiment of the disclosure. Connector 500 has one annular contact and one center contact, however, as described in more detail below. Connector 505 can be part of an earbud interface and can include first and second earbud contacts 510, 515, respectively. A bottom view of electrical connector 505 is illustrated in FIG. 5B. In some embodiments, ring contact 510 can be ring shaped and circular contact 515 can be circular with the contacts separated by an insulator 520 (e.g., insulator 520 can be an air gap). Ring contact 510 can interface with first earbud contact 525 and circular contact 515 can interface with second earbud contact 530. In various embodiments a circular microphone aperture 535 can be located between ring contact 510 and circular contact 515 so one or more of pair of earbuds 115a, 115b can be used for two way telephonic communication.

Figure 6A:
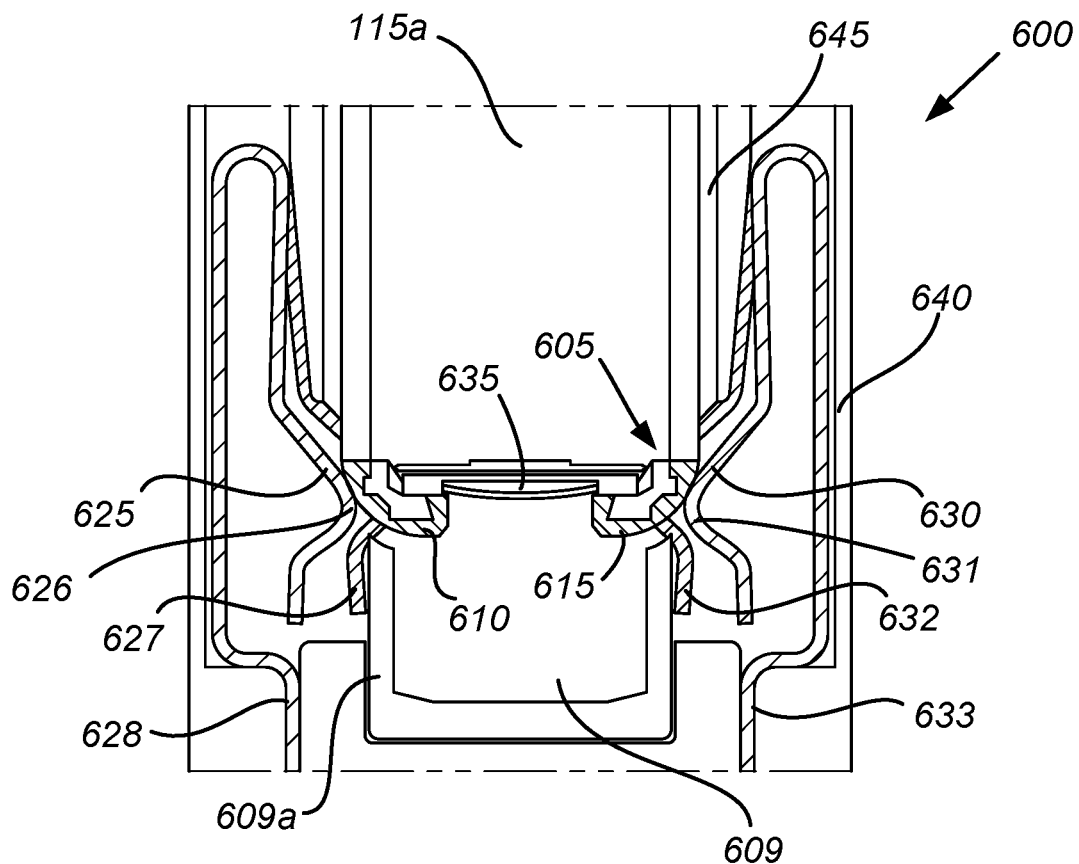
FIG. 6A is a partial cross-sectional view of another embodiment of an earbud connector according to the disclosure.
Figure 6B:
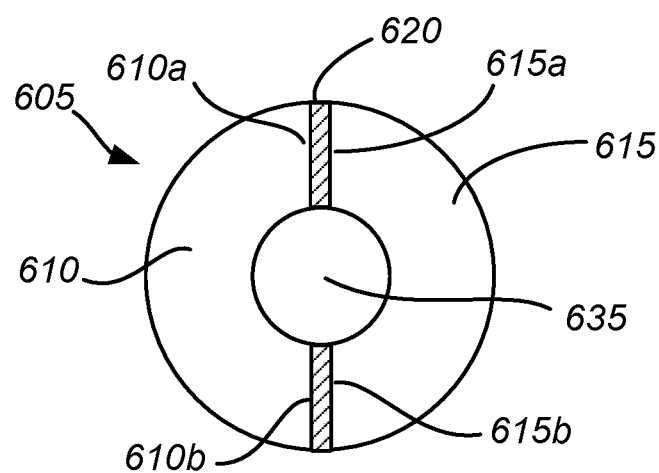
FIG. 6B is a plan view of the earbud connector illustrated in FIG. 6A.

FIGS. 6A and 6B illustrate another example receptacle connector 600 that can be incorporated into earbud case 100 and an electrical earbud connector 605 disposed at the end of a stem portion of an earbud 115a according to an embodiment of the disclosure. Receptacle connector 600 can make electrical contact with electrical earbud connector 605 as described in more detail below. Earbud connector 605 can be part of an earbud interface and can include first and second earbud contacts 610, 615, respectively. A bottom view of electrical earbud connector 605 is illustrated in FIG. 6B. As shown in FIG. 6B, contacts 610, 615 can be spaced from each other in an oppositional and symmetrical relationship. In some embodiments, each of earbud contacts 610 and 615 can have a partial annular shape (i.e., a partial ring) with the open portions of each contact facing the other. For example, contact 610 can include ends 610a, 610b and contact 615 can include ends 615a, 615b where end 610a is spaced apart from end 615a and end 610b is spaced apart from end 615b. While FIG. 6B illustrates each of contacts 610, 615 as half rings, in other embodiments the contacts can include shorter length arcs and/or have different opposing shapes altogether.

Earbud contacts 610, 615 can be separated from each other by an insulator 620 (e.g., insulator 620 can be a dielectric material as discussed in more detail below). Earbud contact 610 can interface with first earbud case contact 625 and earbud contact 615 can interface with second earbud case contact 630. In various embodiments a circular microphone aperture 635 can be located between earbud contacts 610 and 615 enabling pair of earbuds 115a, 115b to be used for two way telephonic communication. Receptacle connector 600 can include a contact carrier 640 that retains earbud case contacts 625, 630 as described in more detail below. In some embodiments, contact carrier 640 can make earbud receptacle cavity 645 liquid-tight.

In some embodiments, each of the first and second earbud contacts 610, 615, respectively, can include a contact portion that extends into an earbud receiving cavity of the earbud case when the earbud is positioned within the cavity. Receptacle connector 600 can include a pair of earbud case contacts 625, 630 that are positioned on opposite sides of and extend into the earbud receiving cavity. Earbud case contacts 625, 630 can be held within receiving slots 628, 633 of a contact carrier 640 as discussed further below. The contact portion of each earbud contact 610, 615 can have an arcuate cross-section that makes contact with arcuate contact portions 626, 631 of contacts 625, 630 respectively, during a mating event when the earbud is inserted into the earbud receiving cavity. The combination of arcuate surfaces on the earbud contact and earbud case contact enable a contact wiping motion each time the earbuds are inserted within and drawn out of the receptacle connector, creating a reliable interconnect. In FIG. 6A, contacts 625, 630 are illustrated in a deflected state that illustrates their approximate position when earbud 115a is fully inserted into its receiving cavity such that the earbud contact is engaged with the earbud case connector.

The same contacts 625, 630 are also illustrated in FIG. 6A in a non-deflected state 627, 632 showing the contacts extending into the earbud receiving cavity prior to being mated with the earbud contacts of earbud 115a. During a mating event, as earbud 115a is inserted deeper into the earbud receiving cavity, the earbud case contacts 625, 630 come in contact with the earbud contacts and deflect outward. The exterior contacting surfaces of the earbud contacts and earbud case contacts rub against each other during both the mating event and during a de-mating event when the earbud 115a is withdrawn from the earbud receiving cavity. In various embodiments the deflecting arcuate portions 626, 631 of contacts 625, 630 respectively, are deflected by arcuate portions of first and second earbud contacts 610, 615, respectively during insertion and withdrawal of the first and second earbuds. Since the arcuate portions are in direct contact and contacts 625, 630 are in a deflected (e.g., spring loaded state), pair of earbuds 115a, 115b has a vertical (e.g., ejecting) force applied to them when fully mated with the case. In some embodiments, as discussed in more detail herein, one or more magnets can be used to overcome the vertical force and hold the earbuds within their respective cavities.

In some embodiments one of contacts 625, 630 can be arranged to make contact with the earbud contacts 610, 615, first by preloading one of contacts 625, 630 at a different height than the other (e.g., sequential contacts). This can be useful in some embodiments to make a ground connection to the earbud first before making an active electrical connection with it. The wiping contacts and the sequentially contacting contacts can be used in any of the connector embodiments disclosed herein.

In various embodiments contact carrier 640 can include a debris recess 609 disposed below the contact interface region. Debris recess 609 can have a cup-like shape defined by sidewalls 609a and can be useful for providing a location for debris that falls into either earbud cavity. Debris recess 609 can be disposed between earbud case contact receiving slots 628, 633 and spaced apart from the contact area so the debris does not interfere with the earbuds making electrical contact with receptacle connector 600. Debris recess 609 can further be open to the earbud receiving cavity so that debris can be periodically cleaned out as needed. In some embodiments a separate debris recess 609 is disposed under each earbud contact area while in other embodiments a single debris recess can be sufficiently wide to capture debris from both contact areas.

Debris recess 609, or a similar debris capture structure, can be included in any of the connector embodiments disclosed herein. In one embodiment debris recess 609 has a depth below arcuate portions 626, 631 of contacts 625, 630 that is 50 percent or more than a diameter of debris recess 609. In another embodiment debris recess 609 has a depth that is 75 percent or more than the diameter of debris recess 609 while in another embodiment its depth is 100 percent (e.g., having a depth to diameter ratio of 1:1) or more of the diameter.

In some embodiments contacts 625, can be made out of a copper, nickel and silver alloy while in other embodiments they can be made out of a phosphor and bronze alloy, and in other embodiments a different alloy can be used.

Figure 6C:
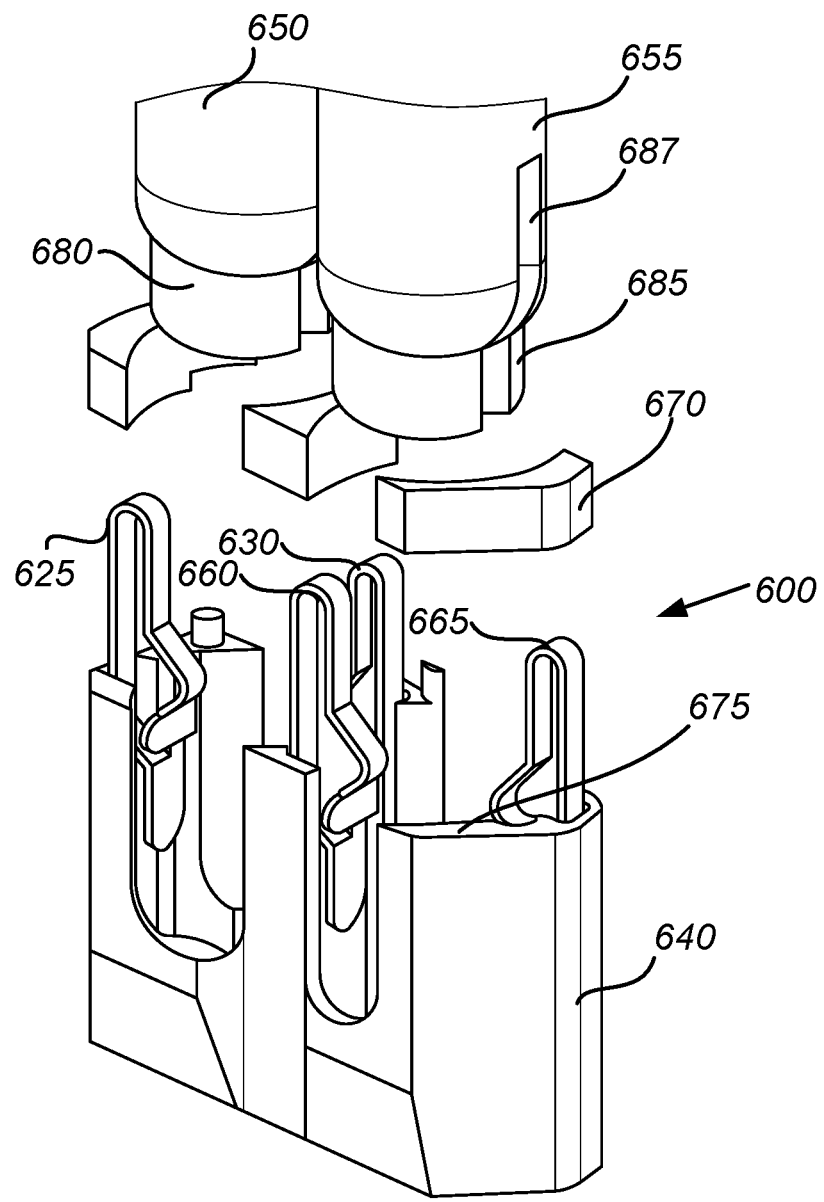
FIG. 6C is an isometric exploded view of a connector assembly for the earbud connector illustrated in FIG. 6A.

Now referring to FIG. 6C an exploded view of receptacle connector 600 is shown. As shown in FIG. 6C, connector 600 includes first and second shells 650, 655 that define receiving cavities for a pair of earbuds retaining and guiding a stem portion of each earbud into case 100 (see FIG. 1). While not shown in FIG. 6C, the receiving cavity in each shell can include an elongated tube portion that opens to a larger earbud receiving opening. The elongated tube portion can be sized and shaped to accommodate the stem section of an earbud and the larger earbud receiving opening can be sized and shaped to partially or fully accommodate the ear interface portion (i.e., the portion of the earbud that fits within a user's ear).

In some embodiments shells 650, 655 can be separate components joined together by the contact carrier while in other embodiments shells 650, 655 can be a single component that can be formed, for example, in a molding process, a 3D printing process or with a milling process. Contact carrier 640 holds first and second earbud contacts 625, 630, respectively, that can interface with a first earbud, and also holds third and fourth earbud contacts 660, 665, respectively, that can interface with a second earbud. A collar 670 can be bonded to a top surface 675 of contact carrier 640. In some embodiments collar 670 can have a removable tie bar (not shown in FIG. 6C) that holds the three pieces of the collar together during assembly and that can then be removed after assembly such that the tie bar is not included within a finished earbud case.

Figure 6D:
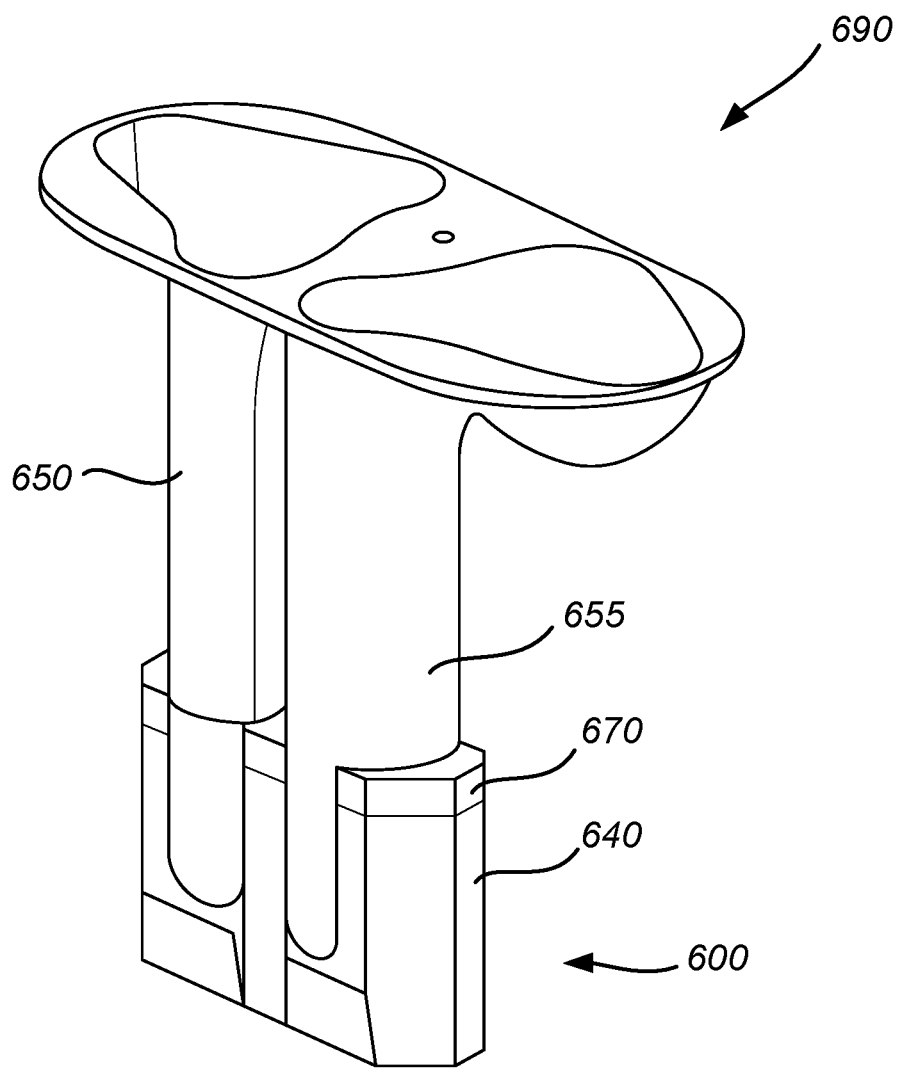
FIG. 6D is an isometric view of the assembled earbud connector illustrated in FIG. 6A.

Distal ends 680, 685 of first and second shells 650, 655, respectively, can be narrower than the elongated tube portion of shell 650, 655, and each distal end 680, 685 can be fit within and bonded to collar 670 forming a completed shell and receptacle connector assembly 690, illustrated in FIG. 6D. In the completed assembly, each earbud case contact 625, 630 fits within a respective contact opening of shell 650 and each earbud case contact 625, 630 fits within a respective contact opening (e.g., opening 687 visible in FIG. 6C) of shell 655. Each contact opening (e.g., opening 687) enables its respective contact to extend into the earbud receiving cavity within its respective shell 650, 655 to make electrical contact with an earbud contact during a mating event. When assembled, shell and contact assembly 690 can create a liquid-tight seal as defined herein. Shell and contact assembly 690 can subsequently be assembled into a case, such as case 100 illustrated in FIG. 1. In some embodiments first and second shells 650, 655 can be a single shell having two cavities, one cavity for each earbud.

As defined herein, a liquid-tight seal shall mean a seal that conforms to one or more of the following ratings as defined by the International Protection Rating and International Electrochemical Commission (IEC) 60529 that can also be known as the I.P.68 rating. In some embodiments the liquid-tight seal will protect the connector assembly against the harmful ingress of water and have a "liquid ingress" rating between 1 (dripping water) and 8 (immersion beyond 1 meter). In various embodiments the liquid-tight seal shall be rated between 1 (dripping water) and 4 (splashing water) while in some embodiments the liquid-tight seal shall be rated between 2 (dripping water with device tilted at 15 degrees) and 5 (water jet). In various embodiments the liquid-tight seal shall be rated between 3 (spraying water) and 6 (powerful water jets) while in some embodiments the liquid-tight seal shall be rated between 4 (splashing water) and 7 (immersion up to 1 meter). In various embodiments the liquid-tight seal shall be rated between 5 (water jets) and 8 (immersion beyond 1 meter) while in some embodiments liquid-tight shall mean the seal will protect the electronic device against liquid ingress up to 100 feet for 30 minutes.

Now referring to FIGS. 7A and 7B another example of a receptacle connector 700 is illustrated that is similar to connector 600 illustrated in FIGS. 6A and 6B. Receptacle connector 700 has a different configuration for the contacts and the contact carrier, however, as described in more detail below. This embodiment can use the same earbud connector shown in FIGS. 6A and 6B, where the earbud contacts are semicircular and separated by an insulator.

A contact carrier 740 holds first and second earbud contacts 725, 730, respectively, that can interface with a first earbud, and also holds third and fourth earbud contacts 760, 765, respectively, that can interface with a second earbud. A cap 770 can be bonded to a bottom surface 775 of contact carrier 740 with a layer of adhesive 773. As illustrated in FIG. 7B, distal ends of first and second shells 750, 755, respectively, can be fit within and bonded to contact carrier 740 forming a completed shell and receptacle connector assembly 790. Shell and contact assembly 790 can be liquid-tight, meeting one or more of the ranges as defined herein. Shell and contact assembly 790 can subsequently be assembled into a case, such as case 100 illustrated in FIG. 1.

Similar to contact carrier 640, first and second earbud contacts can have an arcuate cross-section and can make contact with arcuate portions of receptacle connector contacts 725, 730. The combination of arcuate surfaces can enable a wiping motion each time the earbuds are inserted within and drawn out of the receptacle connector, creating a reliable interconnect. Further, in some embodiments one contact can be arranged to make contact with the earbud first. In one example the contacts can be preloaded at different heights. This can be useful in some embodiments to ground the earbud first before making an active electrical connection with it.

Figure 8A:
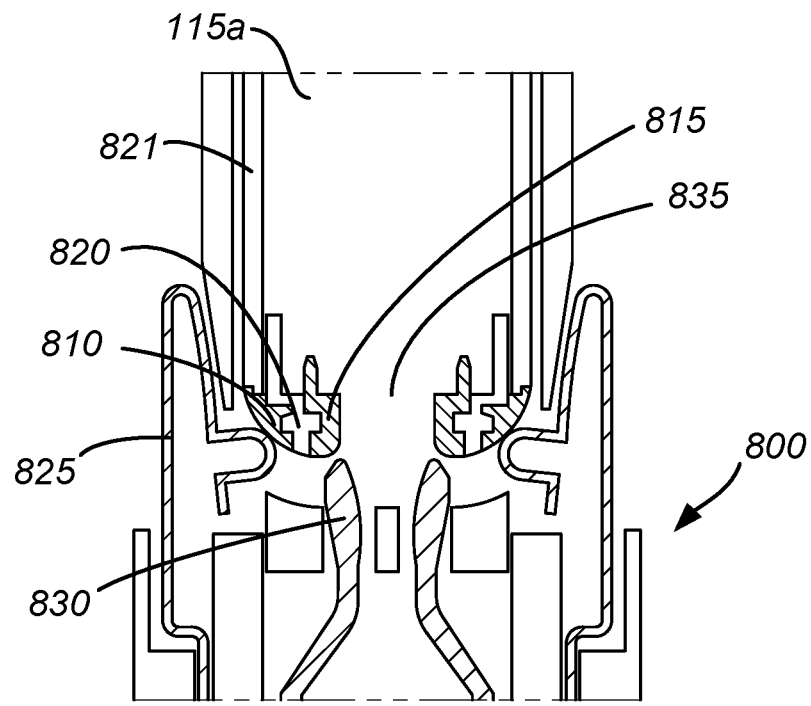
FIG. 8A is a partial cross-sectional view of another embodiment of an earbud connector according to the disclosure.
Figure 8B:
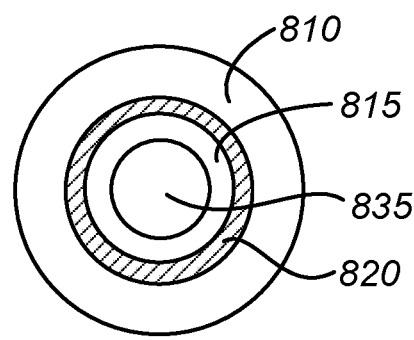
FIG. 8B is a plan view of the connector on the earbud illustrated in FIG. 8A.

Now referring to FIGS. 8A and 8B another example of a receptacle connector 800 is illustrated that is similar to connector 400 illustrated in FIGS. 4A and 4B. Receptacle connector 800 has a different configuration for the inner and outer contacts, however, as described in more detail below.

In some embodiments, earbud contacts 810, 815 can be annular and separated by an electrical insulator 820. First annular contact 810 can interface with first earbud contact 825 and second annular contact 815 can interface with second earbud contact 830. First and second annular contacts 810, 815 can be formed from any type of conductive material including copper and copper alloys and can be plated with any metal. In various embodiments a circular microphone aperture 835 can be located in the center of second annular contact 815 so one or more of pair of earbuds 115a, 115b (see FIG. 1) can be used for two way telephonic communication. Microphone aperture 835 can be covered by an aesthetic acoustic mesh to protect the microphone from debris and damage.

Similar to contact carrier 640, first and second earbud contacts can have an arcuate cross-section and can make contact with arcuate portions of contacts 825, 830 respectively in receptacle connector 800. The combination of arcuate surfaces can enable a wiping motion each time the earbuds are inserted within and drawn out of the receptacle connector, creating a reliable interconnect. Additionally, as shown in FIG. 8A, in some embodiments an exterior surface 821 of the earbud stem can be flush with an exterior side surface of the earbud contacts. Further, in some embodiments one contact can be arranged to make contact with the earbud first. In one example the contacts can be preloaded at different heights. This can be useful in some embodiments to ground the earbud first before making an active electrical connection with it.

Figure 8C:
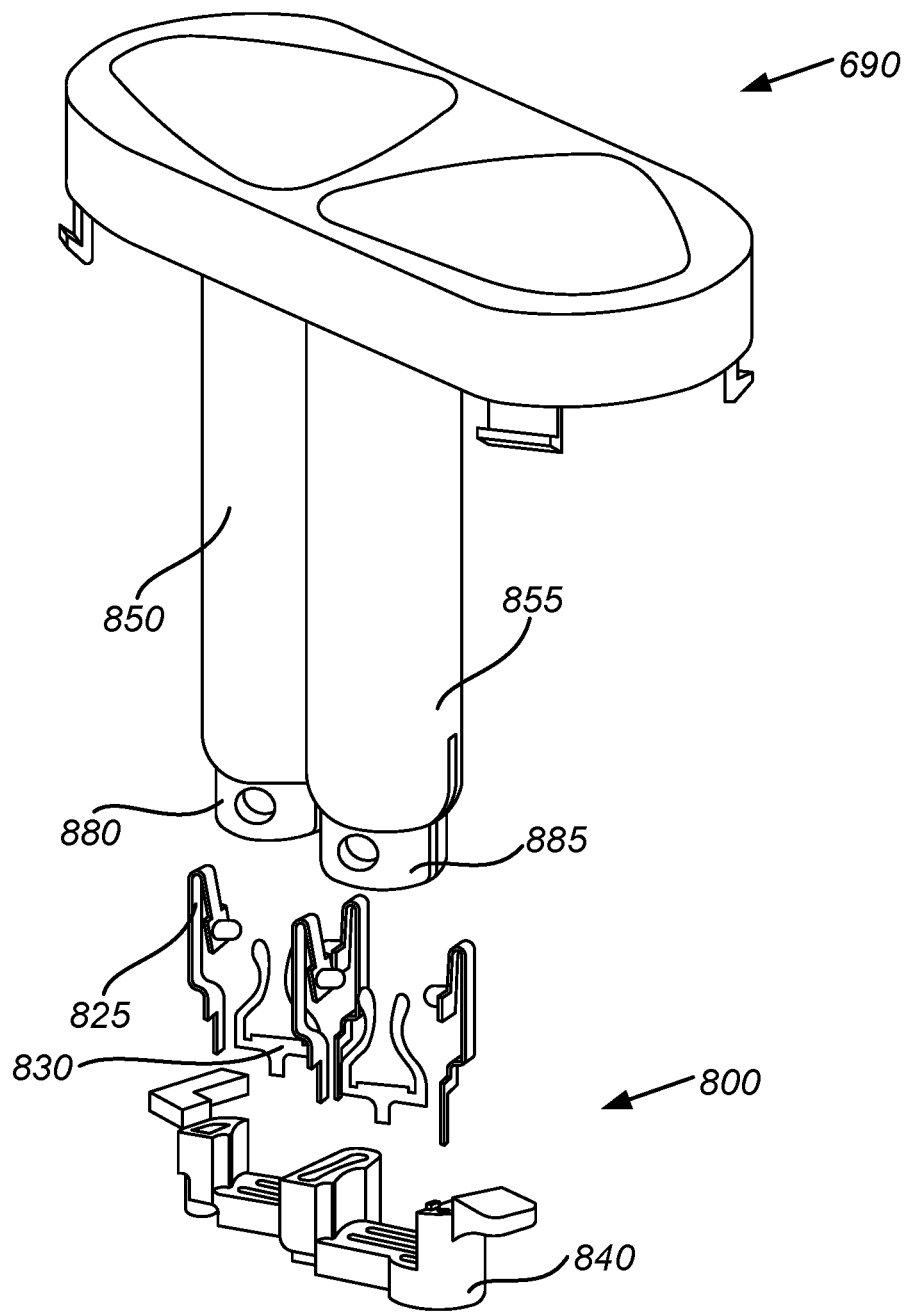
FIG. 8C is an isometric exploded view of the earbud connector illustrated in FIG. 8A.

Now referring to FIG. 8C an exploded view of receptacle connector 800 is shown illustrating how it can be coupled to first and second shells 850, 855 that retain and guide a stem portion of each earbud into case 100 (see FIG. 1). Contact carrier 840 holds first and second earbud contacts 825, 830, respectively, that can be used with a first earbud, and also holds third and fourth earbud contacts that can be used with a second earbud. Contact carrier 840 can be bonded to distal ends 880, 885 of first and second shells 850, 855, respectively, forming a completed shell and receptacle connector assembly. Shell and contact assembly can create a liquid-tight seal as defined herein. Shell and contact assembly 690 can subsequently be assembled into a case, such as case 100 illustrated in FIG. 1. In some embodiments first and second shells 850, 855 can be a single shell having two cavities, one cavity for each earbud.

In some embodiments the electrical connector (for example connector 405 in FIG. 4A) on pair of earbuds 115a, 115b may not be an annular (e.g., ring shaped) external contact-type connector and can be any other type of electrical connector, such as, but not limited to a pin and socket, a pin and contact pad or a wiping arm and contact pad. In various embodiments one or more contact pads can be located on a vertical portion of the stem portion of the pair of earbuds and a wiping arm can interface with them. In another example an interface connector can be disposed on the ear portion of the earbud housing. A mating connector can be disposed within the case and can interface with the connector when the earbud is placed in its respective cavity. In some embodiments such a connector can be gold plated to minimize corrosion that can occur as a result of being in contact with a user's ear for extended periods of time. In yet further examples wireless inductive charging of the earbuds can be used.

Magnetic Retention of Earbuds

Figure 9A:
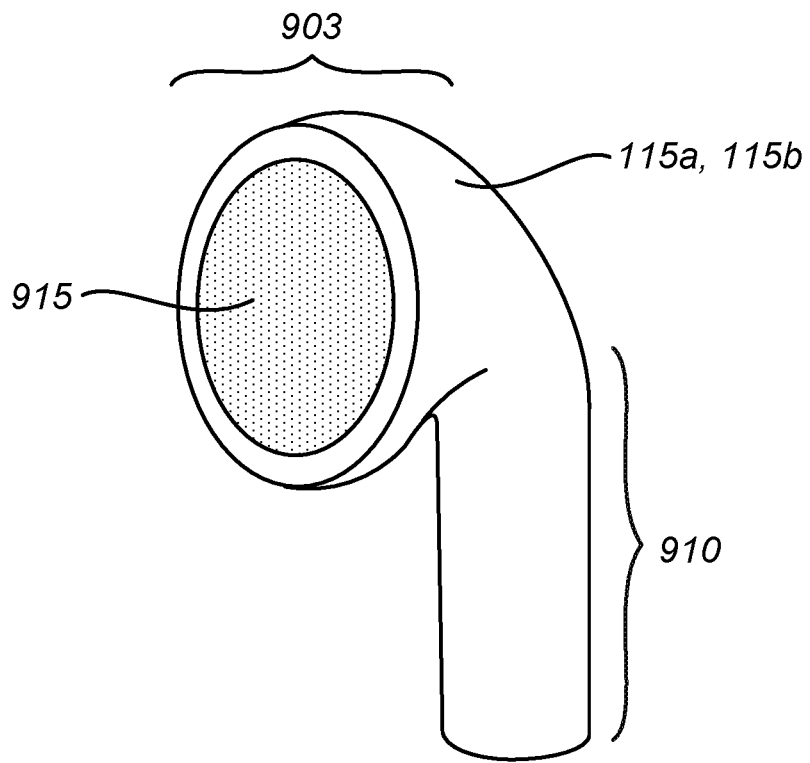
FIGS. 9A and 9B are front and rear isometric views of one of the earbuds shown in FIG. 1, respectively.
Figure 9B:
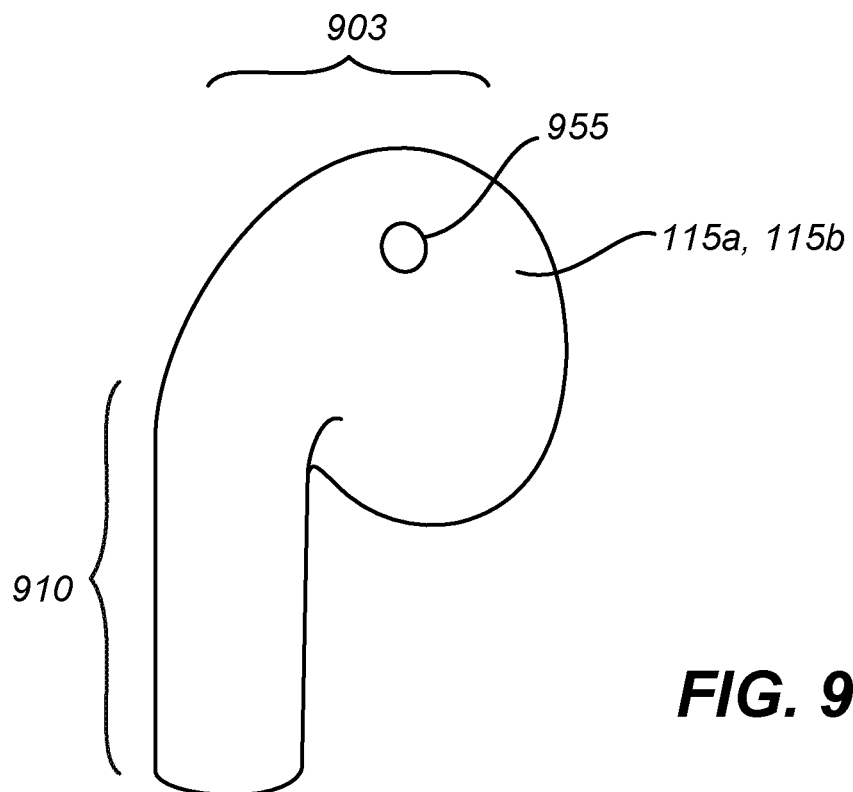

FIGS. 9A and 9B illustrate front and rear perspective views, respectively, of one of wireless earbuds 115a, 115b. As shown in FIGS. 9A and 9B, earbuds 115a, 115b include an external housing having an ear interface portion 903 and a stem portion 910. Ear interface portion 903 can be formed to fit at least partially within a user's ear and can be non-occluding, as discussed in more detail herein. An aesthetic acoustic mesh 915 can fit on ear interface portion 903 and allow sound to travel from an internal speaker to a user's ear. Some embodiments can have one or more user inputs 955 that can be used to answer a call, pause or mute playback, or perform other functions. The outer housing for pair of earbuds 115a, 115b can be made from a plastic material including, but not limited to, ABS or a polycarbonate.

Now referring to FIG. 10, a top view of housing 105 (see FIG. 1) of case 100 for pair of earbuds 115a, 115b is illustrated. As shown in FIG. 10, housing 105 can include multiple retention magnets 905a-905h for the earbuds and one or more sensors. Earbuds 115a, 115b can be inserted in cavities 110a, 110b and retained in the cavities by the retention magnets 905a-905h. Each cavity 110a, 110b can include a stem section 116a, 116b and a bud section 117a, 117b. Earbud retention magnets 905a-905d are used to retain first earbud 115a and retention magnets 905e-905h are used to retain second earbud 115b. However, in other embodiments fewer or additional retention magnets 905a-905h can be used and the magnets can vary in geometry, size and placement from those depicted.

Lid sensor 220 can be used to detect whether lid 120 (see FIG. 1) is closed or open. In the embodiments illustrated in FIG. 10, lid sensor 220 is disposed between cavities 110a, 110b, but the lid sensor can be located differently in other embodiments. Lid magnets 910a, 910b can be used for operating the lid (not shown in FIG. 10), as discussed in more detail below, and in some cases can increase the strength of retention magnets 905a-h, as also discussed in more detail below. Cross-sectional view A-A is shown in FIG. 11 and illustrates a side view of how earbud 115a can be oriented relative to the magnets discussed above.

FIG. 11 illustrates a cross-sectional view of earbud 115a in case 100. As shown in FIG. 11, earbud 115a is secured within cavity 110a in housing 105. In some embodiments earbud 115a can have a speaker magnet 325 and/or a magnetic plate 330 positioned to align with earbud retention magnets 905f and 905h. Speaker magnet 325 and/or magnetic plate 330 can be attracted to one or more earbud retention magnets 905f and 905h and one or both can include a magnetic material.

As defined herein, a magnetic material is any material that is capable of being attracted by or acquiring the properties of a magnet to attract magnetic materials. This includes ferromagnets (i.e., magnets including iron) as well as non-ferrous magnets. Some example magnetic materials are, but are not limited to: neodymium, steel, nickel, cobalt, and alnico, an aluminum-nickel-cobalt alloy, some alloys of rare earth metals, and some naturally occurring minerals such as lodestone. In comparison, a magnet is a magnetic material that is magnetized so it attracts a magnetic material.

In one embodiment magnetic plate 330 can include a magnetic material and magnets 905f and 905h can be oriented and positioned to be within a distance to attract the magnetic plate with sufficient force to retain earbud 115a in housing 105 even if the housing is inverted or shaken. However, the strength of retention magnets 905f, 905h can be selected to allow a user to grasp earbud 115a with their fingers and remove it from housing 105 by applying a force greater than the force of magnetic retention. In further embodiments one or more of retention magnets 905f, 905h can be positioned and oriented to attract speaker magnet 325 which can assist with attracting earbud 115a into housing 105 and retaining it. In other embodiments, an earbud ejection mechanism can be included in the case. For example, a mechanical ejector that pushes the earbuds out when the lid is opened (or when an ejection button is pushed).

In some embodiments additional magnets such as those depicted in FIG. 10 can be used to augment the attraction and retention forces imparted on magnetic plate 330 and/or speaker magnet 325. More specifically, lid magnet 910b can be used to attract lid 120 (or a magnetic material 1105 disposed within the lid) and can also be used as a part of a Halbach array to augment the magnetic field of earbud retention magnets 905 to attract earbud 115a from a greater distance and to retain it more securely. A Halbach array is a special arrangement of permanent magnets that augments the magnetic field on one side of the magnetic array while cancelling the field to near zero on the other side. Retention magnets 905e, 905f and 905g (see FIG. 10) can also be used as a part of the Halbach array.

Now referring to FIG. 12, a cross-sectional view B-B of housing 105 is shown from FIG. 10. As shown in FIG. 12 three earbud retention magnets 905e, 905f and 905g are disposed within housing 105 to secure earbud 115a within its cavity. In some embodiments, magnets 905g and 905e can have an angled upper surface to partially conform to the circular shape of ear interface portion 805 of earbud 115a. Any configuration or arrangement of magnets can be used to attract speaker magnet 325 and/or magnetic plate 330. In some embodiments a carrier 920 can be formed to retain and position one or more of retention magnets 905a-905h.

Also, as described above with respect to FIG. 3, the magnetic plate 330 in each earbud can be positioned direction adjacent to the earbud housing and be contoured to match the curvature of the housing (as shown in FIGS. 11 and 12) to ensure a minimum distance between the magnetic plate and the housing across the surface are of the magnetic plate and increase the magnetic attraction between the housing magnetic components and magnetic plate 330 using minimal magnetic material. Similarly, some or all of the housing magnetic components 905a-905h can be disposed as close as possible to an appropriate surface of the earbud case and contoured in shape to match the surface.

Magnetically Actuated Case

FIGS. 13-21 illustrate case 1300 having a lid with a magnetically actuated over center position and several example magnet geometries. As shown in FIG. 13, case 1300 can be similar to case 100 illustrated in FIG. 1 and used to retain a pair of earbuds, however case 1300 can be used for myriad other purposes such as, for example, but not limited to, a container for storing medicine, a container for storing cigars or a recharging container for a miniature portable media player.

Now referring simultaneously to FIGS. 13 and 14, in some embodiments case 1300 can include a housing 1305 having a receiving opening 1301, a bottom face 1302 disposed opposite of the receiving opening. Similar to the cases discussed above, case 1300 can have a closed position, illustrated in FIG. 13 where a housing 1305 is covered by a lid 1310 that is pivotally coupled to the housing. Case 1300 can also have an open position, illustrated in FIG. 14 where lid 1310 is pivotally displaced from housing 1305 by an angle theta. Case 1300 can further include an upper wall 1303 opposite a lower wall 1304 and a first sidewall 1306 opposite a second sidewall 1307 where the walls extend between receiving opening 1301 and bottom face 1302 defining a cavity 1308 that communicates with receiving opening 1301. Receiving opening 1301 can be further defined by four wall ends 1309a, 1309b, 1309c and 1309d including ends of upper wall 1303, lower wall 1304, first sidewall 1306 and second sidewall 1307, respectively.

A first pair of magnetic elements 1315a, 1315b can be oriented such that they repel one another and are disposed proximate pivotable joint 1317 with first magnetic element 1315a of the first pair disposed within housing 1305 and a second magnetic element 1315b of the first pair disposed within lid 1310. In some embodiments first pair of magnetic elements 1315a, 1315b can both be magnets. A second pair of magnetic elements 1320a, 1320b are oriented such that they attract one another and are disposed proximate to a wall end 1309a opposite pivotable joint 1317 with a first magnetic element 1320a of the second pair of magnetic elements disposed within housing 1305 and a second magnetic element 1320b of the second pair of magnetic elements disposed within lid 1310. In some embodiments both magnetic elements 1320a, 1320b can be magnets while in another embodiment one of the magnetic elements can be a magnet while the other element is a magnetic material.

In some embodiments case 1300 can be configured to create an over center configuration for lid 1310 where the lid is in a first stable position when in the closed position (illustrated in FIG. 13) and is in a second stable position when in the open position (illustrated in FIG. 14), but is in an unstable position in-between the closed position and the open position. In some embodiments this can be achieved by the attractive forces between second pair of magnetic elements 1320a, 1320b over powering the repulsive forces of first pair of magnetic elements 1315a, 1315b when lid 1310 is transitioned from the open position to the closed position. This condition can be explained graphically as illustrated in FIG. 15.

In some embodiments any of the magnetic arrangements disclosed herein can be arranged in a multipole configuration to concentrate the magnetic field within and between the magnets. In some embodiments a multipole can be used for magnetic elements 1320a and 1320b where 1320a has a north end adjacent a south end and 1320b has a south end that attracts to 1320a's north end, and has a north end that attracts to 1320a's south end. In other embodiments any other arrangement can be used. A multipole arrangement can be beneficial to attenuate magnetic fields outside of the case so they don't negatively interact with other magnetic objects such as cards with magnetic strips on them.

FIG. 15 illustrates a graph of the magnetic forces on lid 1310. As shown in FIG. 13, lid 1310 has an over center position due to forces imparted on it from two pairs of magnetic elements. As discussed above, first pair of magnetic elements 1315a, 1315b (see FIGS. 13 and 14) are oriented to have repulsive forces which are shown as the line on the graph labeled $F_{Repulsion}$. Similarly, second pair of magnetic elements 1320a, 1320b are oriented to have attractive forces which are shown as the line on the graph labeled $F_{Attraction}$. From examination of FIG. 14 it can be seen than an angle of theta=0° is when lid 1310 is closed and an angle of theta=180° is when the lid is fully open (e.g., pivotally displaced from housing 1305 to its maximum extent). At some angle labeled X° is an over center position for lid 1310 where it is unstable and it will "automatically" (i.e., through magnetic attraction) move either towards the closed position or the open position.

Continuing to refer to FIG. 15, at an angle of 0° lid 1310 is closed and the attractive forces ($F_{Attraction}$) of second pair of magnetic elements 1320a, 1320b are greater than the repulsive forces ($F_{Repulsion}$) of first pair of magnetic elements 1315a, 1315b so the lid is secured in the closed position. In some embodiments, even if first pair of magnetic elements 1315a, 1315b and second pair of magnetic elements 1320a, 1320b have the same strength, the over center design will work since the leverage the first pair of magnetic elements has on the pivotable joint is less than the leverage the second pair of magnetic elements has on the pivotable joint. More specifically, since first pair of magnetic elements 1315a, 1315b are closer to the pivotable joint it will apply less torque to lid 1310 than second pair of magnetic elements 1320a, 1320b.

However, as lid 1310 transitions to greater angles of theta (i.e., when transitioning to an open position), second pair of magnetic elements 1320a, 1320b moves apart from one another faster than first pair of magnetic elements 1315a, 1315b. Since magnetic forces vary exponentially with distance, the $F_{Attraction}$ falls much faster than $F_{Repulsion}$, therefore at some angle of X° the $F_{Repulsion}$ overcomes the $F_{Attraction}$ and the lid will be attracted to the open position. When transitioning from the open position to the closed position the reverse happens and after the over center point is reached the lid will be attracted to the closed position.

In some embodiments first pair of magnetic elements 1315a, 1315b can be configured to stop lid 1310 from fully opening (i.e., where theta is 180°). In some embodiments first pair of magnets 1315a, 1315b can be configured to be repulsive, therefore in such embodiments the magnetic elements could be elongated such that when lid 1310 rotates close to the 180° open position first pair of magnetic elements 1315a, 1315b repel each other such that the weight of the lid is supported by their repulsive force and the lid is essentially suspended in a semi-open position. Some shapes of magnets such as an "L" can be used to enhance the forces to support lid 1310 in a semi-open position. In various embodiments the force vector of first pair of magnetic elements 1315a, 1315b can be adjusted to increase or decrease this effect, as discussed in more detail below.

In some embodiments case 1300 can be designed to have a particular feel for a user. For example, in one embodiment case 1300 can be designed so a user can hold case 1300 in their hand in the closed position and by snapping their wrist lid 1310 will snap open and remain in the open position without resting against 1305. In further embodiments lid 1310 can be in the open position and the user can snap their wrist and close the lid. In further embodiments a user can use their hand to try to open lid 1310 and once the lid has been moved a certain distance the lid will snap or spring open. In further embodiments a user can grasp lid 1310 and move it towards the closed position and at a certain distance the lid will snap or spring closed.

Figure 16:
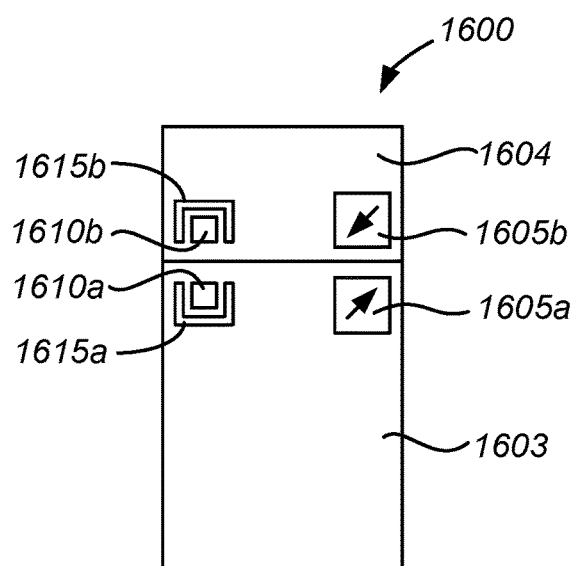
FIG. 16 is a side view of a case that includes one pair of magnets with misaligned poles and one pair with a high permeable material surrounding them according to some embodiments of the disclosure.

Now referring to FIG. 16 another embodiment of a case 1600 with a magnetically actuated lid 1604 is illustrated. As shown in FIG. 16, case 1600 has one pair of magnetic elements having misaligned poles (i.e., force vectors) and another pair of magnetic elements having a high permeability material used to increase magnetic forces. Similar to previous embodiments, lid 1604 is pivotally attached to housing 1603. However, in this case first pair of magnetic elements 1605a, 1605b are oriented so the force vectors are not directly aligned as illustrated by the arrows. In this scenario, lid 1604 can still have an over center position, however the $F_{Repulsion}$ from first pair of magnetic elements 1605a, 1605b will be less than the scenario illustrated in FIG. 13. However, one feature of such a misalignment of force vectors can be used to resist lid 1604 from transitioning to a 180° fully open position. More specifically, magnetic forces from first pair of magnetic elements 1605a, 1605b can resist lid 1604 from going to the closed position, but can also resist lid from going to the 180° open position. Other variations of misaligned magnetic force vectors can be used and are within the scope of this disclosure.

Continuing to refer to FIG. 16, second pair of magnetic elements 1610a, 1610b can have a high permeability material 1615a, 1615b at least partially surrounding them to increase the forces of attraction between the second pair of magnetic elements. A high permeability material as discussed herein can be any material with a relatively high permeability. The permeability of a material is the measure of the material's ability to support the formation of a magnetic field within itself. More specifically, it is the degree of magnetization that a material obtains in response to an applied magnetic field. Thus, the more "magnetically conductive", or the less resistant a material is to magnetic fields, the higher its permeability. Following this behavior, high permeability material 1615a, 1615b as discussed herein can essentially re-direct the magnetic fields from second pair of magnetic elements 1610a, 1610b so the attractive forces are increased. High permeability materials can also be used on repulsive magnets, lid magnets or magnets used to attract and secure earbuds within the case.

Figure 17:
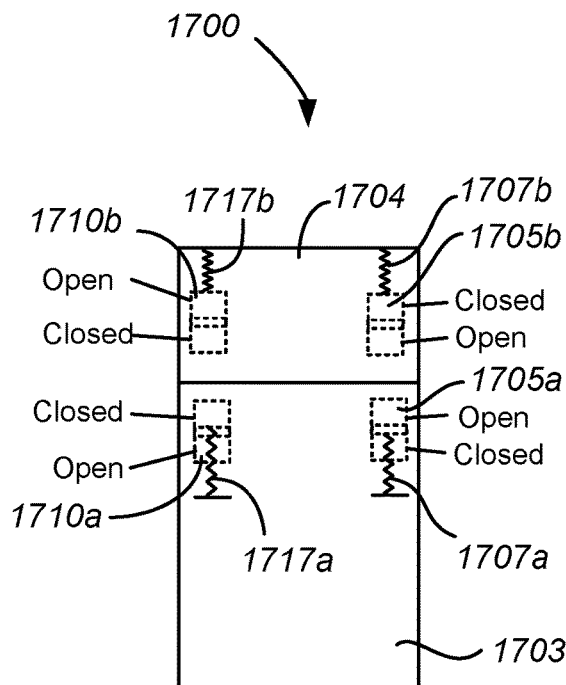
FIG. 17 is a side view of a case that includes two pairs of magnets attached to springs according to some embodiments of the disclosure.

FIG. 17 illustrates another embodiment of a case 1700. As shown in FIG. 17, case 1700 has springs attached to the first and second pairs of magnetic elements to change the over center behavior of the lid. Case 1700 can have a first pair of magnetic elements 1705a, 1705b configured to be repulsive and a second pair of magnetic elements 1710a, 1710b configured to attract. However, in this embodiment springs 1707a, 1707b can be attached to first pair of magnetic elements 1705a, 1705b and springs 1717a, 1717b can be attached to second pair of magnetic elements 1710a, 1710b. Springs 1707a, 1707b, 1717a, 1717b can be used to change the over center position and behavior of lid 1704. For example, when in the closed position, first and second magnetic elements 1705a, 1705b can repel each other and compress springs 1707a, 1707b, relieving some of the repulsive forces. Conversely, while in the closed position second pair of magnetic elements 1710a, 1710b can be attracted closer together resulting in higher attractive forces since springs 1717a, 1717b allow the magnetic elements to move closer together. Other configurations of springs can be used with magnetic elements without departing from this disclosure.

Figure 18:
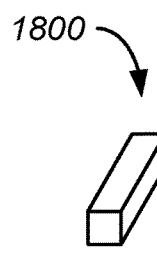
FIG. 18 is an isometric view of a magnet that may be used in a case according to some embodiments of the disclosure.
Figure 19:
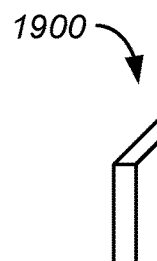
FIG. 19 is an isometric view of a magnet that may be used in a case according to some embodiments of the disclosure.
Figure 20:
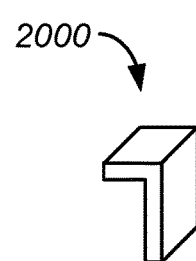
FIG. 20 is an isometric view of a magnet that may be used in a case according to some embodiments of the disclosure.
Figure 21:
FIG. 21 is an isometric view of a magnet that may be used in a case according to some embodiments of the disclosure.

Now referring to FIGS. 18-21, various magnet geometries can be used in the cases discussed above. These are only examples, and other geometries can be used without departing from the disclosure. FIG. 18 shows a square bar 1800, while FIG. 19 shows a rectangular bar 1900. FIG. 20 shows an "L" shaped bar 2000 while FIG. 21 shows a cylindrical bar 2100.

Spring Actuated Case

Figure 22A:
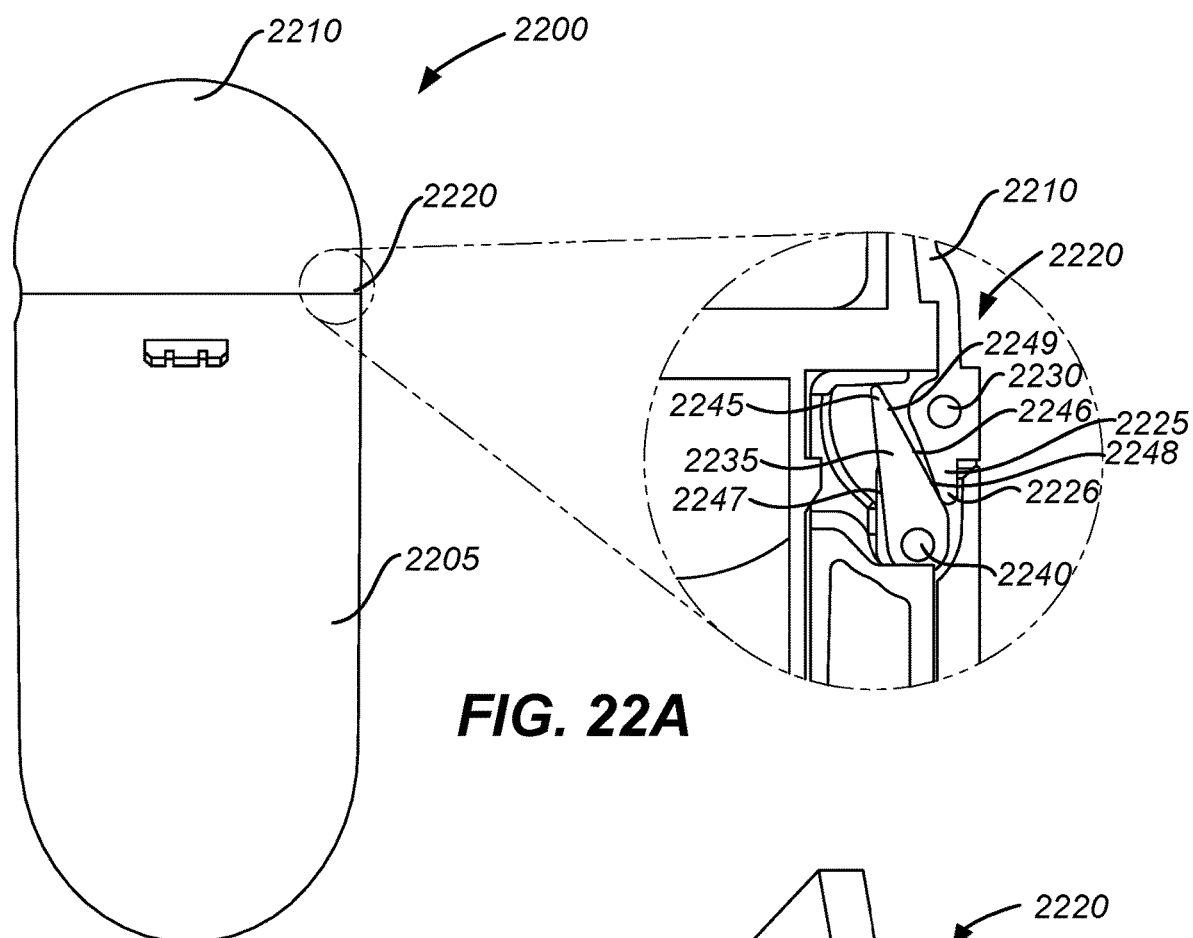
FIG. 22A is a side view of a case with a torsion spring over center mechanism according to some embodiments of the disclosure with its lid closed.

Now referring to FIGS. 22A-22D a case and a spring actuated hinges are illustrated. As shown in FIG. 22A, case 2200 has a lid 2210 with a spring actuated over center mechanism 2220. Case 2200 can be similar to case 100 illustrated in FIG. 1 and case 1300 illustrated in FIG. 13 and in some embodiments can used to store and charge a pair of earbuds or other type of portable listening device. In other embodiments, however case 2200 can be used to store a variety of other objects different than portable listening devices.

Similar to the cases discussed above, case 2200 can have a closed position, illustrated in FIG. 22A where a housing 2205 is covered by a lid 2210 that is pivotally coupled to the housing. Case 2200 can also have an open position, illustrated in FIG. 22D where lid 2210 is pivotally displaced from housing 2205. A spring actuated over center mechanism 2220 is shown in more detail in the expanded view in FIG. 22A. Lid 2210 includes an extension 2225 attached to the lid and disposed on an opposite side of pivotable joint 2230 from the lid. That is, when lid 2210 rotates about pivotable joint 2230, extension 2225 also rotates about the pivotable joint. Extension 2225 has a rounded distal end 2226 that is in contact with a spring loaded arm 2235 such that the lid resists rotating from the open position to the closed position until the lid is moved past an over center position (illustrated in FIG. 22C) when the lid is then impelled to the closed position (illustrated in FIG. 22D).

Spring loaded arm 2235 is attached to a second pivotable joint 2240 at a first end and extends to a distal tip 2245. Spring loaded arm 2235 can have a rounded distal tip 2245 with a first and second surface 2246, 2247, respectively arranged opposite each other and extending between the distal tip and the first end. In the illustration in FIG. 22A, spring loaded arm 2235 has a rotational force from a torsion spring applying a clock-wise torque. As lid 2210 is moved towards the open position, extension 2225 rotates in a clock-wise direction about pivotable joint 2230, slides along a first portion 2248 of first surface 2246, and forces arm 2235 in a counter-clock-wise direction increasing the clock-wise torque on the arm. Thus, spring loaded mechanism 2220 resists lid 2210 transitioning from the closed position (illustrated in FIG. 22A) towards the open position (illustrated in FIG. 22D.)

Figure 22B:
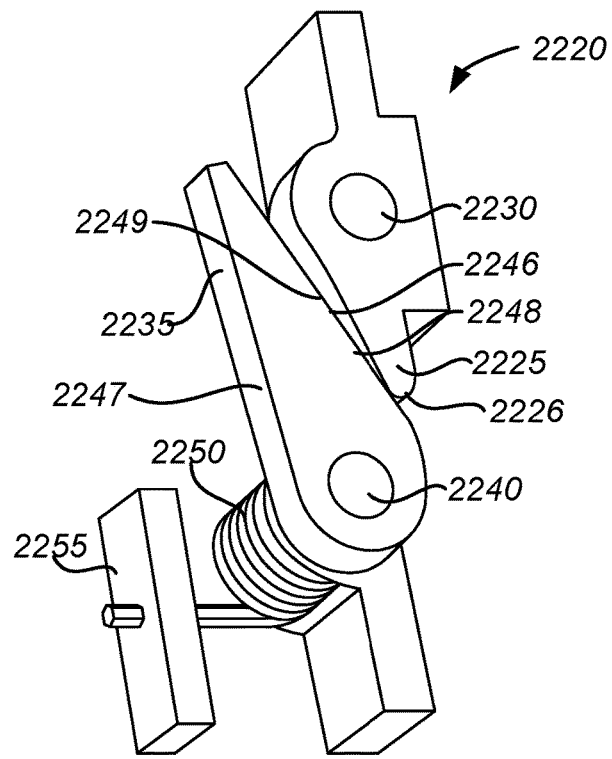
FIG. 22B is an isometric view of the torsion spring over center mechanism illustrated in FIG. 22A.

FIG. 22B illustrates an isometric view of spring loaded mechanism 2220. As shown in FIG. 22B, spring loaded mechanism 2220 includes a spring loaded arm 2235, extension 2225, torsion spring 2250 and spring stop 2255. Torsion spring 2250 is formed around a pin of second pivotable joint 2240, however in other embodiments a different configuration for the mechanism can be used including, but not limited to, cantilevered springs and coil springs.

Figure 22C:
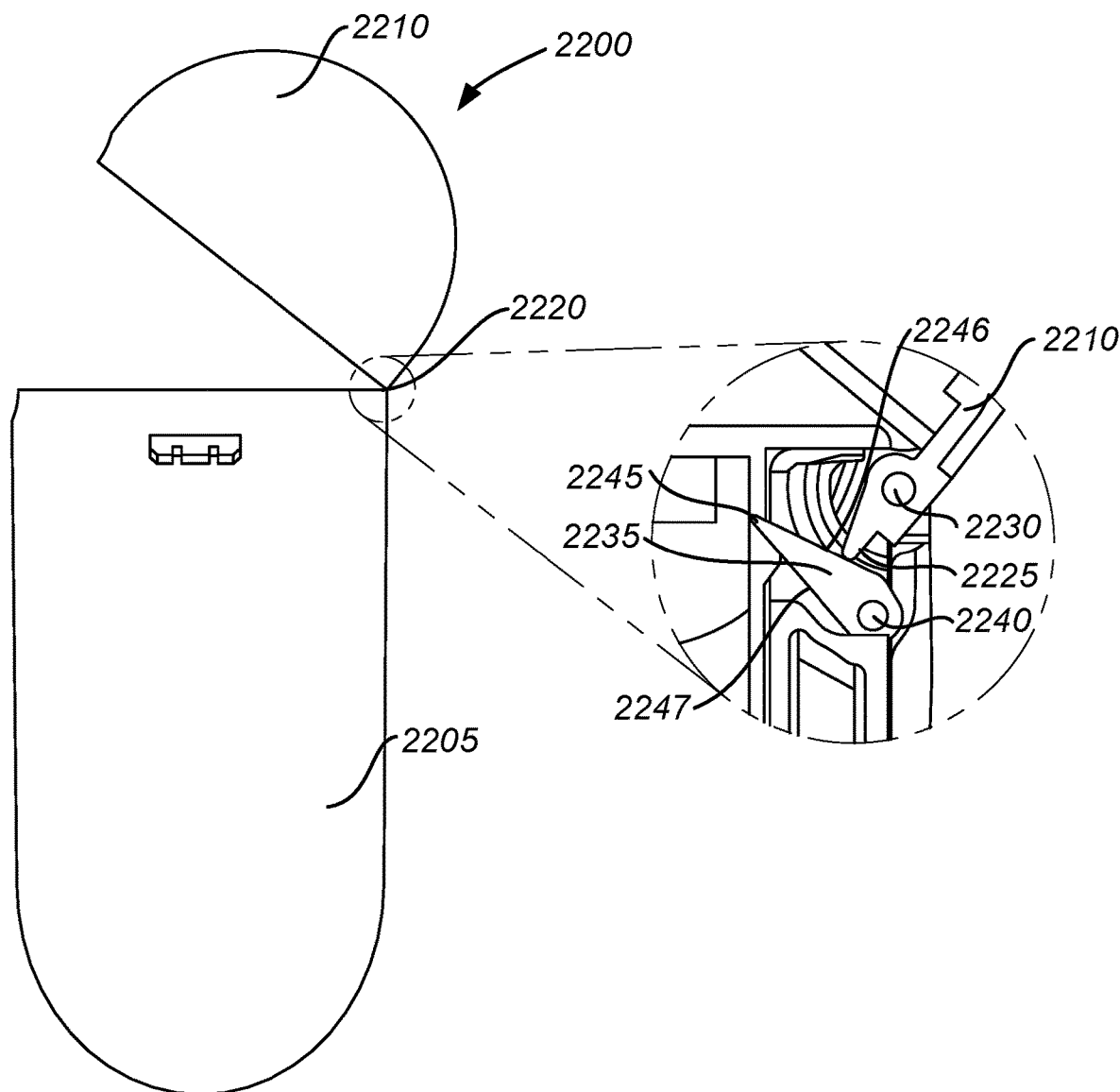
FIG. 22C is a side view of the case illustrated in FIG. 22A with its lid partially open.

FIG. 22C illustrates case 2200 with a partially open lid 2210. As shown in FIG. 22C, lid 2210 is shown in an over center position where the lid is in a first stable position when in the closed position (illustrated in FIG. 22A) and is in a second stable position when in the open position (illustrated in FIG. 22D), but is in an unstable position in-between the closed position and the open position. In some embodiments the over-center performance of lid 2210 can be achieved by extension 2225 having a rounded distal end 2226 that is in contact with arm 2235 that has a clockwise torque applied to it. In various embodiments extension 2225 is oriented perpendicular to first surface 2246 when in the unstable position in-between the closed position and the open position. In some embodiments arm 2235 and or distal end 2226 can have a lubricant and/or one or more lubricant channels on it to maintain a low coefficient of friction between the parts and to provide smooth actuation.

Figure 22D:
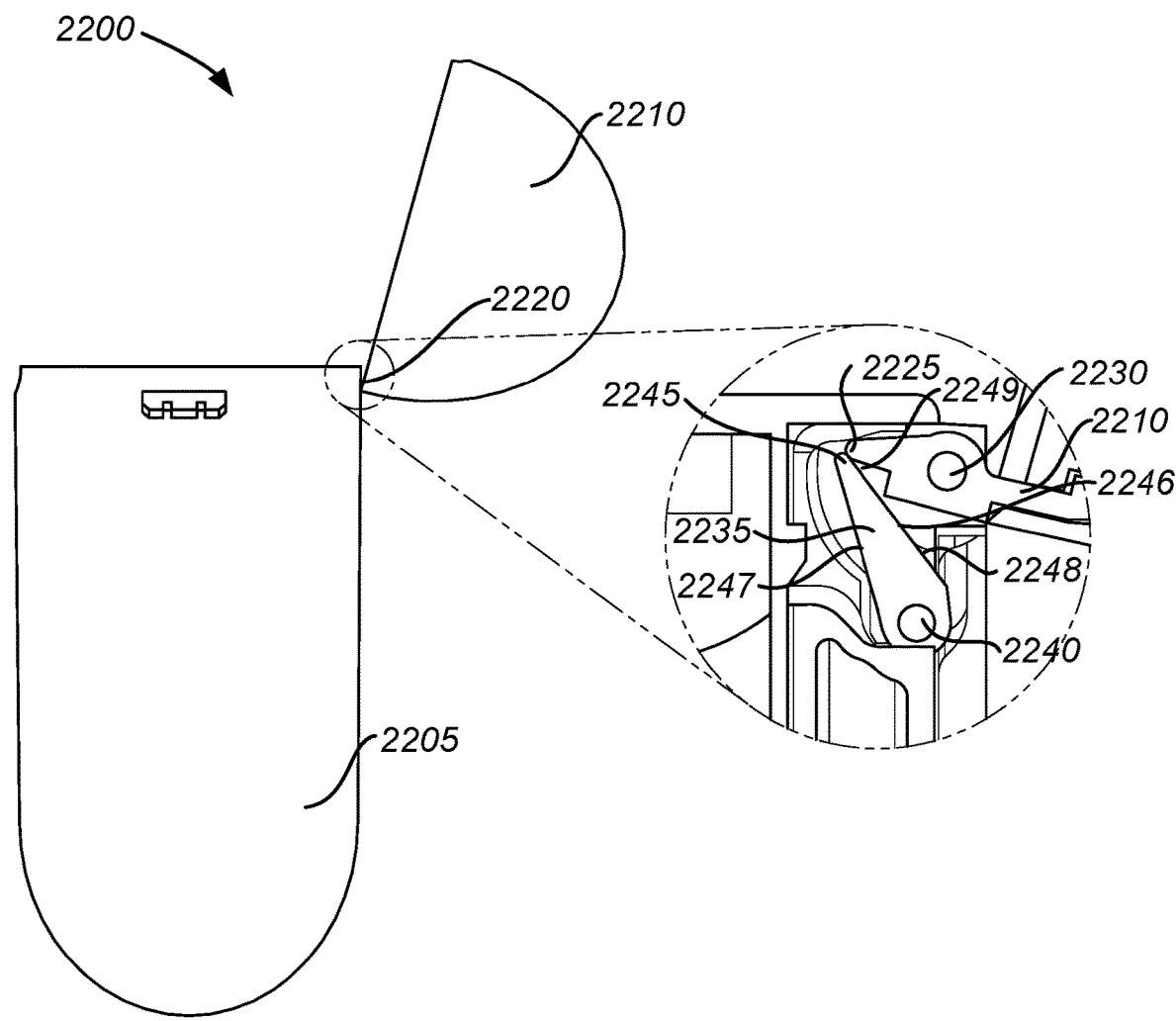
FIG. 22D is a side view of the case illustrated in FIG. 22A with its lid open further.

FIG. 22D illustrates case 2200 with a fully open lid 2210. As shown in FIG. 22D, lid 2210 is past the over-center position and is in a stable open position. In some embodiments the stable position can be achieved by extension 2225 being past the over center location on arm 2235, with extension 2225 sliding along a second portion 2249 of first surface 2246, and the arm holding the lid open due to the clock-wise torque applied to the arm by torsion spring 2250 (see FIG. 22B).

Earbud Case with Wireless Charging Transmitter

Figure 23:
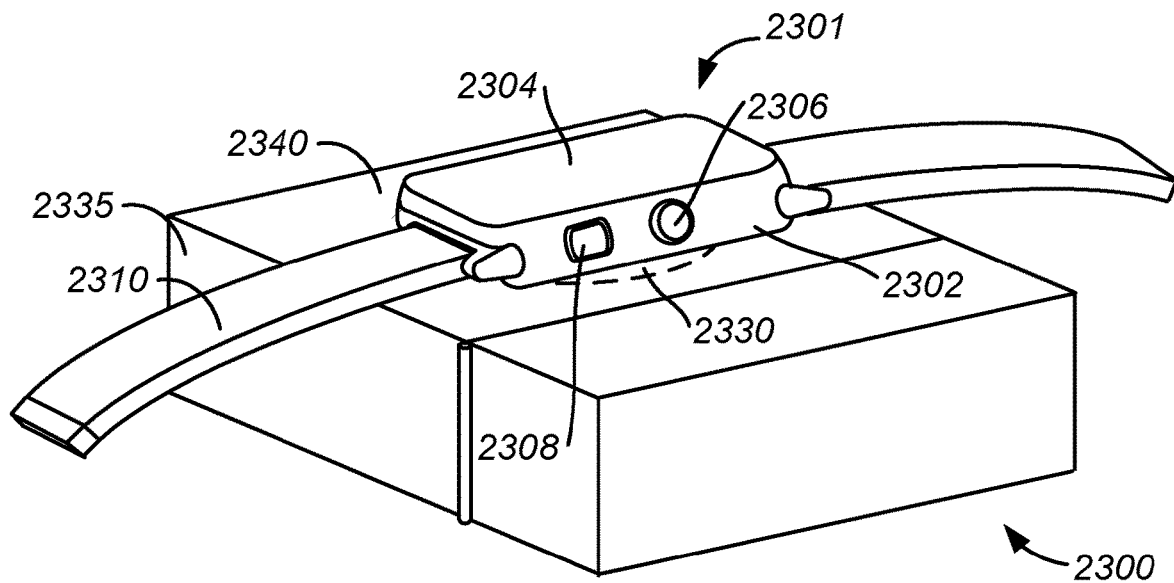
FIG. 23 is a simplified perspective view of a wireless charging system according to embodiments of the disclosure.

Reference is now made to FIG. 23, which illustrates an earbud case 2300 that includes a wireless power transmitting component 2330 that enables the case to wirelessly charge an accessory electronic device outside of the case instead of within the case. For example, as shown in FIG. 23, case 2300 is depicted as wireless charging a watch 2301 that is placed over and aligned with wireless power transmitting component 2330. While FIG. 23 illustrates a watch as the accessory device being charged, embodiments of the disclosure can be used to wirelessly charge other appropriate electronic devices as well. In some instances, embodiments of the disclosure are particularly well suited for use with portable electronic media devices because of their potentially small form factor. As used herein, an electronic media device includes any device with at least one electronic component that can be used to present human-perceivable media. Such devices can include, for example, portable music players (e.g., MP3 devices and Apple's iPod™ devices), portable video players (e.g., portable DVD players), cellular telephones (e.g., smart telephones such as Apple's iPhone devices), video cameras, digital still cameras, projection systems (e.g., holographic projection systems), gaming systems, PDAs, as well as tablet (e.g., Apple's iPad devices), laptop or other mobile computers. Some of these devices can be configured to provide audio, video or other data or sensory output.

In the embodiment illustrated in FIG. 23, case 2300 can include all or some of the features of case 204 discussed above with respect to FIG. 2 along with a second charging system in which a wireless power transmitting component 2330 is positioned within housing 2335 adjacent to an exterior charging surface 2340. In some embodiments exterior charging surface 2340 can be any exterior surface of case 2300. Wireless power transmitting component 2330 can be configured to wirelessly transmit power across housing 2335 to a power receiving coil (not shown in FIG. 23) of watch 2301 when the watch is positioned outside housing 2335 adjacent to exterior charging surface 2340, as discussed in more detail below.

As further shown in FIG. 23, watch 2301 includes a casing 2302 that houses a display 2304 and various input devices including a dial 2306 and a button 2308. Watch 2301 can be worn on a user's wrist and secured thereto by a band 2310. Casing 2302 also houses electronic circuitry (not shown in FIG. 23), including a processor and communication circuitry. A battery (not shown in FIG. 23) internal to casing 2302 powers watch 2301. The battery can be recharged by a wireless power transfer system and watch 2301 can include circuitry configured to operate as a receiver in the wireless power transfer system while wireless power transmitter component 2330 is a transmitter in the system. One example of a wireless power transfer system is an inductive power transfer system. In an inductive power transfer system, a power-receiving electronic device includes or otherwise incorporates an inductive power-receiving element configured to wirelessly receive power and/or charge one or more internal batteries. Similarly, a charging device (i.e., power transmitting component) includes or otherwise incorporates an inductive power-transmitting element configured to wirelessly transmit power to the power-receiving electronic device.

Figure 24:
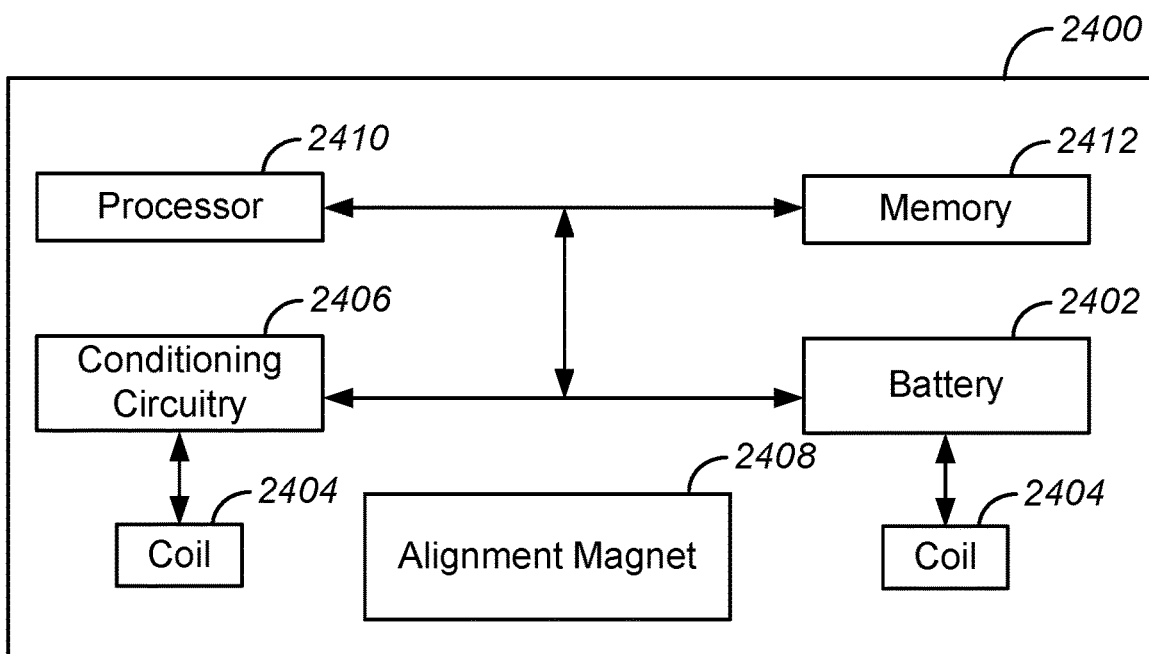
FIG. 24 is a block diagram of an inductive power receiving system that can be part of the charging system illustrated in FIG. 23 according to some embodiments.

FIG. 24 is a block diagram of inductive power receiving system 2400 according to an embodiment of the present disclosure. As shown in FIG. 24, system 2400 is an inductive power receiving system that can be located within casing 2302 of watch 2301 (see FIG. 23) or within a different type of electronic accessory that can be charged by wireless power transmitting component 2330. When power receiving system 2400 is operatively coupled with an appropriate inductive power transmitting component, such as wireless power transmitting component 2330, battery 2402 within the device can be wirelessly charged. Battery 2402 is operably connected to a receive coil 2404 via power conditioning circuitry 2406. Receive coil 2404 can be inductively coupled to a transmit coil of a charging device to receive power wirelessly from the charging device and pass the received power to battery 2402 within the electronic device via power conditioning circuitry 2406. Power conditioning circuitry 2406 can be configured to convert the alternating current received by the receive coil 2404 into direct current power for use by other components of the device. A processing unit 2410 can direct the power, via one or more routing circuits and under the execution of an appropriate program residing in a memory 2412, to perform or coordinate one or more functions of the electronic device typically powered by battery 2402.

Figure 25:
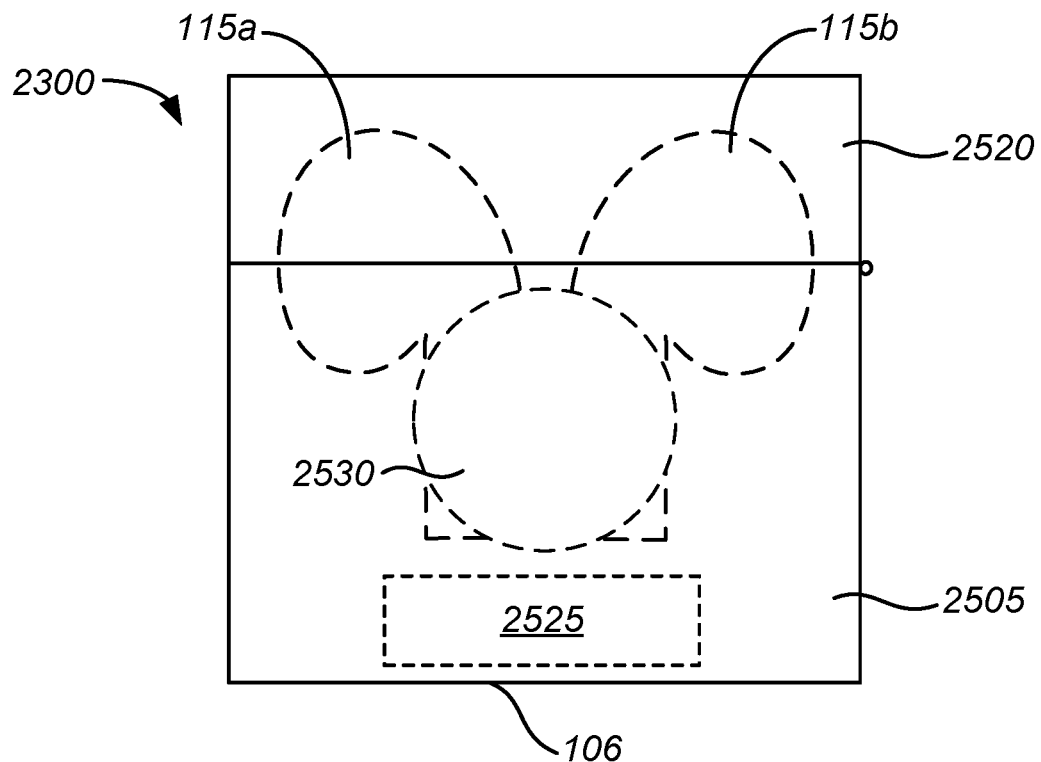
FIG. 25 is a simplified plan view of the earbud case illustrated in FIG. 23.

Now referring to FIG. 25, case 2300 is illustrated with a pair of earbuds 115a, 115b stored within a housing 2505 of the case and covered by a lid 2520. Case 2300 can charge earbuds 115a, 115b in the same manner as case 100 discussed above (i.e., either with a wired connection or with a wireless power transfer system). Case 2300 can also, however, include an inductive charging system 2525 positioned and configured to charge a different portable electronic device positioned outside of case 2300 instead of within the case. Inductive charging system 2525 can include a wireless power transmitting component to wirelessly charge an auxiliary device such as watch 2301 (see FIG. 23). In some embodiments case 2500 can be different from case 100 (see FIG. 1) and can be of any other configuration having one or more cavities and a lid that covers the one or more cavities. In one example lid 2520 can be separable from the case. Inductive charging system 2525 can include wireless charging circuitry within housing 2505 that enables case 2300 to wirelessly recharge a battery, for example, battery 2402 (see FIG. 24) of watch 2301.

Figure 26:
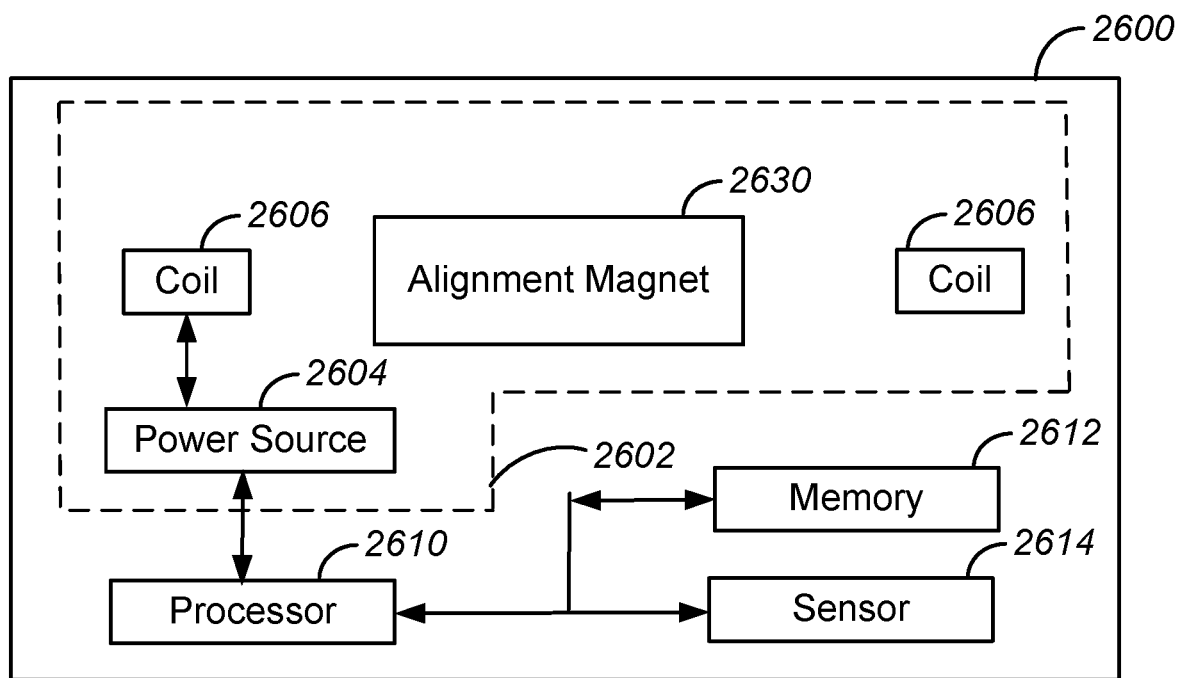
FIG. 26 is a block diagram of an embodiment of the inductive power transmitting system illustrated in FIG. 23.

FIG. 26 is a block diagram of a wireless charging system 2600 according to an embodiment of the disclosure. As shown in FIG. 26, wireless charging system 2600 includes an inductive power transmitting component 2602. Inductive power transmitting component 2602 includes a power source 2604, which can be case battery 227 (see FIG. 2), operatively coupled to a transmit coil 2606 to transmit power to a wearable device via electromagnetic induction or magnetic resonance.

Transmit coil 2606 can be an electromagnetic coil that produces a time-varying electromagnetic flux to induce a current within an electromagnetic coil within an electronic device (e.g., coil 2404 in FIG. 24). Transmit coil 2606 can transmit power at a selected frequency or band of frequencies. In one example the transmit frequency is substantially fixed, although this is not required. In another example, the transmit frequency can be adjusted to improve power transfer efficiency for particular operational conditions. More particularly, a high transmit frequency can be selected if more power is required by the accessory and a low transmit frequency can be selected if less power is required by the accessory. In other examples, transmit coil 2606 can produce a static electromagnetic field and can physically move, shift, or otherwise change its position to produce a spatially-varying electromagnetic flux to induce a current within the receive coil.

When watch 2301 (see FIG. 23) is operatively coupled (e.g., disposed on or adjacent to) case 2300, the wearable electronic device can receive charge to replenish the charge of its rechargeable battery or to provide power to operating components associated with the electronic device. To facilitate the transfer of electromagnetic energy, transmit coil 2606 can be positioned within the housing of case 2300 (see FIG. 23) such that it aligns with receive coil 2404 (see FIG. 24) in watch 2301 along a mutual axis. If misaligned, the power transfer efficiency between transmit coil 2606 and receive coil 2404 (see FIG. 24) can decrease as misalignment increases. In some embodiments, one or more alignment features can be used to aid the alignment along a mutual axis, including mechanical alignment features (e.g., recesses, ledges, detents) and magnetic features (e.g., alignment magnet 2630), as discussed in more detail below.

As one example, alignment magnet 2630 can be included in case 2300 that magnetically mates with an alignment magnet (not shown) of watch 2301 to facilitate proper alignment of the case and the wearable electronic device. More specifically, alignment magnet 2630 attracts the mating alignment magnet in watch 2301 such that the wearable device is laterally moved into a particular location and held firmly against an outer surface of the case. Additionally, the top and bottom surfaces of case 2300 and watch 2301, respectively, can cooperate to further facilitate alignment. For example, in one embodiment a bottom surface of watch 2301 is convex and a top surface of case 2300 is concave, following the same curvature as the bottom surface of the wearable device.

In some embodiments, case 2300 (see FIG. 23) can also include one or more sensors to determine whether watch 2301 is present and ready to receive transmitted power from the charger. For example, watch 2301 can include an optical sensor, such as an infrared proximity sensor. When watch 2301 is attached to case 2300, the infrared proximity sensor can produce a signal used to determine the presence of the wearable device. Other methods or structures to verify the presence of watch 2301 can include a mass sensor, a mechanical interlock, switch, button or the like, a Hall-effect sensor, or other electronic sensor.

Some embodiments can include a prioritized charging algorithm to preferentially use the stored charge in case battery 227 (see FIG. 2) depending on what chargeable devices are coupled to case 2300. For example charging system 2525 (see FIG. 25) can be programmed to first recharge earbuds 115a, 115b, then charge watch 2301. In another example a user is able to program the charging priority while in another example case 2300 can simply charge any device that is coupled to it. In further examples case 2300 can be coupled to a power source through connector 345 (see FIG. 3) and can charge one device, preferentially charge multiple devices or simultaneously charge multiple devices.

Some embodiments can have a wired interface for case 2300 charging battery 2402 (see FIG. 24) and/or for exchanging data with watch 2301. The wired interface can be in addition to or instead of a wireless interface. For example, in one embodiment case 2300 can include contacts that are sized and positioned to physically and electrically couple to one or more contacts on watch 2301. The contacts can include one or more power contacts as well as one or more data contacts, such as a pair of differential data contacts. In another embodiment connector 345 (see FIG. 3) of case can be used to charge watch 2301.

Wirelessly Charged Case

Figure 27:
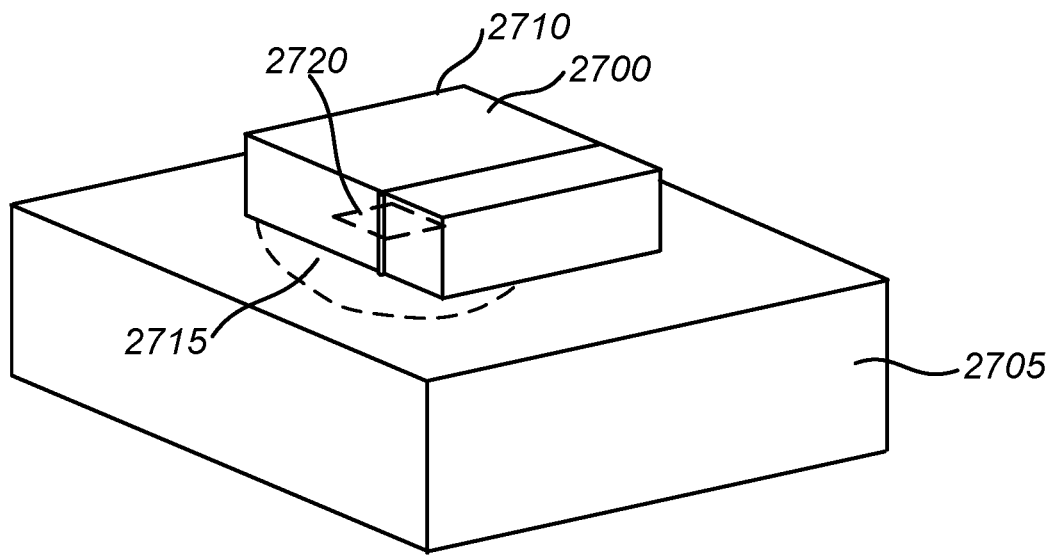
FIG. 27 is a simplified isometric view of an inductively charged case on an inductive charging system according to some embodiments of the disclosure.

Now referring to FIG. 27, a simplified perspective view of case 2700 on a charging station 2705 is illustrated. As shown in FIG. 27, case 2700 can be similar to other cases in this disclosure, such as case 100 in FIG. 1, and can be inductively charged by a charging station 2705. Case 2700 can have a rechargeable battery that can be inductively recharged with a wireless charging system similar to that illustrated and described above with reference to FIGS. 23 through 26. More specifically, all of the features described above with regard to inductively charged watch 2301 can be employed in inductively charged case 2700.

Wireless charging station 2705 can include wireless charging circuitry within housing 2710 that enables case 2700 to wirelessly recharge an internal battery. Wireless charging station 2705 can include an inductive power transmitting coil 2715, that is similar to wireless power transmitting component 2602 described above in FIG. 26. Inductive power transmitting coil 2715 is capable of transmitting power to case 2700 via electromagnetic induction or magnetic resonance. When case 2700 is operatively coupled (e.g., disposed on or adjacent to) charging station 2705, the case can receive charge to replenish the charge of its rechargeable battery or to provide power to operating components associated with the case.

To facilitate the transfer of electromagnetic energy, transmit coil 2715 can be positioned within the housing of charging station 2705 such that it aligns with one or more receive coils 2720 in case 2700 along a mutual axis. If misaligned, the power transfer efficiency between transmit coil 2715 and receive coil 2720 can decrease as misalignment increases. In some embodiments, one or more alignment features can be used to aid the alignment along a mutual axis, including mechanical alignment features (e.g., recesses, ledges, detents) and magnetic features (e.g., alignment magnet), as discussed herein. In further embodiments case 2700 can include more than one receive coil and can detect which receive coil is better aligned and selectively only receive charge from that particular coil. In various embodiments case 2700 can use one or more planar receive coils 2720, however in other embodiments other receive coil designs can be used.

Waterproof Receptacle Connector

Figure 28:
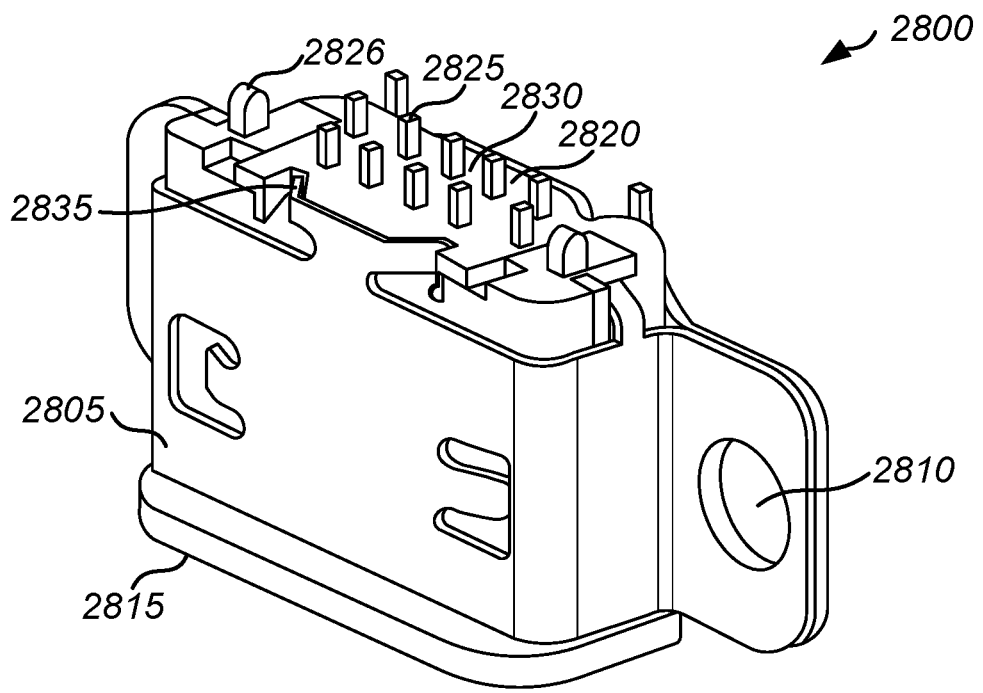
FIG. 28 is an isometric view of an electrical connector that can be included in the case illustrated in FIG. 1 according to some embodiments of the disclosure.
Figure 29:
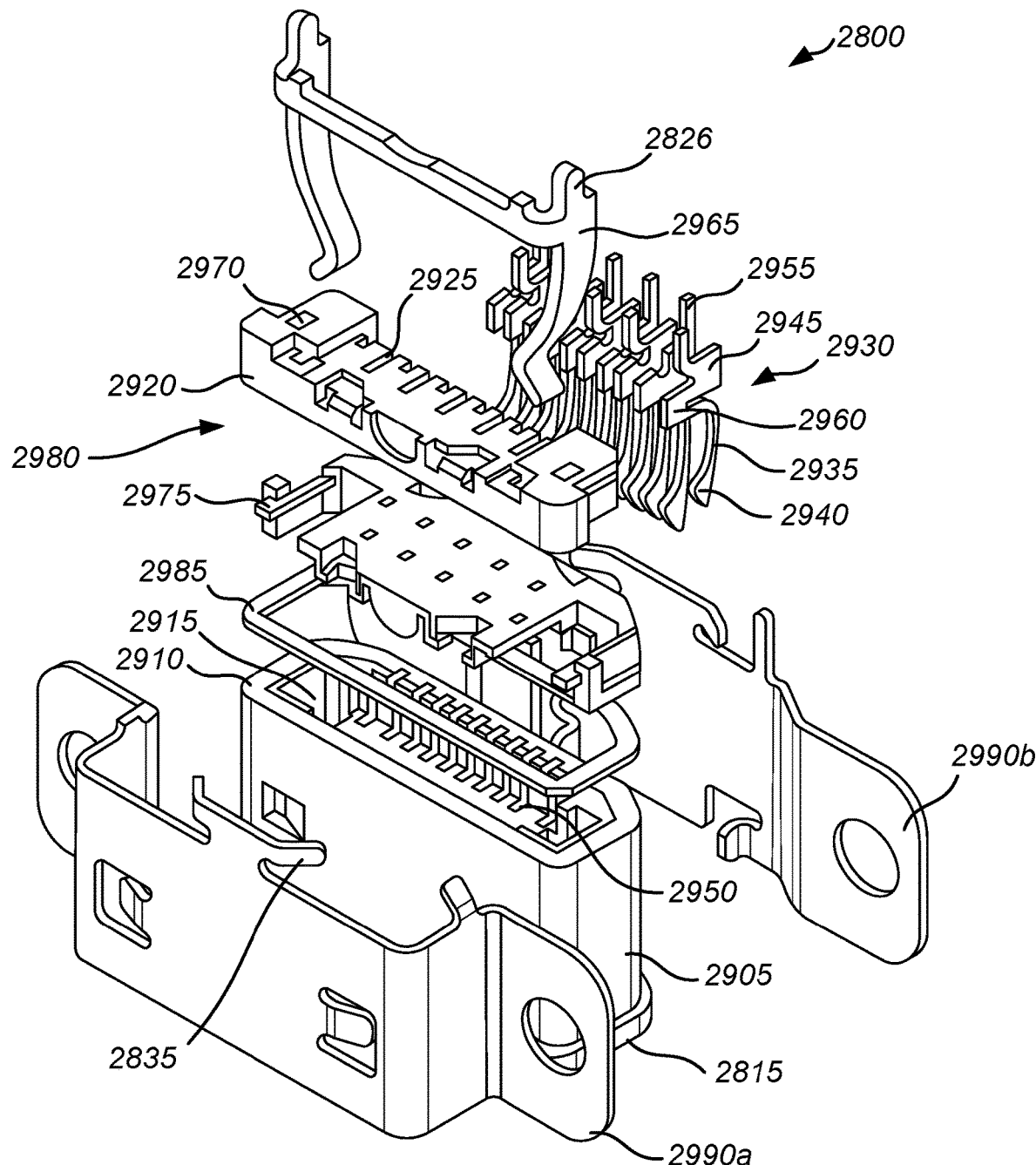
FIG. 29 is an isometric exploded view of the electrical connector illustrated in FIG. 28.

FIGS. 28 and 29 illustrate a liquid-tight electrical connector 2800. As shown in FIG. 28, electrical connector 2800 can have mounting flanges and sealed features to make it resistant or impervious to liquid penetration. Electrical connector 2800 can be used to couple power and data to a case, similar to connector 345 in FIG. 3. In some embodiments connector 2800 can, for example, be any non-proprietary interface such as a USB connector or can be any proprietary interface such as the Lightning connector used by Apple Incorporated of Cupertino, Calif. In various embodiments connector 2800 can be liquid-tight, as discussed in more detail below.

Metallic bracket 2805 is formed around an exterior portion of connector 2800 and has one or more mounting holes 2810 for securing the connector to a circuit board or a chassis. Connector 2800 has a receiving face 2815 that has a front opening (not shown in FIG. 28, but shown in FIG. 3 for connector 345) for receiving a plug portion of a mating connector. An interconnection face 2820 contains a plurality of metallic pins 2825 that each connect to an internal electrical contact as described in more detail below. One or more ground pins 2826 can also extend out of interconnection face 2820. Metallic pins 2825 and ground pins 2826 can be sealed by an overmolded portion 2830 so they are liquid-tight. Metallic bracket 2805 can be two pieces and welded together as described below. Metallic bracket 2805 can also have one or more deformable fingers 2835 that can be used to secure the components of connector 2800 together.

As shown in FIG. 29 connector 2800 includes a contact plate 2980 coupled to a housing 2905 with a gasket to make the connector liquid-tight. Housing 2905 is made from an electrically insulative polymer that extends between receiving face 2815 and a rear face 2910. Housing 2905 defines a cavity 2915 that communicates with a front opening in receiving face 2815 to receive a plug portion of a mating plug connector. A spacer 2920 is formed from a plastic material and has a plurality of retention features 2925 that are each configured to each receive an electrical contact from a set of electrical contacts 2930 that can be stitched into it. Each electrical contact in the set of electrical contacts 2930, can include an elongated beam portion 2935 positioned between a contact tip 2940 and an anchor portion 2945. Each contact tip 2940 is positioned within cavity 2915 so that it can be electrically coupled to a corresponding plug connector contact during a mating event.

Beam portion 2935 allows tip 2940 of each contact to flex slightly downward during a mating event and biases the tip to keep physical and electrical contact with a contact in the plug connector that aligns with the particular receptacle contact. Anchor portion 2945 can be a substantially flat plate with one or more cutouts that fits within a slot 2950 of housing 2905 to secure or anchor the contacts in place. Set of electrical contacts 2930 can further include electrical leads 2955 that extend out of interconnection face 2820 (see FIG. 28) of connector assembly 2800 that can couple the receptacle connector to a printed circuit board or similar substrate. Each contact in the set of contacts 2930 can also have an alignment portion 2960 adjacent anchor portion 2945 to align the contact structures within slots 2950 of housing 2905. In some particular embodiments, set of electrical contacts 2930 includes eight contacts spaced apart from each other along a single row.

A ground latch 2965 can be formed from a conductive metal and inserted through ground slots 2970 in spacer 2920. The ground latch can include first and second spring arms extending along opposing sides of the set of contacts 2930. The first and second spring arms can latch to retention features of a corresponding plug connector to assist in retaining the plug connector within the receptacle connector 2800 after a mating event. In other embodiments ground latch 2965 can be insert mold within spacer 2920. Spacer 2920, with set of contacts 2930 and ground latch 2965, can then be overmolded with dielectric overmold portion 2975. Overmold portion 2975 covers a portion of spacer 2920 and the anchor portion of each contact in the set of contacts 2930 forming a liquid-tight seal to leads 2955 and ground latch 2965 and creating an integrated contact plate 2980. A gasket 2985 can be disposed against rear face 2910 of housing 2905 and contact plate 2980 can then be pressed against the gasket to form a liquid-tight assembly. Metallic bracket 2805 can include a top bracket 2990*a* laser welded to a bottom bracket 2990*b*. Bracket fingers 2835 can be formed to hold contact plate 2980 against housing 2905 such that connector 2800 is liquid-tight. That is, if liquid were to enter receiving opening of connector (see connector 345 in FIG. 3) the liquid would not be able to pass through the connector and enter case 100.

Wireless Earbuds

Figure 30:
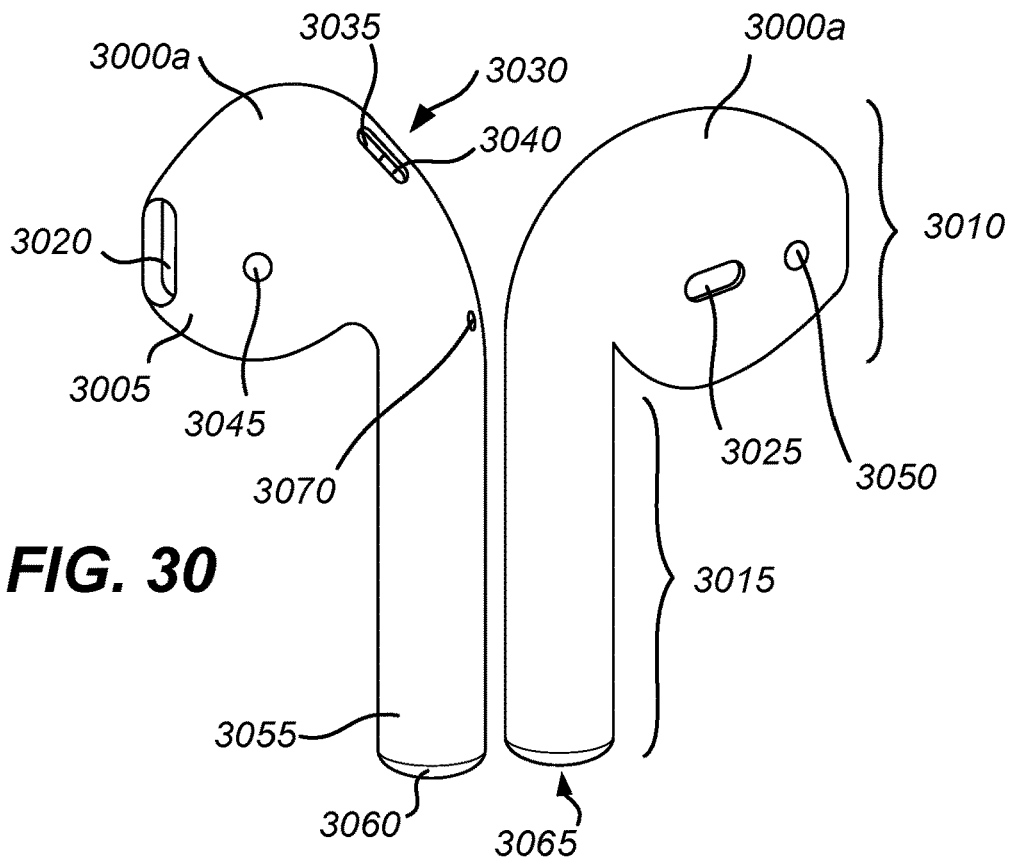
FIG. 30 illustrates isometric front and rear views of a left earbud according to some embodiments of the disclosure.
Figure 31:
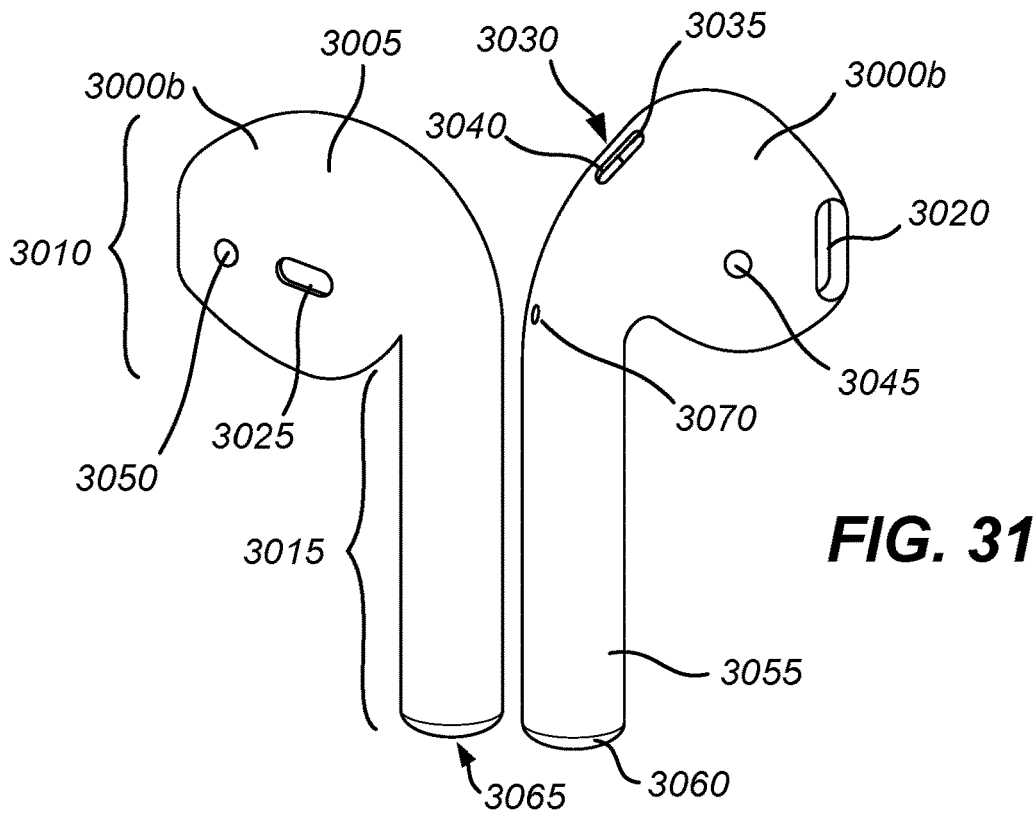
FIG. 31 illustrates isometric front and rear views of a right earbud according to some embodiments of the disclosure.

Now referring to FIGS. 30-46, non-occluding earbuds 3000*a*, 3000*b* and methods for making the same are described and illustrated. As shown in FIGS. 30 and 31 earbuds 3000*a*, 3000*b* can be similar to earbuds 115*a*, 115*b* illustrated in FIG. 1, however earbuds 3000*a*, 3000*b* can include various other features including in ear sensing and acoustic features as described in more detail below.

FIGS. 30 and 31 show front and rear perspective views, respectively, of a non-occluding left earbud 3000*a* (FIG. 30) and a non-occluding right earbud 3000*b* (FIG. 31). Generally, non-occluding earbuds are designed not to form an airtight seal between the ear (or ear canal) and the outer surface of the earbud. By way of contrast, occluding earbuds are generally designed to fit inside of the user's ear canal and form a substantially airtight seal. Each earbud 3000*a*, 3000*b* can include an external housing 3005 having an ear portion 3010 coupled to a stem portion 3015. Housing 3005 can have an asymmetric shape amenable to in-the-ear retention, but does not form an airtight seal with the user's ear or ear canal. The absence of an airtight seal can benefit from volumes within the earbud being specifically tuned (e.g., by specifically shaping the volumes and/or adding material to the volumes) to achieve a desired frequency response. Ear portion 3010 can include a directional sound port 3020 offset with respect to a center axis of the ear bud. Directional sound port 3020 can be designed to direct sound waves from an internal driver (e.g., part of an earbud speaker, not shown in FIGS. 30 and 31) directly into a user's ear canal.

In addition, secondary apertures in the earbud can be employed in housing 3005 to achieve desired sound performance. For example, one or more secondary apertures can serve as a controlled leak port to expose an acoustic pressure within the earbud to the external, surrounding environment. In this aspect, the secondary apertures can be calibrated to modify an acoustic response of the earbud. In this embodiment earbuds 3000a, 3000b each include a front leak port 3025 and a multiport 3030 formed in ear portion 3010. Multiport 3030 can include both a rear vent 3035 and a bass port 3040, that will be described in more detail below. In addition, earbuds according to embodiments of this disclosure can be constructed to have a seamless finish even though two or more parts are joined together to form part of the earbud.

Ear portion 3010 of earbuds 3000a, 3000b can also include one or more "in the ear" sensors to assist each earbud 3000a, 3000b in determining whether or not the earbud is in a user's ear. In one embodiment an optical tragus sensor 3045 is configured to sense the presence or absence of a user's tragus, and an optical concha sensor 3050 is configured to sense the presence or absence of a user's concha. Tragus and concha sensors 3045, 3050, respectively, can use any type of optical sensor including, but not limited to an LED or vertical cavity surface emitting laser (VCSEL) device. Further embodiments can include one or more capacitive sensors and/or accelerometers to detect the presence of a user's ear and/or earbud orientation, as described in more detail below. In the ear detection can be useful for features such as, but not limited to, determining which earbud 3000a, 3000b to use as a microphone when a user desires to accept a call and when a user stops using one earbud and starts using the other earbud.

A distal end 3055 of stem portion 3015 of each earbud 3000a, 3000b can include an electrical connector 3060 that is formed to make contact with a corresponding connector (e.g., a receptacle connector) of a charging station and/or earbud charging case, such as one of the connector structures described in FIGS. 4A-8C. In one particular embodiment, each connector 3060 can include first and second contacts spaced apart from each other in an oppositional and symmetrical relationship, such as partially annular earbud contacts 610 and 615 shown in FIG. 6B. Each of the first and second contacts can include an outer perimeter that is flush with an exterior surface of the stem portion and include an arcuate or other curved surface that creates a strong wiping action during a contact mating event. Electrical connector 3060 can be used to recharge an internal battery within each earbud 3000a, 3000b and in some cases can also be used to transfer data to and from each earbud. Distal end 3055 can also include a bottom microphone port 3065 (e.g., microphone aperture 635 illustrated in FIG. 6B) that works in conjunction with a top microphone port 3070 to receive a user's voice and/or perform noise cancellation.

Figure 32:
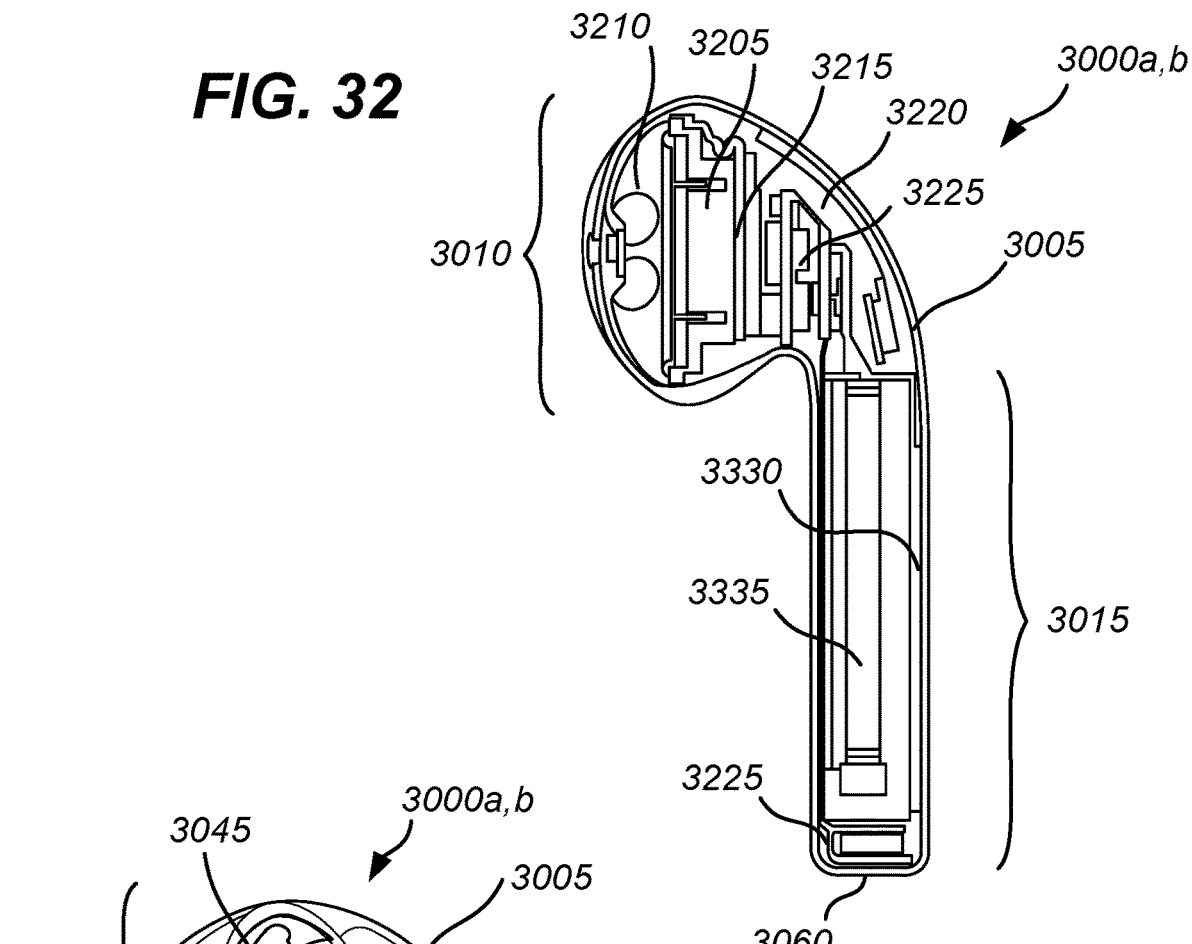
FIG. 32 is a cross-sectional view of one of the earbuds illustrated in FIGS. 30 and 31.
Figure 33:
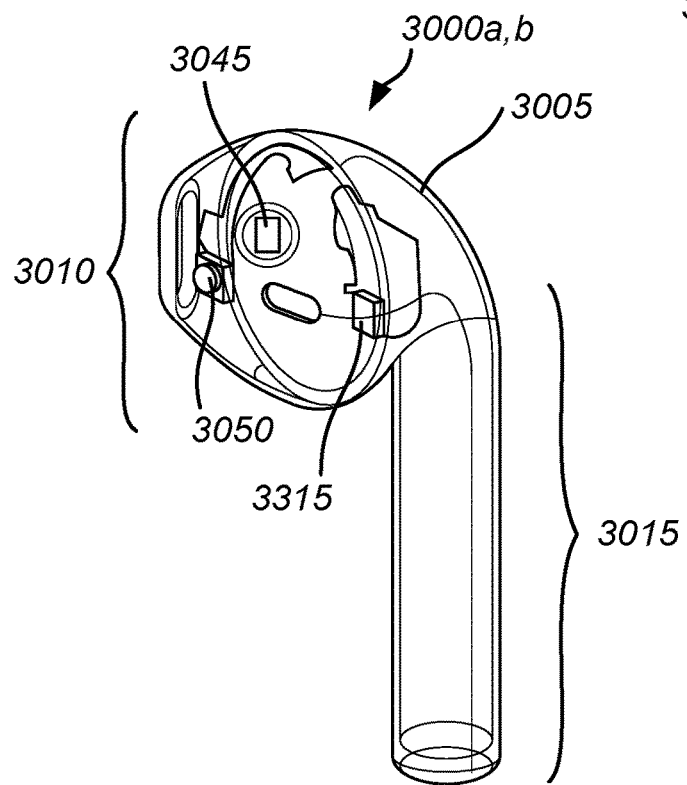
FIG. 33 is a cross-sectional view of one of the earbuds illustrated in FIGS. 30 and 31 with some components removed.

FIGS. 32 and 33 illustrate partial cross sections of earbuds 3000a, 3000b. As shown in FIG. 32, earbuds 3000a, 3000b include a driver 3205, an acoustic insert 3220, a flexible circuit 3225, an antenna 3330, a rechargeable battery 3335 and an electrical connector 3060. Driver 3205 is located within ear portion 3010 and defines a front acoustic volume 3210 in front of the driver and a rear acoustic volume 3215 behind the driver. Driver 3205 can include an electromagnetic voice coil, a driver magnet and a speaker diaphragm (not shown in FIG. 32). Acoustic insert 3220 is positioned behind driver 3205 and adhered to housing 3005, as described in more detail below. Ear portion 3010 further includes a folded up portion of a flexible circuit 3225 that can contain one or more sensors, controllers and myriad other circuits for operating earbud 3000a,b. Flexible circuit 3225 can include portions that are flexible as well as portions that are not flexible, such as multilayer epoxy and glass composite circuit boards and can further couple the myriad electronic systems of earbud 3000a, 3000b together, as described in more detail below.

Stem portion 3015 of earbud 3000a, 3000b can include an antenna 3330, a rechargeable battery 3335 and electrical connector 3060. A portion of flexible circuit 3225 can extend down and electrically connect to electrical connector 3060.

As shown in FIG. 33, earbuds 3000a, 3000b include several internal sensors. In FIG. 33 some internal components of earbud 3000a, 3000b have been removed for clarity. Ear portion 3010 can contain a tragus sensor 3045, a concha optical sensor 3050 and an accelerometer 3315 that can work together to determine whether earbud 3000a, 3000b is in a user's ear. Flexible circuit 3225 (see FIG. 32) can be used to electrically couple all these devices together.

Foldable, Flexible Circuit

Figure 34:
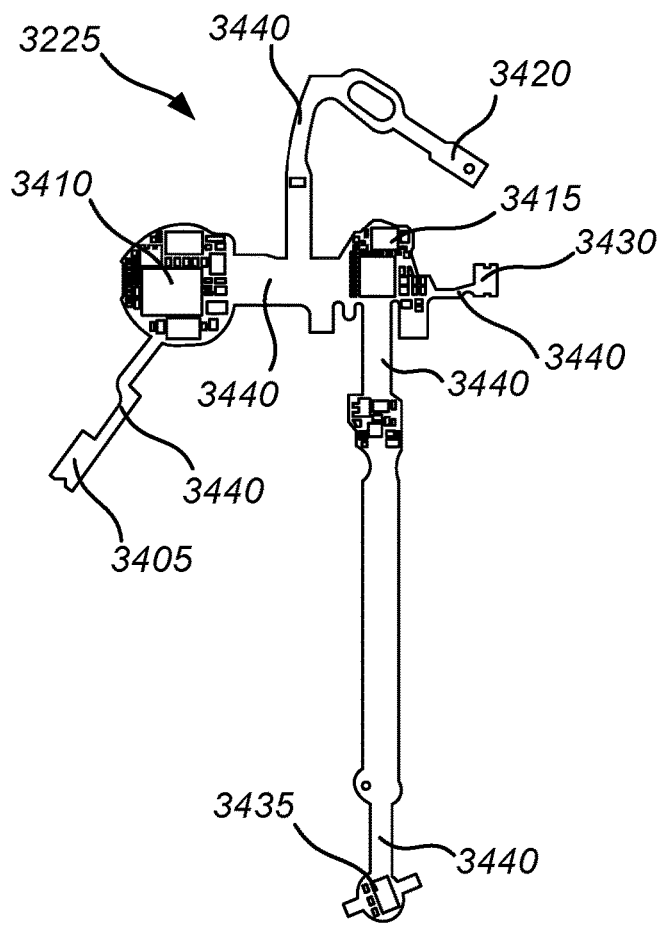
FIG. 34 is a plan view of a flexible circuit board that can be used in earbuds according to some embodiments of the disclosure.
Figure 35:
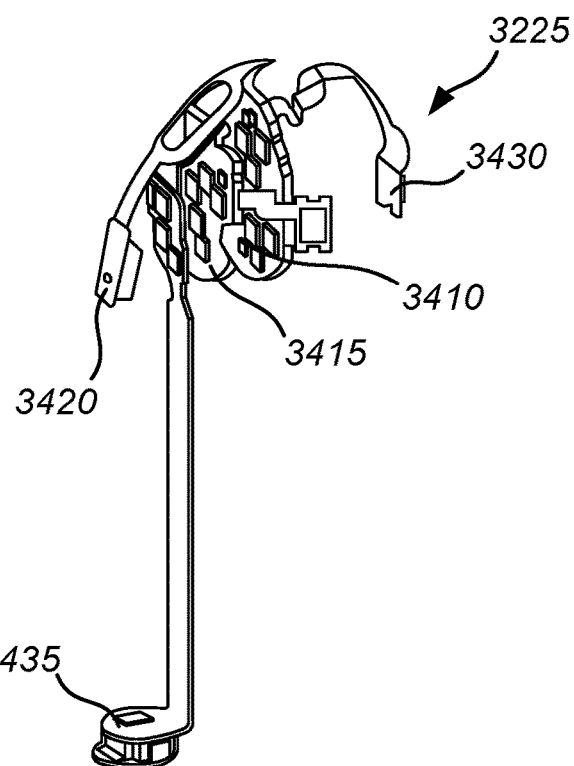
FIG. 35 is an isometric view of the flexible circuit board illustrated in FIG. 34.

FIGS. 34 and 35 illustrate simplified views of flexible circuit 3225. As shown in FIG. 34, flexible circuit 3225 is shown in a flat pattern. FIG. 35 shows flexible circuit 3225 folded up as it is installed in earbud 3000a, 3000b as shown in FIG. 32. Now referring simultaneously to FIGS. 34 and 35 the various portions of flexible circuit 3225 are described. A concha portion 3405 can be used to attach to and communicate with optical concha sensor 3050 (see FIG. 33). Towards this purpose, concha portion 3405 can include one or more electrical terminals that can be bonded to contacts of optical concha sensor 3050.

Processor portion 3410 can include one or more central processing units, controllers and passives. Processor portion 3410 can be a rigid portion of flexible circuit 3225 and can include multiple stacked routing layers. In one embodiment processor portion can have 4, 6, 8 or 10 routing layers.

An accelerometer portion 3415 can include one or more accelerometers to assist in detecting a position and/or orientation of the earbud, to assist in acting as a microphone that may be used to mitigate wind noise and to function as a user input device recognizing a tap or touching sequence on the earbud housing. A top microphone portion 3420 can be used to attach to and communicate with a top microphone through one or more electrical terminals. A tragus sensor portion 3430 can be used to attach to and communicate with optical tragus sensor 3045 (see FIG. 33) through one or more 3430 formed within portion, and a bottom microphone portion 3435 can be used to attach to and communicate with a bottom microphone through one or more terminals formed within portion 3435.

Each of the flexible portions 3440 can be sufficiently flexible to fold up flexible circuit 3225 as illustrated in FIG. 35. Further, each of the flexible portions 3440 can include one or more electrical traces that route electrical signals between different components of flexible circuit 3225. For example, flexible portion 3440 between concha portion 3405 and processor portion 3410 can include one or more electrical traces that run between the concha portion terminals and the processor. Similarly, flexible portion 3440 between bottom microphone portion 3435 can include one or more electrical traces that run between the bottom microphone terminals and the processor.

Earbud Connectors

FIGS. 36-41 illustrate several embodiments of earbud connectors that can be used in the distal end of a stem portion of each earbud such as connector 3060 in FIG. 30. As shown in FIG. 36, connector 3600 can be affixed to a distal end 3055 of an earbud 3000a, 3000b and be used to couple charging and data signals to the earbuds. Connector 3600 can be mated with receptacle connectors that can be disposed in a case or docking station such as the receptacle connectors disclosed in FIGS. 4A-8C.

Connector 3600 is illustrated in FIG. 36 in a partially assembled state before it is attached to a distal end 3055 of a stem portion 3015 of earbud 3000a, 3000b. In this embodiment connector 3600 includes an inner circular metallic contact 3610 and an outer circular metallic contact 3615 with a dielectric ring 3620 separating the two contacts. In various embodiments inner circular contact 3610 can have an aperture 3613 within it that can be used for both a receptacle connector contact surface and an aperture for a microphone. In some embodiments inner and outer circular contacts 3610, 3615, can be separately manufactured components and can be made from a metal or alloy that can have one or more layers of plating, as described in more detail below. In various embodiments inner and outer circular contacts 3610, 3615, can be made from a copper or copper-based alloy such as, but not limited to C5212 phosphor bronze. In some embodiments inner and outer circular contacts 3610, 3615, can be individually machined, cast or metal injection molded. In further embodiments they can be made from an electrically conductive plastic or made from an insulative plastic that is plated with one or more metals or alloys.

As shown in FIG. 37, connector 3600 includes inner and outer circular contacts 3610, 3615, respectively that can be manufactured as separate components. In one example inner and outer circular contacts 3610, 3615, include one or more ridges 3625 to enable increased retention force to dielectric ring 3620. To electrically couple inner and outer circular contacts 3610, 3615, to earbuds 3000a, 3000b the contacts can each include coupling tabs. More specifically inner circular contact 3610 can have a first coupling tab 3630 for attaching to a portion of flexible circuit 3225 (see FIGS. 34-36). In some embodiments first coupling tab 3630 is soldered to a metallized pad 3635 (see FIG. 36) on flexible circuit 3225, however in other embodiments it can be attached with a conductive epoxy or other method. Outer circular contact 3615 can have a second coupling tab 3640 for attaching to a portion of flexible circuit 3225 similar to the aforementioned process.

As described above, outer circular contact 3615 can have an arcuate cross-section to facilitate wiping of a mating contact to provide a reliable interconnect with a receptacle connector. Inner circular contact 3610 can also have an arcuate or sloped cross-section to promote contact wiping with a receptacle connector. In some embodiments inner and outer circular contacts 3610, 3615, can be plated with one or more metals that can prevent oxidation of the contact surface for reduced interconnect resistance and in further embodiments the plating can be used to provide an aesthetically appealing appearance, as described in more detail below.

In various embodiments inner and outer circular contacts 3610, 3615, can be plated first with a layer of nickel followed by a final layer of gold. In some embodiments inner and outer circular contacts 3610, 3615, can be plated with a first layer of copper between 3 and 5 microns thick, followed by a layer of gold between 0.5 and 0.7 microns thick, followed by a layer of gold between 0.1 and 0.2 microns thick, followed by a layer of palladium between 0.5 and 0.8 microns thick, followed by a layer of gold between 0.1 and 0.2 microns thick, followed by a binary alloy layer including a first element and a second element, between 0.7 and 1.0 microns thick.

In some embodiments inner and outer circular contacts 3610, 3615, can be plated with a first layer of copper between 3 and 4.5 microns thick, followed by a layer of gold between 0.5 and 0.9 microns thick, followed by a layer of palladium between 0.5 and 0.8 microns thick, followed by a layer of gold between 0.1 and 0.2 microns thick, followed by a binary alloy layer including a first element and a second element, between 0.65 and 1.0 microns thick.

In these and other embodiments of the present invention, the first element of the binary alloy layer may be an element in a first group consisting of platinum, palladium, iridium, osmium and rhodium. In these and other embodiments of the present invention, the first element may be rhodium.

In these and other embodiments of the present invention, the second element of the binary alloy layer may be an element in a second group consisting of platinum, palladium, iridium, osmium, and ruthenium. In these and other embodiments of the present invention, the second element may be ruthenium.

In these and other embodiments of the present invention, the first element may comprise approximately 85 weight percent of the binary alloy while the second element may comprise approximately 15 weight percent of the binary alloy. In these and other embodiments of the present invention, the first element may comprise approximately 90 weight percent of the binary alloy while the second element may comprise approximately 10 weight percent of the binary alloy. In these and other embodiments of the present invention, the first element may comprise approximately 95 weight percent of the binary alloy while the second element may comprise approximately 5 weight percent of the binary alloy. In these and other embodiments of the present invention, the first element may comprise approximately 99 weight percent of the binary alloy while the second element may comprise approximately 1 weight percent of the binary alloy. In these and other embodiments of the present invention, the first element may comprise more than or approximately 99.5 weight percent of the binary alloy while the second element may comprise less than or approximately 0.5 weight percent of the binary alloy.

In some embodiments a combination of rhodium and ruthenium for the binary alloy can be used to prevent oxidation of the contact surface while providing an aesthetically appealing gray or silver appearance. Other combinations and compositions of plating are within the scope of this disclosure. In yet further embodiments first and second coupling tabs 3630, 3640 can be masked before the final layer of the binary alloy, leaving them with a gold surface for improved solderability.

After inner and outer circular contacts 3610, 3615 are plated they can be insert molded to form a connector 3600 as shown in FIG. 38. A dielectric ring 3620 can be molded in-between and around portions of inner and outer circular contacts 3610, 3615, and can be used to form one or more attachment tabs 3655 that assist connector 3600 being attached to earbud 3000a, 3000b as illustrated in FIG. 36.

Figure 39:
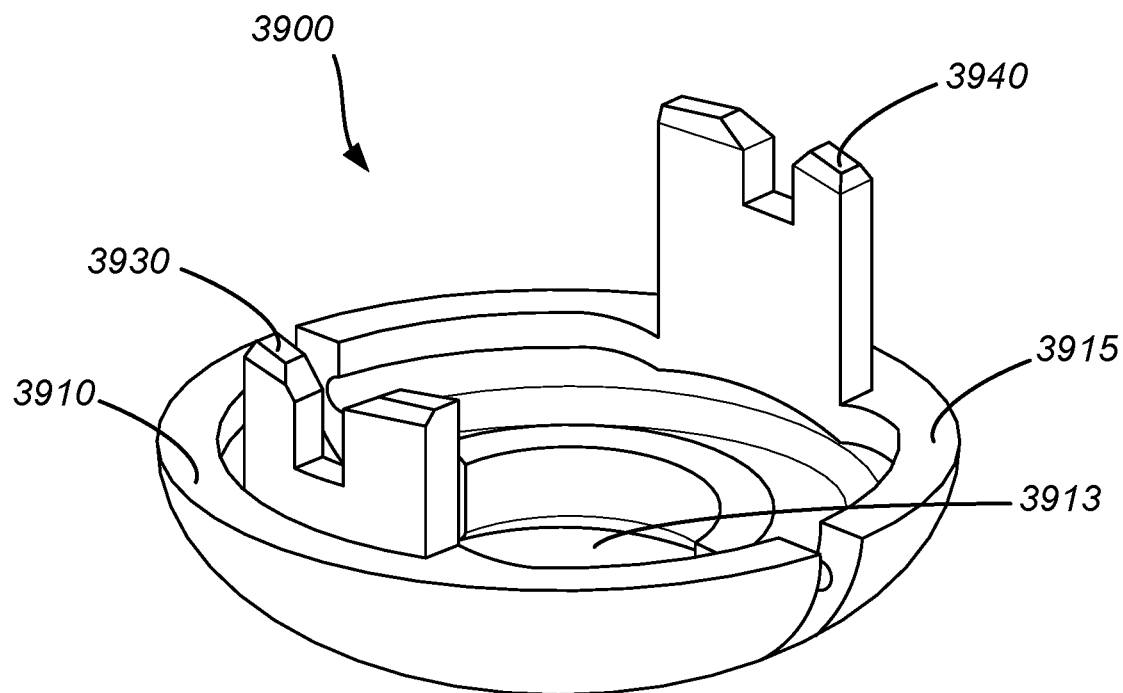
FIG. 39 is an isometric view of an earbud connector contact according to an embodiment of the disclosure.
Figure 40:
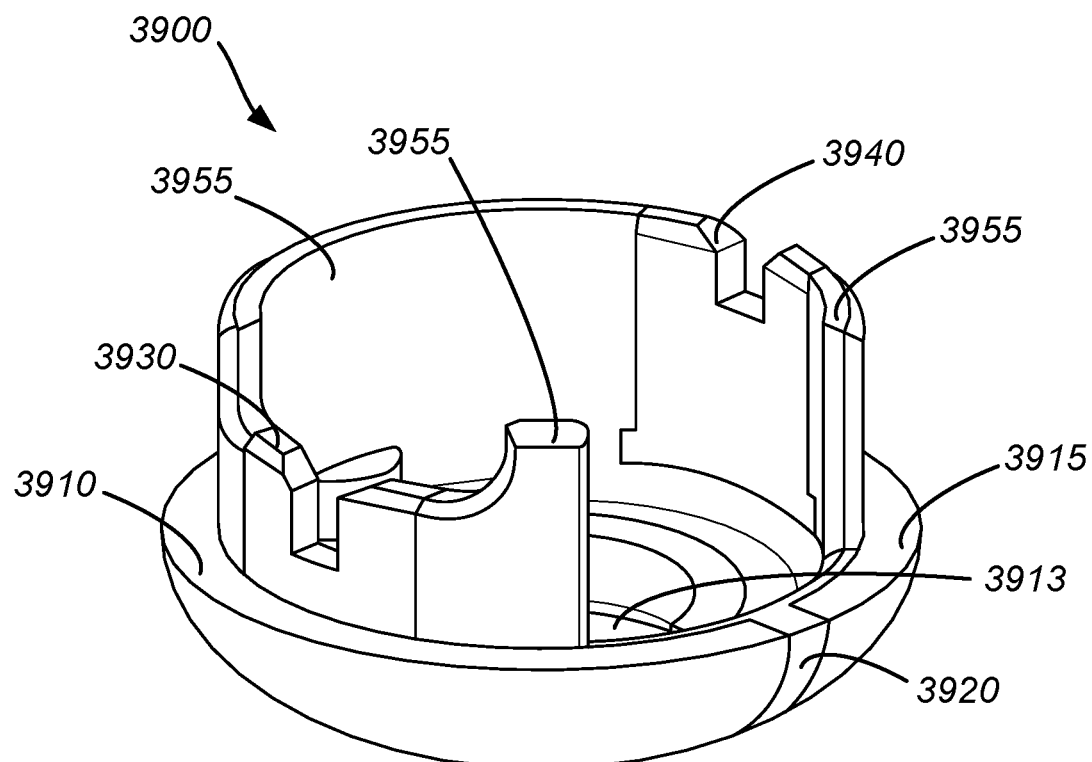
FIG. 40 is an isometric view of an insert molded connector contact that was illustrated in FIG. 39.

Now referring to FIGS. 39 and 40 perspective views of connector 3900 are illustrated. As shown in FIGS. 39 and 40, connector 3900 is similar to connector 3600 illustrated in FIG. 36, however connector 3900 includes two semicircular contacts instead of circular inner and an outer contacts. An end view of connector 3900 is similar to the end view of connector 605 illustrated in FIG. 6B. Connector 3900 includes a first semicircular contact 3910 and a second semicircular contact 3915 with a dielectric layer 3920 separating the two contacts. First and second semicircular contacts 3910, 3915, respectively, can be spaced in an oppositional and symmetrical relationship with each other. In various embodiments first and second semicircular contacts 3910, 3915, respectively, can form an aperture 3913 between them that can be used for both a receptacle connector contact surface and an aperture for a microphone. First and second semicircular contacts 3910, 3915, respectively, can be manufactured and plated using the same processes described above with regard to connector 3600.

To electrically couple first and second semicircular contacts 3910, 3915, respectively, to earbud 3000a, 3000b they can each include coupling tabs similar to connector 3600. More specifically first semicircular contact 3910 can have a first coupling tab 3930 for attaching to a portion of flexible circuit 3225 (see FIGS. 34-36). Second semicircular contact 3915 can have a second coupling tab 3940 for attaching to a portion of flexible circuit 3225 similar to the aforementioned process.

After first and second semicircular contacts 3910, 3915, respectively, are plated they can be insert molded to form a connector 3900 as shown in FIG. 40. A dielectric layer 3920 can be molded in-between and around portions of first and second semicircular contacts 3910, 3915, respectively, and can be used to form one or more attachment tabs 3955 that assist connector 3900 being attached to earbud 3000a,b as illustrated in FIG. 36.

Capacitive Sensor Insert

Figure 41:
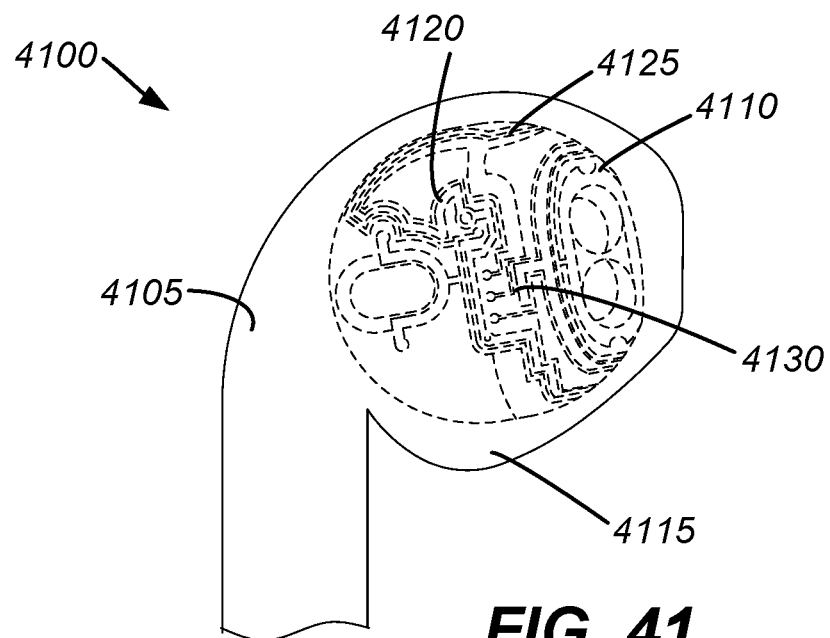
FIG. 41 is an isometric view of an earbud with a capacitive sensor insert according to some embodiments of the disclosure.

FIG. 41 illustrates a simplified perspective view of earbud 4100. As shown in FIG. 41, earbud 4100 includes a housing 4105 and a capacitive sensor insert 4110 that can sense a user's touch on exterior surface 4115 of the housing. Capacitive sensor insert 4110 has sensor circuitry 4120 that can create one or more capacitive sensors, as explained in more detail below. For example, sensor circuitry 4120 can create a first capacitive sensor in region 4125 on exterior surface 4115 of housing 4105 that can be used to detect the touch of a user's ear for in the ear sensing and can create a second capacitive sensor in region 4130 that can be used to detect the touch of a user's finger to answer a call or to perform any other function.

Figure 42:
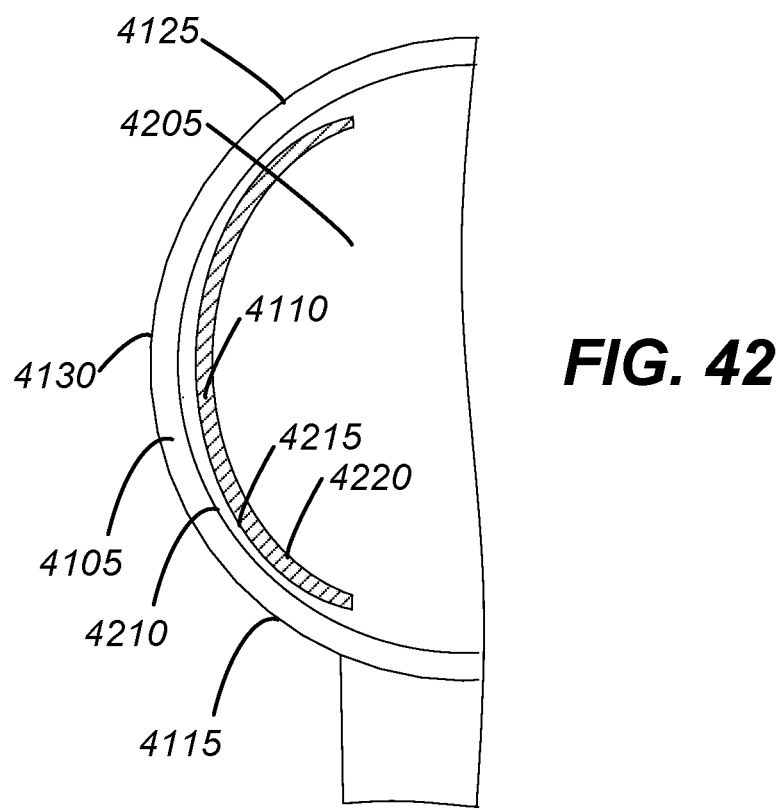
FIG. 42 is a cross-section of the earbud and the capacitive sensor insert illustrated in FIG. 41.

FIG. 42 illustrates a simplified cross-section of earbud housing 4104. As shown in FIG. 42, housing 4105 includes a capacitive sensor insert 4110 positioned within a cavity 4205 defined by the housing. Cavity can also house one or more other components of the earbuds 3000a,b. Earbud housing 4105 has at least one touch sensitive region 4125, 4130 at exterior surface 4115 of the housing that is formed by capacitive sensor insert 4110. Housing 4105 has an interior surface 4210 within cavity 4205, opposite exterior surface 4115. Capacitive sensor insert 4110 has a first surface 4215 with metalized sensor circuitry 4120 (see FIG. 41) that is positioned adjacent interior surface 4210 of housing 4105. Capacitive sensor insert 4110 has a second surface 4220 that is opposite first surface 4215.

Figure 43:
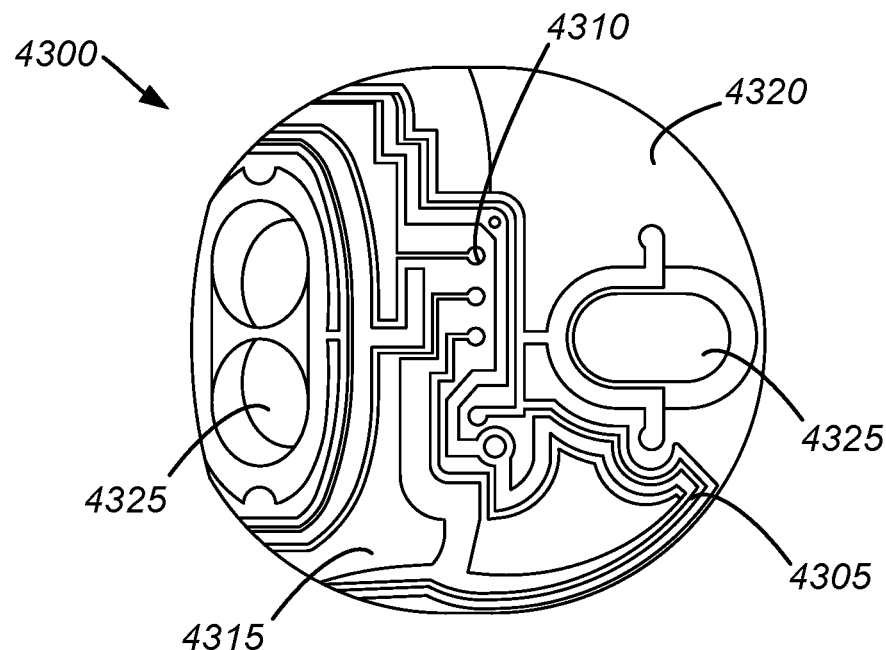
FIG. 43 is a plan view of a capacitive sensor insert illustrated according to an embodiment of the disclosure.
Figure 44:
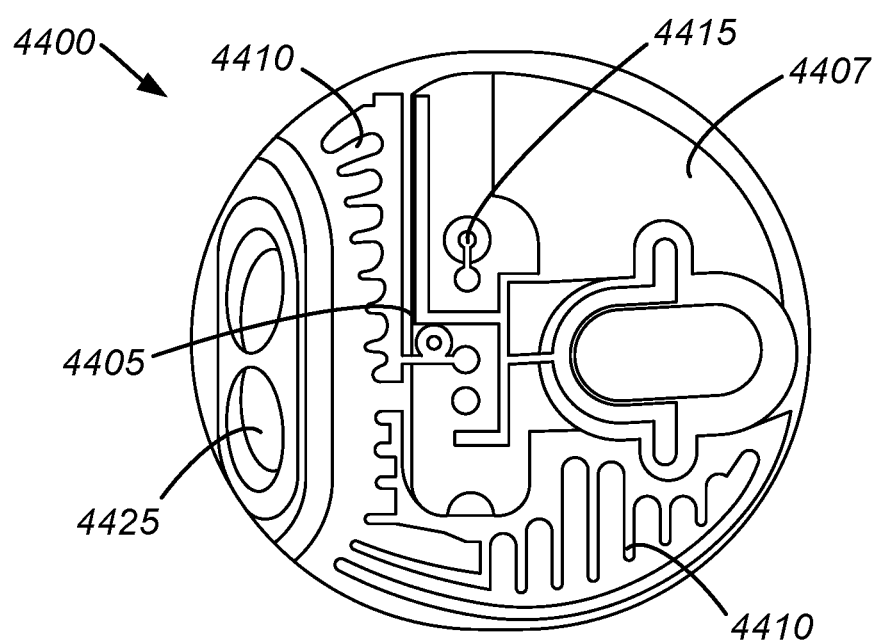
FIG. 44 is a plan view of a capacitive sensor insert illustrated according to an embodiment of the disclosure.

FIGS. 43 and 44 illustrate simplified plan views of capacitive sensor inserts 4300, 4400, respectively. As shown in FIGS. 43 and 44, different types of circuitry can be used to form the capacitive sensors, for example in FIG. 43 self-capacitance circuitry can be used and in FIG. 44 mutual-capacitance sensor circuitry can be used.

Now referring to FIG. 43, a plan view of sensor insert 4300 is illustrated. As shown in FIG. 43, sensor insert 4300 has self-capacitance sensor circuitry 4305 that senses the touch of a user (e.g., the user's ear and/or finger) on exterior surface 4115 (see FIG. 42) of housing 4105. The user's touch loads the self-capacitance circuitry and/or increases the parasitic capacitance to ground which is interpreted by the sensor insert 4300 and communicated to the earbud processor. Sensor circuitry 4305 can have one or more interconnect regions 4310, for example solder pads or plated through holes, that allow it to be coupled to an earbud processor with one or more conductors.

In one embodiment sensor insert 4300 can be formed from a plastic that includes metallic particulates. A laser can then be used to laser activate regions 4315 on first surface 4320 of sensor insert 4300, that correspond to the desired location of sensor circuitry 4305. The laser activated regions can then be metallized in a plating bath. In one example metal circuitry can be plated on to the activated regions forming sensor circuitry 4305. This process may be known in the art as laser direct structuring. Other methods can be used for form sensor insert 4300 without departing from this disclosure. For example in another embodiment a flexible circuit can be adhered to first surface 4320 of sensor insert and used as the sensor circuitry. In another example first surface 4320 can be entirely plated and can be etched using a photo-imageable ink.

In further embodiments sensor insert 4300 can have one or more acoustic apertures 4325 that allow sound to pass through and can be aligned with a sound port of the earbuds. In some embodiments insert 4300 can be formed in a hemispherical or other shape to closely match a shape of the external earbud housing. Additionally, in some embodiments, sensor circuitry 4305 can fully surround or partially surround the acoustic apertures.

Now referring to FIG. 44, a plan view of sensor insert 4400 is illustrated. As shown in FIG. 44, sensor insert 4400 has mutual-capacitance sensor circuitry 4405 that senses the touch of a user (e.g., the user's ear and/or finger) on exterior surface 4115 (see FIG. 42) of housing 4105. The user's touch alters the mutual coupling between row and column electrodes 4410, which are scanned sequentially and communicated to the earbud processor. Sensor circuitry 4405 is formed on first surface 4407 of sensor insert 4400 and can have one or more interconnect regions 4415, for example solder pads or plated through holes, that allow it to be coupled to earbud processor with one or more conductors.

As described above with regard to sensor insert 4300 in FIG. 43, sensor insert 4400 can be manufactured in the same way and can have similar features and functions. Additionally, in some embodiments sensor insert 4400 can include one or more acoustic apertures 4425 that allow sound to pass through sensor circuitry 4305 and at least some of sensor circuitry 4405 can fully surround or partially surround the acoustic apertures. Additionally, in some embodiments sensor insert 4400 can be formed in a hemispherical or other shape to closely match a shape of the external earbud housing.

Acoustic Insert

Figure 45A:
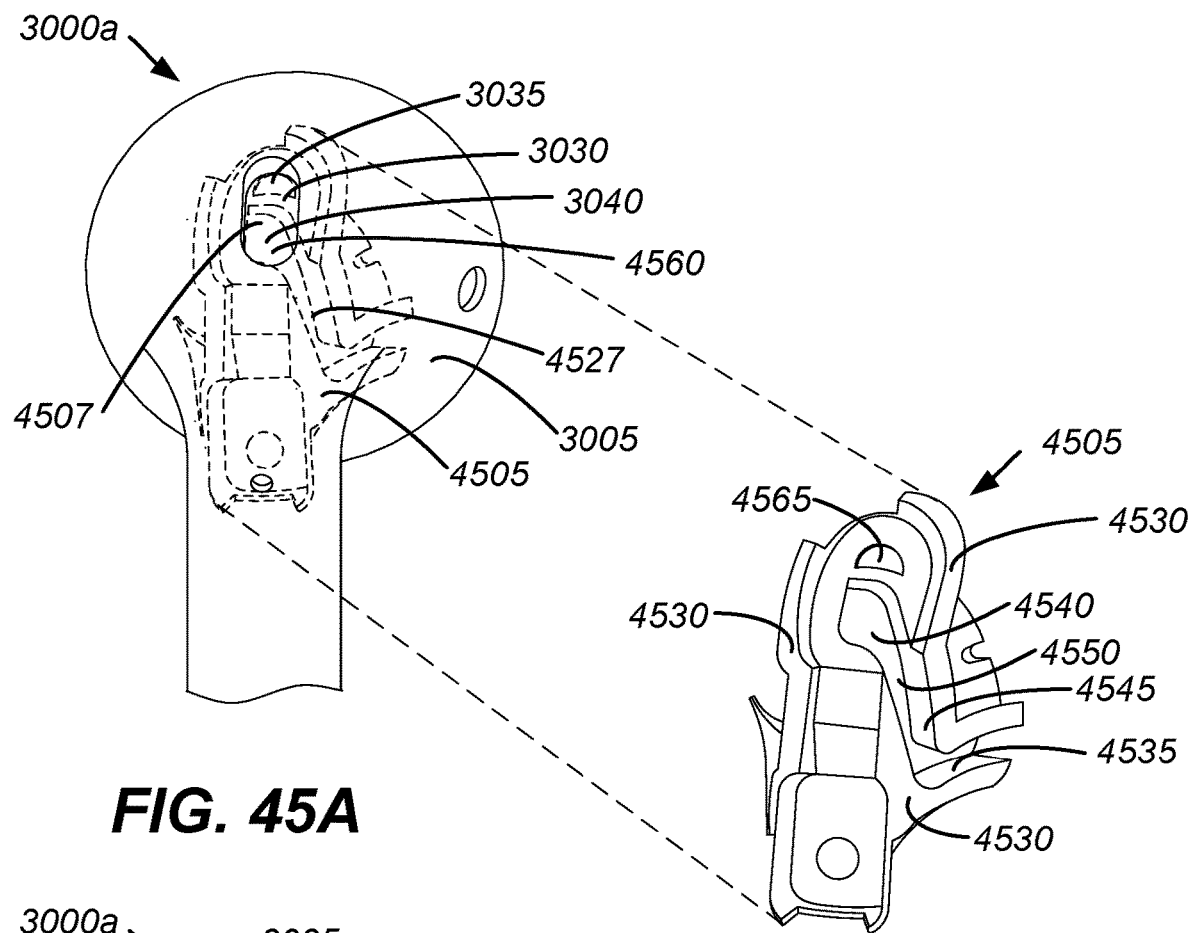
FIG. 45A is an illustration of an earbud with an acoustic insert according to an embodiment of the disclosure.

FIG. 45A illustrates a simplified rear perspective view of earbud 3000a. As shown in FIG. 45A, earbud 3000a includes an acoustic insert 4505 (shown in dashed lines within housing 3005 and in solid lines outside of the housing) that can be used to provide venting for driver (e.g., speaker) in earbud 3000a. More specifically, acoustic insert 4505 can be used to assist in forming a bass port 3040 and a rear vent 3035, that combine into a multiport 3030. In some embodiments, certain features of acoustic insert 4505 can be useful for forming acoustic vents in a relatively small and confined area such as an earbud housing.

Earbud 3000a can have multiple acoustic apertures, some of which are shown in FIG. 30. In addition to bass port 3040, rear vent 3035 and multiport 3030, each earbud can also have a directional sound port 3020 and a front leak port 3025. These apertures can provide venting for the driver, sound for the user, and can help tune the frequency response of earbud 3000a. More specifically, each aperture is not just a random opening, but instead can be intentionally formed for a particular purpose, namely to change the frequency response of ear bud 3000a in a way that helps to tune the frequency response and/or provide a consistent bass response amongst the same user and across users. The acoustic apertures can each also include various meshes (e.g., a directional sound port mesh, front leak mesh, back vent mesh, bass port mesh, and a multiport mesh) that cover or fit into a corresponding acoustic aperture of earbud 3000a.

Figure 45B:
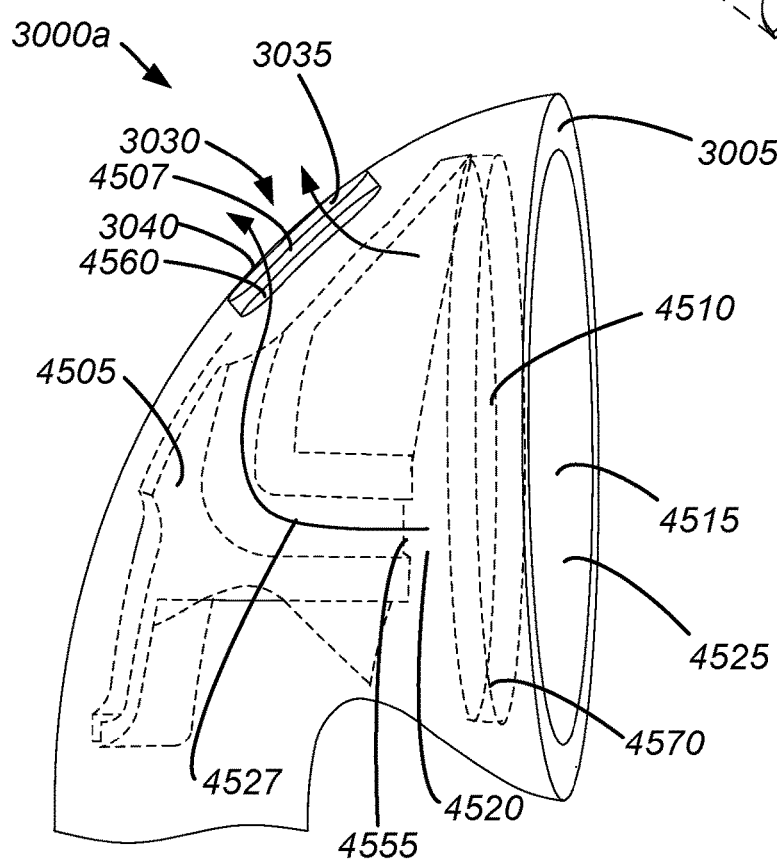
FIG. 45B is an illustration of the earbud with the acoustic insert illustrated in FIG. 45A.

FIG. 45B illustrates a simplified side view of earbud 3000a with acoustic insert 4505. As shown in FIG. 45B, acoustic insert 4505 and driver 4570 are disposed within housing 3005 (illustrated in dashed lines). Now referring simultaneously to FIGS. 45A and 45B the function of acoustic insert 4505 is described in more detail. Driver 4570 can be positioned within cavity 4510 of housing 3005, forming a front volume 4515 in front of the driver and a back volume 4520 behind the driver. Driver 4570 can be positioned such that front volume 4515 is acoustically isolated from a back volume 4520. Front and back volumes 4515, 4520, respectively can be formed within cavity 4510 at least partially by housing 3005 and sized and shaped to achieve a desired frequency response of the earbud.

In some embodiments, portions of acoustic insert 4505 are formed to closely match the contours of an interior surface 4525 of housing 3005. More specifically, raised regions 4530 of acoustic insert 4505 can be formed to fit securely against interior surface 4525 such that they can be bonded to interior surface 4525 forming a bass port channel 4527 and a multiport chamber 4507 that are acoustically sealed. That is, bass port channel 4527 can be formed by first, second and third walls 4535, 4540, 4545, respectively of bass port recess 4550 and a fourth wall formed by interior surface 4525 of housing 3005. Similarly, raised regions 4530 can be sealed to interior surface 4525 forming multiport chamber 4507 that is acoustically sealed.

Bass port channel 4527 can have an entrance aperture 4555 that communicates with back volume 4520. Bass port channel 4527 can be routed from entrance aperture 4555 to an exit aperture 4560 that is formed within multiport chamber 4507 that can be vented to the ambient. Rear vent 3035 can also be routed to multiport chamber 4507, providing a vent from back volume 4520 through rear vent aperture 4565 in acoustic insert 4505 to multiport chamber 4507. The size and shape of bass port channel 4527 and rear vent aperture 4565 can be formed for a particular purpose, namely to change the frequency response of ear bud 3000a in a way that helps to tune the frequency response and/or provide a consistent bass response amongst the same user and across users.

Housing 3005 can serve as a housing for the remaining components of the earbud assembly and can be formed in any suitable manner and can be made from any suitable material. For example, in one embodiment housing 3005 is made from a molded plastic. Similarly, acoustic insert 4505 can be made from any suitable material including a molded plastic.

Myriad methods can be used to bond raised regions 4530 of acoustic insert to interior surface 4525 of housing 3005.

Figure 46:
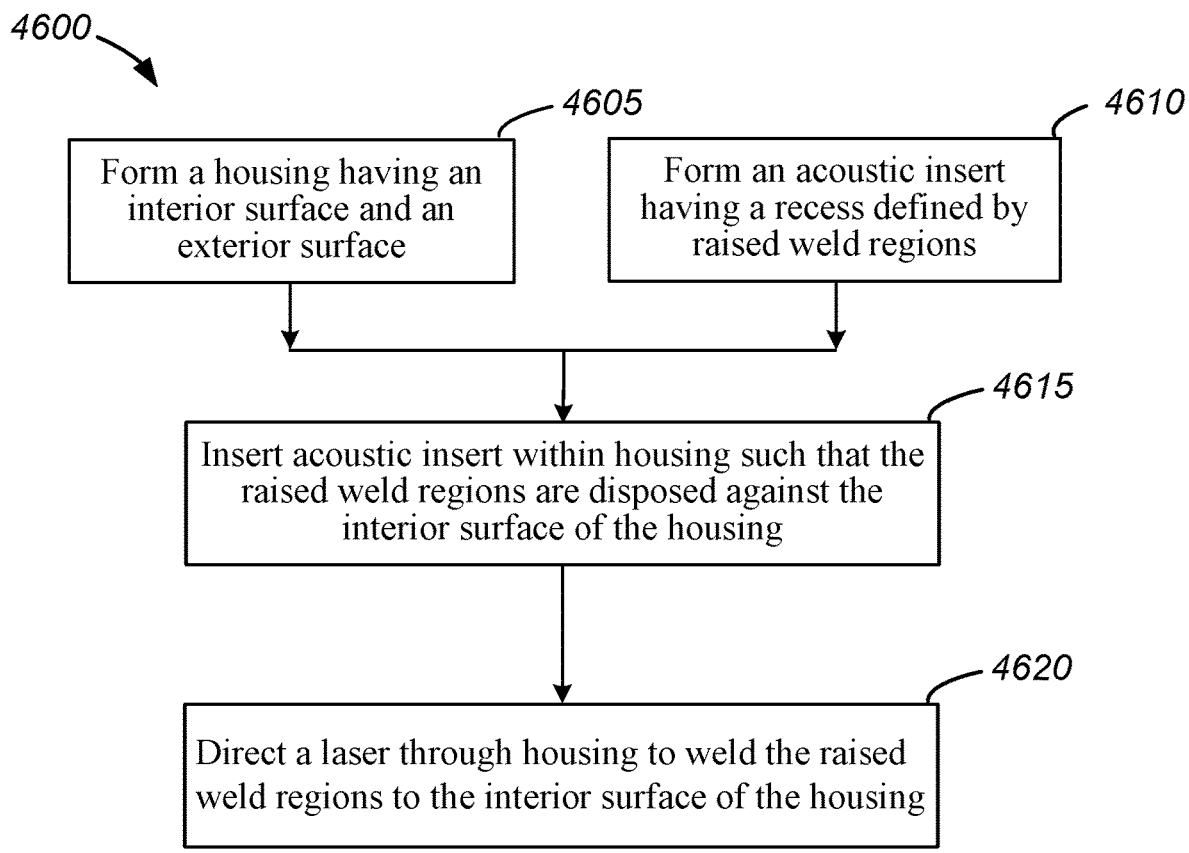
FIG. 46 is a flowchart illustrating steps associated with manufacturing an earbud according to some embodiments of the disclosure.

In one embodiment housing 3005 can be made from an ABS plastic that is substantially transparent, or at least semitransparent to the wavelength of a laser (FIG. 46, step 4605). Acoustic insert 4505 can be made from a plastic that is opaque or at least mostly opaque to the same laser (FIG. 46, step 4610). Acoustic insert 4505 can be placed within cavity 4510 of housing 3005 such that raised regions 4530 are firmly against interior surface 4525 (FIG. 46, step 4615). A laser beam from the laser can then be directed through housing 3005 such that it impinges raised regions 4530, melting at least a portion of the raised regions and bonding them to interior surface 4525 of housing 3005 (FIG. 46, step 4620).

In some embodiments, to enable the laser to be directed through housing 3005, housing 3005 can use a relatively low amount of pigment, a pigment that is transparent to the laser, or other features to allow the laser to be transmitted through the housing with enough energy to melt at least a portion of raised regions 4530. Acoustic insert 4505 can be made from a plastic that contains an absorptive dopant, such as carbon, so it absorbs the laser energy. In one embodiment a laser system that is similar to a laser direct structuring laser can be used to perform the laser bonding operation. In other embodiments raised regions 4530 can be bonded to interior surface 4525 with other methods such as, but not limited to, a pressure sensitive adhesive, a heat activated film or a laser activated adhesive.

Wireless Pairing

Figure 47:
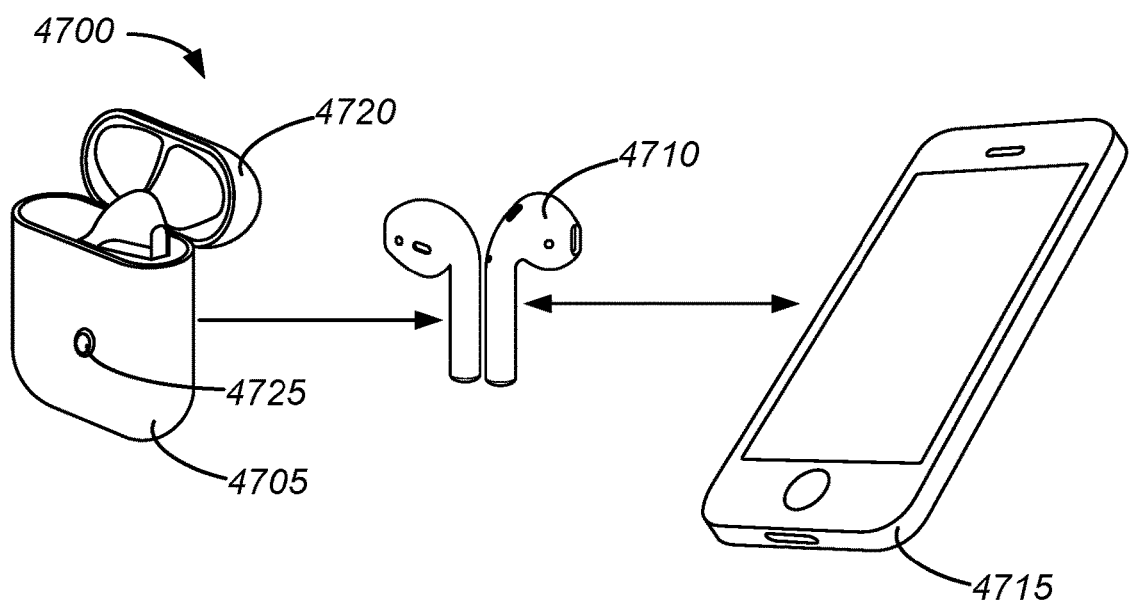
FIG. 47 illustrates a system 47 according to some embodiments of the disclosure.
Figure 48:
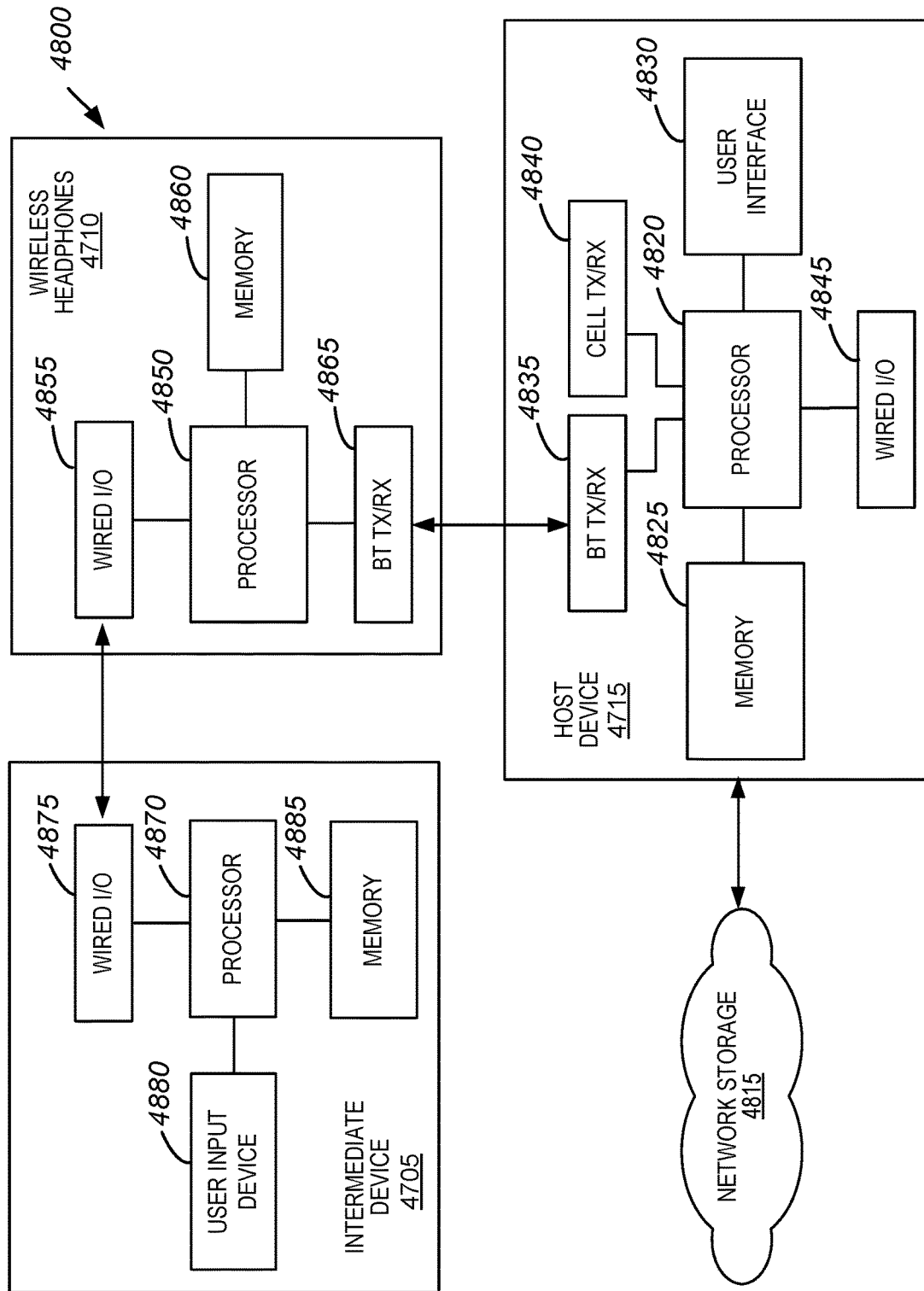
FIG. 48 is a simplified block diagram of a system 4800 according to some embodiments of the disclosure.
Figure 49:
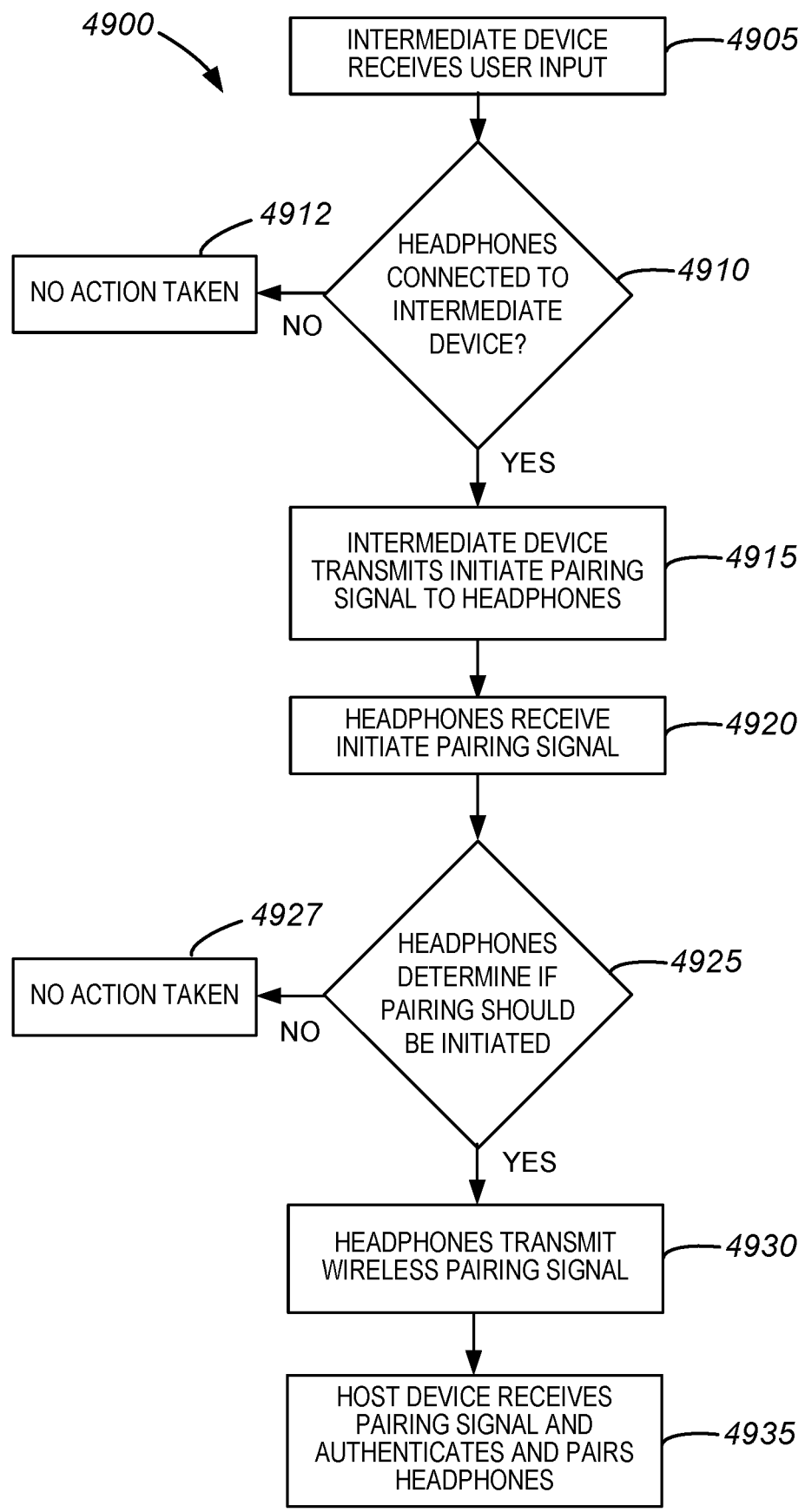
FIG. 49 is a flowchart illustrating steps associated with pairing wireless headphones with a host device according to some embodiments of the disclosure.

FIGS. 47-49 illustrate a wireless pairing system 4700 that includes a pair of wireless headphones 4710 (e.g., a pair of wireless earbuds) that can be wirelessly paired to a host device 4715 (e.g., a computer, a smartphone, a tablet computer, a smart watch, or the like), with the pairing initiated by an intermediate device 4705 (e.g., a case for the headphones). Intermediate device 4705 can instruct wireless headphones 4710 to enter a pairing sequence with host device 4715 in response to a user input. The user input can be a user-initiated event, such as opening earbud case lid 4720 or depressing an input button 4725. In some embodiments headphones 4710 can receive the pairing instruction via a wired connection between intermediate device 4705 and wireless headphones 4710 (e.g., through mated electrical contacts in a case for a pair of wireless earbuds and the earbuds as described above). In other embodiments, intermediate device 4705 can include a wireless radio that communicates the instruction to the wireless radio within wireless headphones 4710. Upon receiving the pairing instruction, headphones 4710 can initiate a pairing sequence to host device 4715 via a wireless communication protocol (e.g., via Bluetooth®) that supports bidirectional data transfer.

In some cases, headphones 4710 are a pair of wireless earbuds and only one earbud in the pair (i.e., a primary earbud) is paired with the companion host device 4715. In such cases, the primary earbud communicatively couples with the other earbud (a secondary earbud) so that audio data received from host device 4715 by the primary wireless earbud can be shared with the communicatively coupled secondary wireless earbud.

In some embodiments, headphones 4710 do not include a user input mechanism, such as a button that can be pressed for a user to initiate pairing between the headphones and host device 4715, and wireless pairing between intermediate device 4705 and host device 4715 can only be initiated via intermediate device 4705 (e.g., in response to user-input by either opening the case lid or pressing an input button on the case or other suitable means) or by host device 4715.

FIG. 48 illustrates a wireless pairing system 4800 according to an embodiment of the present disclosure that includes intermediate device 4705, headphones 4710 and host device 4715 shown in FIG. 47. While FIG. 48 illustrates simplified block diagrams of each of intermediate device 4705, wireless headphones 4710 and host device 4715, it is understood each of the illustrated devices can include functions and features in addition to those illustrated in FIG. 48. For example, while not shown in FIG. 48, each of intermediate device 4705, wireless headphones 4710 and host device 4715 can include a battery, such as a rechargeable battery, that provides power to the various components of each device.

In some embodiments, host device 4715 can be an electronic device or portable media player, such as an iPod™ media player manufactured and sold by Apple Inc., assignee of the present application. In general, a media player can be any device capable of storing and playing media assets including, but not limited to, audio, video, and/or still images. Alternatively, host device 4715 can be a mobile phone (e.g., using conventional cellular communication technology), a personal digital assistant (PDA), or a multi-functional device that incorporates a combination of media player, mobile phone, and/or PDA capabilities, such as an iPhone™ mobile device produced and sold by Apple, Inc. Host device 4715 can also be a general-purpose computer, such as a handheld computer, laptop computer, desktop computer, or the like.

Host device 4715 includes a processor 4820, a memory 4825, a user interface 4830, a first wireless transceiver 4835 (e.g., a Bluetooth transceiver), a second wireless transceiver 4840 (e.g., a cellular transceiver) and a wired input/output 4845. Processor 4820, which can be implemented as one or more integrated circuits, can control the operation of host device 4715. For example, in response to user input signals provided by a user through user interface 4830, processor 4820 can initiate programs to search, list or play media assets stored in memory 4825. In communication with cellular transceiver 4840, processor 4820 can control placing and receiving of telephone calls. Second transceiver 4840 can also be used to communicate data with a network, including network storage 4815. First transceiver 4835 can be used to support short range wireless communication (e.g., Bluetooth communication) between host device 4715 and various accessory devices, including headphones 4710. Memory 4825 can store any information, including Bluetooth pairing information as described in more detail below. Wired input/output 4845 can be any wired connection, such as a USB protocol or a proprietary protocol, such as that used by the Apple Lightning connector.

Wireless headphones 4710 can be traditional headphones that are worn over a user's head, headsets (a combination of a headphone and a microphone), earbuds (very small headphones that are designed to be fitted directly in a user's ear) or any other portable listening device. In some embodiments wireless headphones 4710 include a processor 4850, a wired input/output 4855, a memory 4860 and a wireless transceiver 4865 (e.g., a Bluetooth transceiver).

Processor 4850, which can be implemented as one or more integrated circuits, can control the operation of headphones 4710. Wired input/output 4855 can be any wired connection between intermediate device 4705 and wireless headphones 4710 including a proprietary interconnection. In one example wired input/output 4855 is an electrical connector, such as connector 347 (see FIG. 3) or any of the connectors illustrated in FIGS. 4A-8C, that provides a direct electrical connection between wireless headphones 4710 and intermediate device 4705 when the headphones are mated with the intermediate device (e.g., stored in a case). Wired input/output 4855 can be used for charging wireless headphones 4710 and/or communicating data with intermediate device 4705. In one example, wired input/output 4855 of headphones 4710 can be used to receive a signal from wired input/output 4875 of intermediate device 4705 to initiate a pairing sequence of the headphones, as described in more detail below.

Wireless transceiver 4865 can be used to support short range wireless communication (e.g., Bluetooth communication) between headphones 4710 and various host devices, including host device 4715. In one embodiment, intermediate device 4705 may also be equipped with a wireless transceiver (not shown; e.g., a Bluetooth transceiver) that can wirelessly communicate with wireless transceiver 4865. Wireless transceiver 4865 enables headphones 4710 to communicate wirelessly with host device 4715 once a channel for wireless communication has been established between the two. For example, headphones 4710 and host device 4715 may each be provided with Bluetooth® technology, including appropriate short-range transceiver units. In some embodiments, it may be possible to establish a Bluetooth® pairing between host device 4715 and headphones 4710 using conventional techniques, such as manual entry of a passcode (or PIN code) associated with headphones 4710 into host device 4715. In other embodiments, Bluetooth® pairings can be established automatically as described below.

Memory 4860 can store firmware for operating headphones 4710 as well as data for coupling with other wireless ear buds and for pairing headphones 4710 with companion host devices. For example, memory 4860 can store a connection history for companion host devices such as host device 4715, with which headphones 4710 have previously paired. The connection history can include data for automatically pairing headphones 4710 with the companion host device without having to configure a connection between the headphones and the companion host device (e.g., enter a password, exchange shared secrets, etc.). For example, the connection history can include one or more link keys for connecting to a wireless network (e.g., Bluetooth link keys). Memory 4860 can also store a MAC address that uniquely identifies headphones 4710 as well as store a paired partner MAC address of another headphone that has previously coupled with the wireless ear bud 165. For example, in one embodiment headphones 4710 are wireless earbuds and memory 4860 can store the MAC address of a paired partner earbud.

In another example once headphones 4710 are paired with host device 4715, the host device can save related pairing information from headphones 4710 to a network storage system 4815 such as cloud storage. In one embodiment the related pairing information stored in network storage 4815 can then be used by other host devices to be pre-paired with wireless headphones 4710. As an illustrative example, in one embodiment wireless headphones are initially paired with an iPhone. The iPhone communicates the pairing information to the user's iTunes or iCloud account that is saved on a remote network separate from host device 4715 (e.g., in the iCloud). The wireless headphones will then be listed on the user's iTunes or iCloud account as an authorized wireless device for the account. For example, the user's iCloud account may include a first list of host devices (one or more smart phones, one or more tablet computers and one or more laptop computers) including host device 4715 that are automatically authorized, for example based on the previous authorization and/or authentication of the devices to the iCloud account, to be paired with one or more wireless headphones that have been added to the account (including wireless headphones 4710). The user can then go to their iPad which can be automatically paired to the headphones without having to initiate a separate pairing sequence between headphones 4710 and the iPad based on the list of approved pairing in the user's iCloud account. Multiple host devices can be pre-authorized and automatically paired using this feature.

In some embodiments, intermediate device 4705 can be a case for headphones 4710, a docking station, or another type of accessory or electronic device. In some embodiments intermediate device 4705 includes a processor 4870, a wired input/output 4875, and a user input device 4880 and a memory 4885.

Processor 4870, which can be implemented as one or more integrated circuits, can control the operation of intermediate device 4705 by executing computer instructions stored in a computer-readable memory or medium, such as memory 4885. For example, instructions stored within memory 4885 can cause processor 4870 to, in response to user input signals provided by user input device 4880, send an instruction to headphones 4710 (e.g., via wired I/O interface 4875 or by a wireless channel between intermediate device 4705 and wireless headphones 4710) to enter a pairing sequence with a host device. Wired input/output 4875 can be any wired connection between intermediate device 4705 and wireless headphones 4710 including a proprietary interconnection. In one example wired input/output 4855 is a portion of an electrical connector 347 (see FIG. 3) between pair of earbuds 115*a*, 115*b* and case 100 and can be any connector illustrated in FIGS. 4A-8C. Wired input/output 4855 can be used for charging and/or data. In various embodiments wired input/output 4855 can be used to transmit a signal to headphones 4710 to initiate a pairing sequence, as described in more detail below.

User input device 4880 can be any device operable by a user. In one embodiment user input device 4880 is a lid sensor such as lid sensor 220 (see FIG. 2) that detects an opening or a closing of a lid of intermediate device 4705. In one example an opening event is detected and processor 4870 sends a signal through wired input/output 4875 of intermediate device to wired input/output 4855 of headphones to processor 4850 of headphones 4710 to initiate a pairing sequence and/or to turn on Bluetooth transceiver 4865. In another example, wireless headphones 4710 have never been paired before and headphones 4710 enter a pairing sequence. In a further example headphones 4710 have been paired before and headphones 4710 activate Bluetooth transceiver 4865 but do not initiate a pairing sequence. In one embodiment intermediate device 4705 may include one or more indicator lights to notify a user that it has sent a pairing signal to headphones 4710.

FIG. 49 describes a method 4900 in which an intermediate device (e.g., intermediate device 4705) initiates wireless pairing between a host device (e.g., host device 4715) and a pair of wireless headphones (e.g., wireless headphones 4710). The method set forth in FIG. 49 can be carried out by, for example, a processor within the intermediate device executing computer instructions stored within a computer-readable memory (e.g., processor 4870 executing instructions stored in computer-readable memory 4885). In step 4905 the intermediate device receives a user input. In some embodiments the intermediate device is a case for a pair of headphones or a pair of earbuds. In various embodiments the user input can be opening a lid of the case, depressing a button on the case or doing anything else to the case that the case registers as a user input indicative of a desire to initiate the pairing sequence. In one particular example, when a user opens a lid of the case, a lid sensor sends a signal to processor 4870 notifying the processor that the lid has been opened.

In step 4910, in response to receiving the user input, the intermediate device determines if the headphones are connected to the intermediate device. For example, in some embodiments the intermediate device is an earbud case and the pair of wireless headphones is a pair of wireless earbuds that fit within earbud receiving cavities of the case. The earbud case can include one or more earbud detectors as described above that can generate a signal indicating whether and can determine whether the earbuds are stored within the case as described above and provide a signal to the processor indicating whether the earbuds are stored within the case. As one particular example, an earbud case can determine if earbuds are stored within the case based on whether one or more electrical contacts on the earbuds are electrically connected to one or more electrical contacts within the case. In another embodiment the intermediate device is a docking station that couples to the headphones with a mating connector. If some embodiments, if the headphones are not connected to intermediate device there is no action taken by the intermediate device (step 4912), while if the headphones are connected to the intermediate device the method proceeds to step 4915. In other embodiments, step 4910 is optional and the intermediate device proceeds with step 4915 regardless. In such embodiments, however, if the headphones are not communicatively coupled to the intermediate device, the headphones will not receive the instruction generated in step 4915 and thus the end result of method 4900 in such cases will be "no action taken" (step 4912).

In step 4915, in response to the intermediate device determining that the headphones are connected to the intermediate device, the intermediate device transmits an "initiate pairing" instruction or signal to the headphones. In one embodiment the intermediate device transmits the "initiate pairing" signal through a charging connection between the headphones and the intermediate device. In another embodiment the intermediate device can send the signal wirelessly to the headphones. In one example different user inputs result in the intermediate device transmitting different "initiate pairing" signals to the headphones that are distinguishable by the headphones. As one example where the intermediate device is a case for a pair of earbuds, the case can transmit an instruction to the earbuds to automatically pair with a known and previously paired host when the lid opened. If, the input button is depressed, either before or after the lid is opened, the case can transmit an instruction to the earbuds to enter a discovery mode instead of the automatic pairing mode. The discovery mode then enables the earbuds to be selectively paired by a user to a different host device using a standard pairing sequence. In some embodiments, as described above, step 4910 is optional and intermediate device transmits an "initiate pairing" request signal to the headphones without attempting to determine if the headphones are connected, but if the headphones are not connected, the signal will not be received.

In step 4920 the headphones receive the "initiate pairing" signal from the intermediate device through an electrical connector, or through a wireless connection.

In step 4925, in response to receiving the "initiate pairing" signal, the headphones determine if a pairing sequence should be initiated. In one embodiment the headphones examine a pairing memory within the headphones and determine if this is a first pairing or a subsequent pairing of the headphones. If it is a first pairing the headphone processor can determine what type of user input was received to determine if pairing should be initiated. For example, for a first pairing (e.g., the pairing memory of the headphones is empty) if a user opened the lid, pairing can be initiated, but if a user pushed a button pairing is not initiated. However, if this is a subsequent pairing (e.g., the pairing memory of the headphones has at least one registry), if a user opens the lid pairing is not initiated but if a user pushed a button then pairing is initiated. These are only examples and other logic sequences are within the scope of this disclosure.

In a further example the headphones will only pair to a host device within a predetermined proximity of the headphones. In one example the headphones will only pair to a host electronic device within 10 meters, while in another embodiment it must be within 5 meters and in a further embodiment within 3 meters and in yet another embodiment within 1 meter. The maximum proximity pairing distance between the headphones and host device can be set at either the headphones or at the host device.

In some embodiments, the distance can be controlled by the headphones by the strength of the wireless signal sent from the headphones to the host device. For example, the headphones can broadcast a pairing signal that is at a predetermined reduced power level to insure that the electronic device is within a desired proximity. In one embodiment the headphones may broadcast a pairing signal that is 80% or less of its normal broadcasting power (i.e., its normal signal strength). In another embodiment the pairing signal may be 50% or less of the normal signal strength and in a further embodiment it may be 25% or less of the normal signal strength.

In some embodiments, the distance can be controlled by the host electronic device based on the strength of the signal received from the headphones. For example, in some embodiments the host electronic device will only accept the wireless pairing request from the first device if the strength of the wireless signal transmitting the pairing request is above a predetermined threshold that is higher than a minimum signal strength required for normal wireless communication between the first and second devices. In one embodiment the predetermined threshold is 200% higher than the normal minimum signal strength required for wireless communication between the headphones and host device. In another embodiment the predetermined threshold is 150% higher than the normal minimum signal strength and in still further embodiments it can be 100% or 50% higher than the normal minimum signal strength.

Regardless of the approach taken, if the host electronic device is not sufficiently proximate the headphones, the headphones will not accept (or will not receive) the pairing request and no further action to consummate the pairing is taken (step 4927). However if the required conditions are met, the method proceeds to step 4930.

In step 4930, in response to the headphones determining that a pairing sequence should be initiated (or should continue), the headphones transmit a wireless pairing signal using a wireless protocol common between the headphones and host device. In some embodiments this may be a standardized recurring Bluetooth signal that can stop after a predetermined period of time if there is no answer. In other embodiments, other known wireless protocols can be used.

In step 4935, in response to receiving the pairing signal, the host device authenticates and pairs the headphones. In one example the host device provides the user a prompt asking if pairing should be performed before pairing the headphones. If the user accepts, the host device sends data to the headphones and authentication of the headphones is performed.

Figure 50:
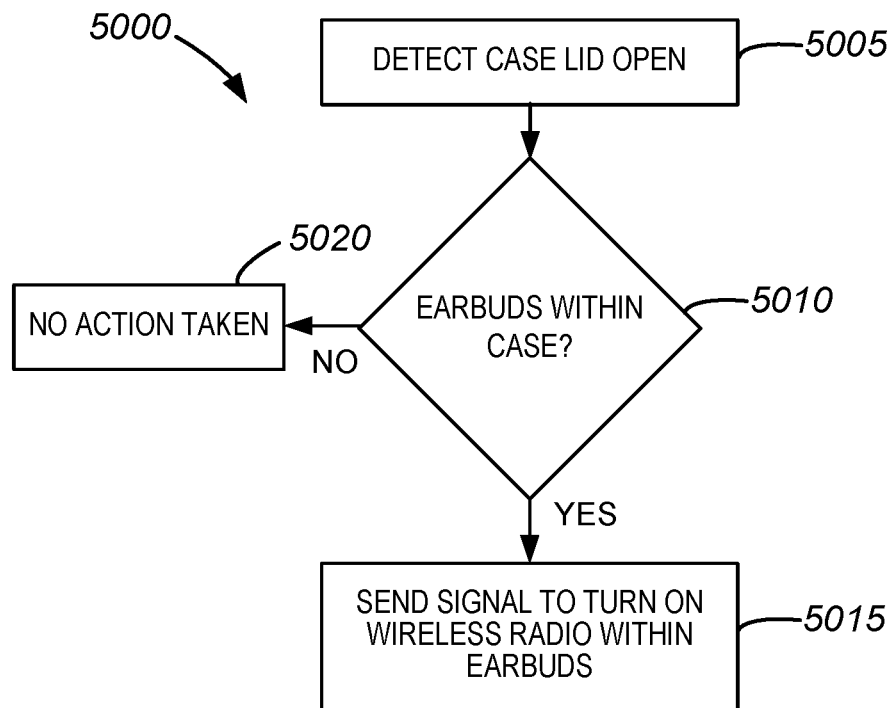
FIG. 50 is a flowchart illustrating steps associated with activating a wireless radio in earbuds according to some embodiments of the disclosure.

In some instances, prior to initiating a wireless pairing sequence between a pair of wireless headphones and a host device, a case for a pair of wireless earbuds according to the present disclosure can automatically turn ON the wireless radio of the earbuds when a user opens the lid that encloses the earbuds within the case. FIG. 50 illustrates a method 5000 in which an earbud case (e.g., intermediate device 4705) turns ON the wireless radio of a pair of earbuds (e.g., wireless headphones 4710) stored within the case according to some embodiments of the disclosure. As shown in FIG. 50, method 5000 can start when intermediate device 4705 detects that lid 4720 is moved from a closed position to an open position (step 5005).

If the earbuds are not in the case, then no action is taken (step 5020). If wireless headphones 4710 are within the case (step 5010), the case can generate and send an instruction to the pair of earbuds that causes the earbuds to turn their wireless radio on. In some embodiments the instruction can be sent over one or more electrical contacts positioned within the receiving cavity as described above. Once the earbuds turn their wireless radio on, the buds can be further instructed to initiate a pairing sequence with a host device. In some embodiments, a single user interaction with the case (e.g., opening lid 4720 or depressing button 4725) can generate instructions that are sent to the earbuds to both turn on the earbud wireless radio and initiate a pairing sequence as described with respect to FIG. 49. In some embodiments a single instruction from intermediate device 4705 can initiate both actions and in other embodiments the case can send multiple instructions in response to the single event.

Figure 51:
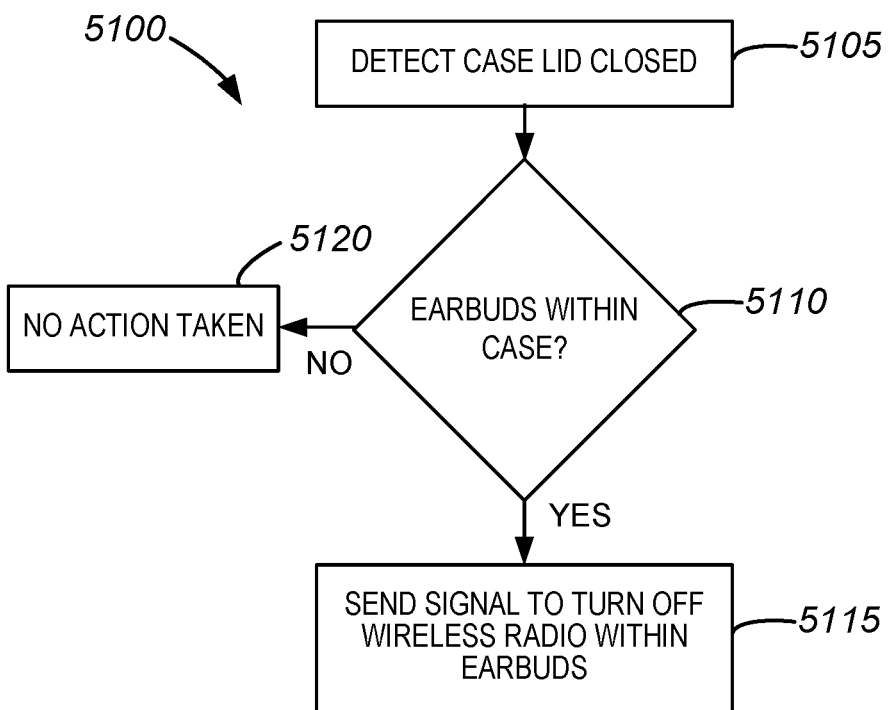
FIG. 51 is a flowchart illustrating steps associated with deactivating a wireless radio in earbuds according to some embodiments of the disclosure.

In other embodiments, the closure of lid 4720 can automatically turn OFF the wireless radio in the earbuds as described with respect to FIG. 51, which illustrates a method 5100 according to some embodiments of the disclosure. As shown in FIG. 51, method 5100 can start when intermediate device 4705 detects that lid 4720 is moved from an open position to a closed position (step 5105). If the earbuds are not in the case, then no action is taken (step 5120). If wireless headphones 4710 are within the case (step 5110), the case can generate and send an instruction to the pair of earbuds that causes the earbuds to turn OFF their wireless radio thus saving charge of the batteries within the earbuds.

While the various embodiments and examples described above were primarily focused on earbuds and a case for storing such earbuds, embodiments of the disclosure are not limited to such and the techniques of the disclosure described above are equally applicable to headphones and other listening devices and cases for such. For example, in one embodiment, case 100 described in FIG. 1 can be a case for a pair of headphones instead of a pair of earbuds. In such an embodiment, cavities 110a, 110b can be sized and shaped to hold left and right earpads of the headphones along with portions of a band connecting the two earpads. In other embodiments, a single cavity can be included in the case to hold the earpads and some or all of the connecting headband. Similarly, in other embodiments, case 100 can be sized and shaped to hold a portable speaker or other type of listening device.

For simplicity, various internal components, such as circuitry, bus, memory, storage devices and other components of pair of earbuds 115a, 115b, case 100 (see FIG. 1) and wearable electronic device 2301(see FIG. 23) are sometimes not shown in the figures. Also, it is noted that some embodiments have been described as a process that is depicted as a flow diagram or block diagram. Although each diagram may describe the process as a sequential series of operations, many of the operations can be performed in parallel or concurrently. In addition, the order of the operations may be rearranged. A process may have additional steps not included in the figures.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments may be combined in any suitable manner without departing from the spirit and scope of embodiments of the disclosure. Additionally, spatially relative terms, such as "bottom" or "top" and the like may be used to describe an element and/or feature's relationship to another element(s) and/or feature(s) as, for example, illustrated in the figures. It will be understood, that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device may be otherwise oriented (e.g., rotated 90 degrees or at other orientations) and the spatially relative descriptors used herein interpreted accordingly.

What is claimed is:

1. An earbud comprising:
   a housing defining a cavity in which one or more electrical components of the earbud are housed and having an exterior surface that defines a shape of the earbud such that the earbud is sized and shaped to be at least partially inserted into a user's ear;
   an acoustic port formed through the housing;
   a speaker disposed within the housing and aligned to emit sound through the acoustic port;
   first and second in-ear optical sensors, each optical sensor configured to generate a respective detection signal in response to detecting the user's ear when the earbud is inserted into the user's ear;
   a touch-sensitive sensor positioned within the housing and adjacent to the exterior surface, the touch-sensitive sensor defining a touch sensitive region at a portion of the exterior surface of the housing and configured to generate an interaction signal in response to detecting a touch of a user's finger at the touch-sensitive region; and
   a processor disposed within the cavity and operatively coupled to the in-ear sensor and the touch-sensitive sensor.

2. The earbud of claim 1 wherein the touch-sensitive sensor is a capacitive sensor.

3. The earbud of claim 1 wherein in response to a user touching the touch-sensitive region, the touch-sensitive sensor transmits a signal to the processor and wherein in response to receiving the signal the processor transmits a command signal to a paired electronic device.

4. The earbud of claim 3 wherein the command signal commands the paired electronic device to answer an incoming call.

5. The earbud of claim 1 wherein the touch sensitive region of the housing is positioned opposite of the user's ear such that it is accessible by the user's finger when the earbud is at least partially inserted into the user's ear.

6. The earbud of claim 1 wherein the touch-sensitive sensor comprises a flexible circuit.

7. An earbud comprising:
   a housing defining:
     a cavity in which one or more electrical components of the earbud are housed;
     a coupling portion configured to removably couple the earbud to a user's ear;
     a user interface portion separated from the coupling portion;
   a user interface sensor positioned within the housing proximate the user interface portion and configured to detect contact between the user's finger and the user interface portion;
   first and second in-ear optical sensors, each optical sensor configured to sense the user's ear when the coupling portion is coupled to the user's ear; and
   a processor disposed within the cavity and operatively coupled to the user interface sensor and the in-ear sensor.

8. The earbud of claim 7 wherein the user interface portion is positioned such that the user can touch the user interface portion with the user's finger when the coupling portion is coupled to the user's ear.

9. The earbud of claim 7 wherein the user interface sensor is a capacitive sensor and detects the contact via a change in capacitance.

10. The earbud of claim 7 wherein the user interface sensor comprises a flexible circuit.

11. The earbud of claim 7 wherein the user interface sensor transmits a signal to the processor in response to detecting the contact.

12. The earbud of claim 11 wherein the processor, in response to receiving the signal, causes a communication signal to be transmitted from the earbud to a wirelessly linked electronic device.

13. The earbud of claim 12 wherein the communication signal commands the electronic device to answer an incoming phone call.

14. A portable listening device comprising:
   a housing defining a cavity in which one or more electrical components of the portable listening device are housed and having an exterior surface that defines a shape of the portable listening device such that the portable listening device is sized and shaped to be at least partially inserted into a user's ear;
   first and second in-ear optical sensors, each optical sensor configured to sense the user's ear when the housing is inserted into the user's ear; and
   a user interface sensor positioned within the housing and configured to detect contact between the user and a user interface portion of the housing.

15. The portable listening device of claim 14 further comprising a processor disposed within the cavity and operatively coupled to the in-ear optical sensor and the user interface sensor.

16. The portable listening device of claim 14 wherein the user interface sensor defines the user interface portion of the housing.

17. The portable listening device of claim 14 wherein the user interface portion of the housing is positioned in a separate region of the housing relative to the in-ear optical sensor, such that the user can contact the user interface portion with the user's finger while the portable listening device is at least partially inserted into the user's ear.

18. The portable listening device of claim 14 wherein the user interface sensor is a capacitive sensor and detects the contact via a change in capacitance.

19. The portable listening device of claim 14 wherein the user interface sensor comprises a flexible circuit.

20. The portable listening device of claim 14 wherein the contact causes a processor of the portable listening device to transmit a signal to a wirelessly linked electronic device.

21. The earbud of claim 1 wherein the exterior surface of the housing includes:
   a first portion that is arranged to be positioned adjacent the user's ear when the earbud is inserted into the user's ear; and
   a second portion that is opposite the first portion and includes the touch sensitive region;
   wherein the first optical sensor is at the first portion of the exterior surface and the second optical sensor is at the second portion of the exterior surface.

22. The earbud of claim 1 wherein the first in-ear optical sensor detects a tragus of the user and the second in-ear optical sensor detects a concha of the user.

23. The earbud of claim 7 wherein the housing includes:
   a first surface that is arranged to be positioned adjacent the user's ear when the earbud is inserted into the user's ear; and
   a second surface that is opposite the first surface and includes the user interface portion;
   wherein the first optical sensor is at the first surface and the second optical sensor is at the second surface.

24. The earbud of claim 7 wherein the first in-ear optical sensor detects a tragus of the user and the second in-ear optical sensor detects a concha of the user.

25. The portable listening device of claim 14 wherein the exterior surface of the housing includes:
   a first portion that is arranged to be positioned adjacent the user's ear when the portable listening device is inserted into the user's ear; and
   a second portion that is opposite the first portion and includes the user interface portion;
   wherein the first optical sensor is at the first portion of the exterior surface and the second optical sensor is at the second portion of the exterior surface.

26. The portable listening device of claim 14 wherein the first in-ear optical sensor detects a tragus of the user and the second in-ear optical sensor detects a concha of the user.

* * * * *